US005559934A

United States Patent [19]

Ogura et al.

[11] Patent Number: 5,559,934
[45] Date of Patent: Sep. 24, 1996

[54] LABEL PRINTING APPARATUS AND WORDPROCESSOR

[75] Inventors: Wataru Ogura; Yoshito Kawagoe; Satoru Takizawa; Yasuo Takeuchi; Kimihiko Okimura, all of Suwa; Hiroshi Yoshida, deceased, late of Shiojiri, by Hiromi Yoshida, legal representative; Atsushi Kobayashi; Noboru Ogura, both of Suwa; Kenji Arioka, Ikoma, all of Japan

[73] Assignee: Chinon Industries, Inc., Japan

[21] Appl. No.: 479,458

[22] Filed: Jun. 7, 1995

Related U.S. Application Data

[62] Division of Ser. No. 29,662, Mar. 11, 1993, Pat. No. 5,448,685.

[30] Foreign Application Priority Data

| Mar. 11, 1992 | [JP] | Japan | 4-052727 |
|---|---|---|---|
| Jun. 3, 1992 | [JP] | Japan | 4-142964 |
| Jun. 16, 1992 | [JP] | Japan | 4-156672 |
| Jun. 18, 1992 | [JP] | Japan | 4-159518 |
| Jun. 29, 1992 | [JP] | Japan | 4-170917 |
| Jun. 29, 1992 | [JP] | Japan | 4-170924 |
| Jul. 2, 1992 | [JP] | Japan | 4-175512 |
| Jul. 10, 1992 | [JP] | Japan | 4-183814 |
| Jul. 13, 1992 | [JP] | Japan | 4-185302 |
| Jul. 17, 1992 | [JP] | Japan | 4-191148 |
| Aug. 4, 1992 | [JP] | Japan | 4-208184 |
| Aug. 4, 1992 | [JP] | Japan | 4-208189 |
| Aug. 19, 1992 | [JP] | Japan | 4-220412 |
| Aug. 19, 1992 | [JP] | Japan | 4-220415 |

[51] Int. Cl.$^6$ ................................ G06K 15/00
[52] U.S. Cl. ................................ 395/117; 395/110
[58] Field of Search ................................ 395/117, 101, 395/110; 364/709.12, 709.14, 709.16; 341/23

[56] References Cited

U.S. PATENT DOCUMENTS

| 4,498,149 | 2/1985 | Yoshida | 364/709.12 |
| 4,546,449 | 10/1985 | Masaki et al. | 395/275 |
| 4,635,212 | 1/1987 | Hatazawa | 395/110 |
| 4,688,020 | 8/1987 | Kuehneman et al. | 340/825.34 |
| 4,718,784 | 1/1988 | Drisko | 400/68 |

(List continued on next page.)

FOREIGN PATENT DOCUMENTS

| 0392825 | 10/1990 | European Pat. Off. . |
| 0440496 | 8/1991 | European Pat. Off. . |

OTHER PUBLICATIONS

Brooks, "Lilac: A Two–View Document Editor", Computer, vol. 24, No. 6, Jun. 1991, Los Alamitos, pp. 7–19.

"Displaying Command Consequences Within Distinct Applications", IBM Technical Disclosure Bulletin, vol. 34, No. 2, Jul. 1991, pp. 67–68.

*Primary Examiner*—Mark R. Powell
*Assistant Examiner*—Tracy M. Legree
*Attorney, Agent, or Firm*—Cushman Darby & Cushman, LLP

[57] ABSTRACT

A label printing apparatus includes a liquid crystal display unit for displaying an input character string and a message corresponding to each operation stage, a printing unit for printing a character string on each label, a storage unit for storing each data, and a CPU for performing each processing and control. Label information specifying sizes and the like of various types of labels, sheet numbers corresponding to the label information, character size information defining character sizes, and the like are stored in the storage unit. The CPU specifies label information corresponding to the sheet number and selects a maximum printable character size from a character size table as an initial value on the basis of a printing area. The character size is changed so that the horizontal length of an input character string falls within the printing area. The character size is further changed so that all the characters of the character string extending in all the lines fall within the printing area. An optimal character size is finally selected, and actual printing is performed on each label using this character size.

6 Claims, 63 Drawing Sheets

| INPUT KEY | MEMBER LIST |
|---|---|
| 1 | 1 ① ⑴ I. Ⅰ i 一 |
| 2 | 2 ② ⑵ 2. Ⅱ ii 二 |
| 3 | 3 ③ ⑶ 3. Ⅲ iii 三 |
| 4 | 4 ④ ⑷ 4. Ⅳ iv 四 |
| 5 | 5 ⑤ ⑸ 5. Ⅴ v 五 |
| 6 | 6 ⑥ ⑹ 6. Ⅵ vi 六 |
| 7 | 7 ⑦ ⑺ 7. Ⅶ vii 七 |
| 8 | 8 ⑧ ⑻ 8. Ⅷ viii 八 |
| 9 | 9 ⑨ ⑼ 9. Ⅸ ix 九 |
| 0 | 0 0. 〇 |

U.S. PATENT DOCUMENTS

| | | | |
|---|---|---|---|
| 4,827,358 | 5/1989 | Matsumoto | 358/296 |
| 4,853,888 | 8/1989 | Lata et al. | 364/900 |
| 4,939,669 | 7/1990 | Nishino | 395/117 |
| 4,939,674 | 7/1990 | Price et al. | 395/109 |
| 4,996,650 | 2/1991 | Kenbo | 395/105 |
| 5,109,355 | 4/1992 | Yuno | 364/709.12 |
| 5,208,902 | 5/1993 | Kumon | 395/110 |
| 5,231,577 | 7/1993 | Koss | 395/140 |

Fig.8
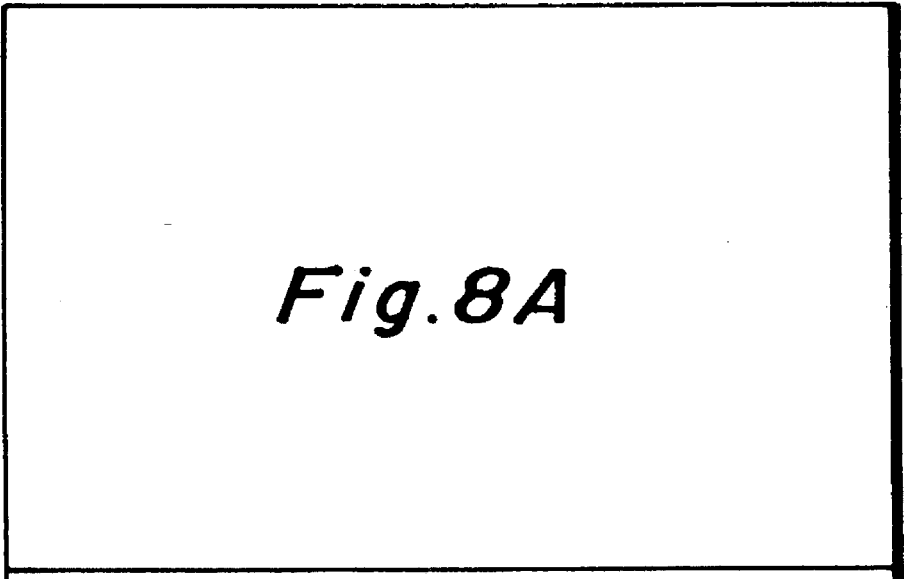
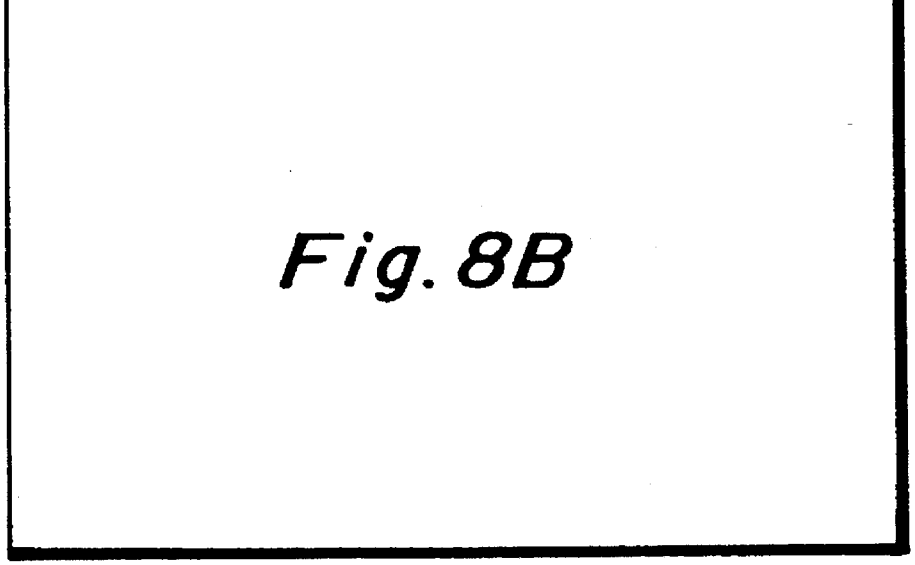

(VERTICAL LENGTH)  (HORIZONTAL LENGTH)

INSERTION DIRECTION (VERTICAL LENGTH)  (HORIZONTAL LENGTH)

INSERTION DIRECTION

LINE OVERFLOW HAS OCCURRED, AND CHANGE UNDERLINE SIZE OR THE LIKE

Fig.16B

LINE OVERFLOW HAS OCCURRED, AND NO DESIGNATION IS ALLOWED

Fig.16C

LINE OVERFLOW HAS OCCURRED, AND NO LINE FEED IS ALLOWED

Fig.17

NEW-BUSINESS] ◀END PROMOTION-DEPARTMENT

Fig. 19

| CHARACTER SIZE | TYPE | SQUARE CHARACTER | FLATTENED CHARACTER | CONDENSED CHARACTER |
|---|---|---|---|---|
| SS | PRINTING DOT COUNT | 16 × 15 | 16 × 30 | 32 × 15 |
| SS | DISPLAY DOT COUNT | 4 × 4 | 4 × 8 | 8 × 4 |
| S | PRINTING DOT COUNT | 22 × 22 | 22 × 44 | 44 × 22 |
| S | DISPLAY DOT COUNT | 6 × 6 | 6 × 12 | 12 × 6 |
| M | PRINTING DOT COUNT | 32 × 30 | 44 × 66 | 66 × 44 |
| M | DISPLAY DOT COUNT | 8 × 8 | 12 × 18 | 18 × 12 |
| L | PRINTING DOT COUNT | 44 × 44 | 44 × 88 | 88 × 44 |
| L | DISPLAY DOT COUNT | 12 × 12 | 12 × 24 | 24 × 12 |
| LL | PRINTING DOT COUNT | 66 × 66 | 66 × 88 | 88 × 66 |
| LL | DISPLAY DOT COUNT | 18 × 18 | 18 × 24 | 24 × 18 |
| 3L | PRINTING DOT COUNT | 88 × 88 | | |
| 3L | DISPLAY DOT COUNT | 24 × 24 | | |

(VERTICAL × HORIZONTAL)

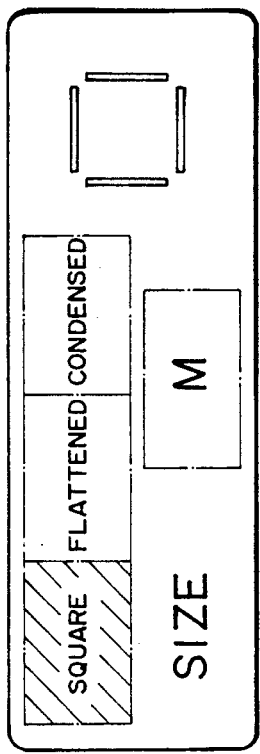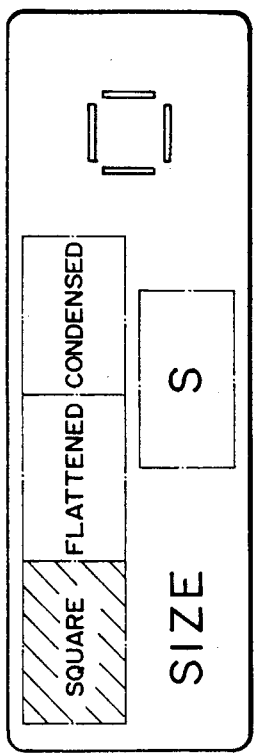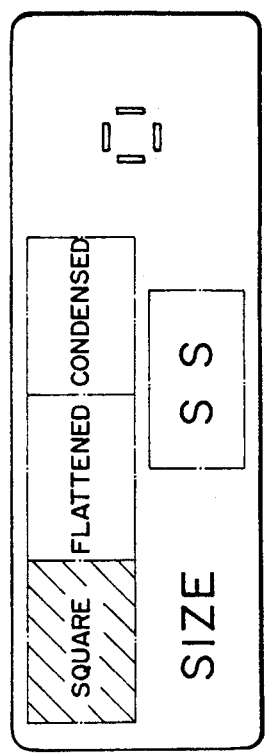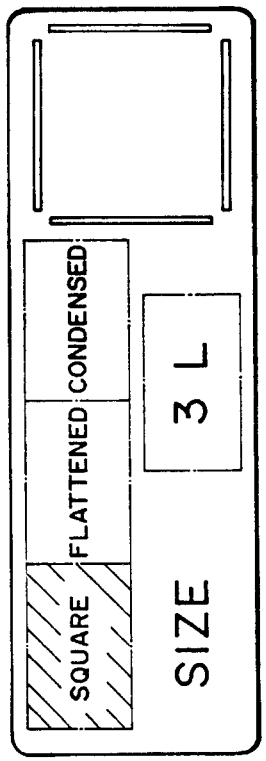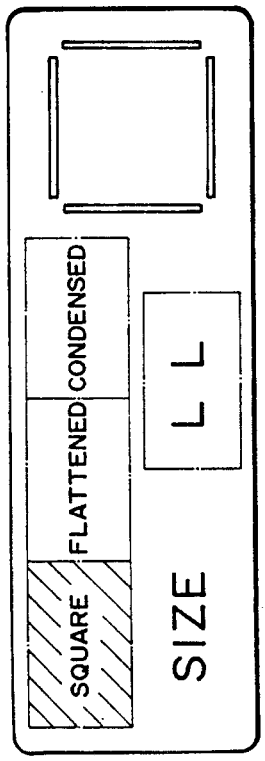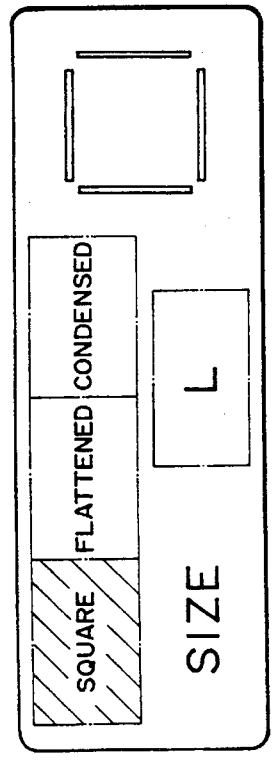

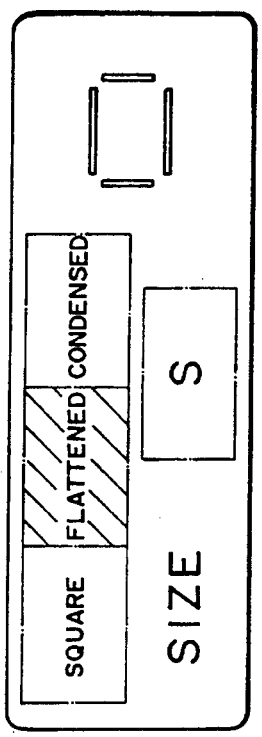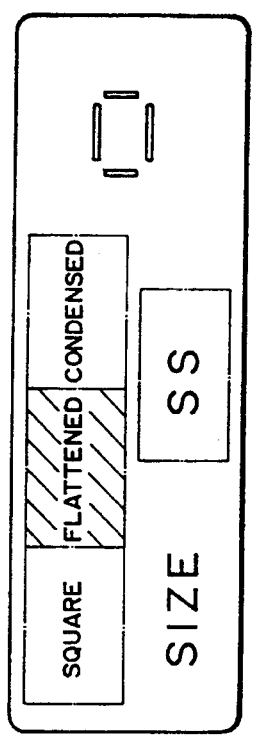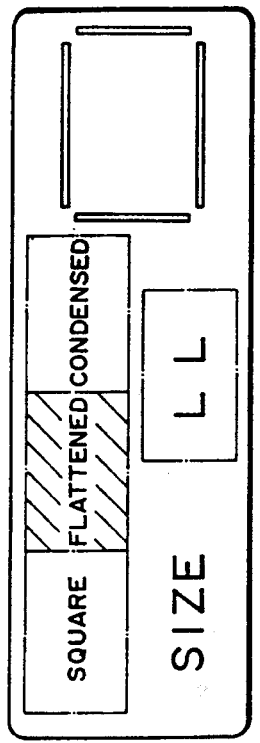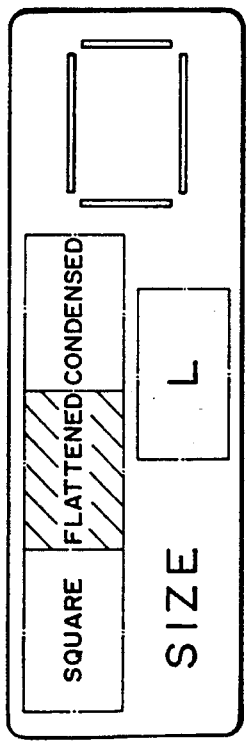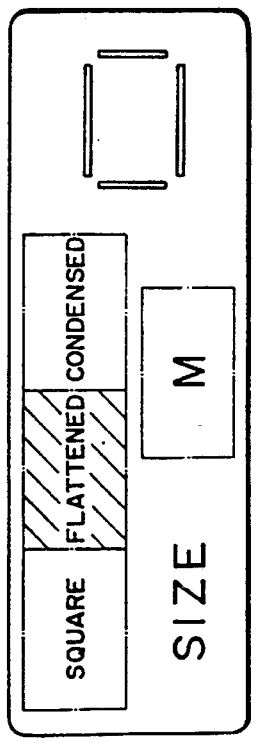

a mm / 0.14062 = a′ dot b mm / 0.14062 = b′ dot a′ dot / REDUCTION MAGNIFICATION = a″ dot b′ dot / REDUCTION MAGNIFICATION = b″ dot Fig. 28A
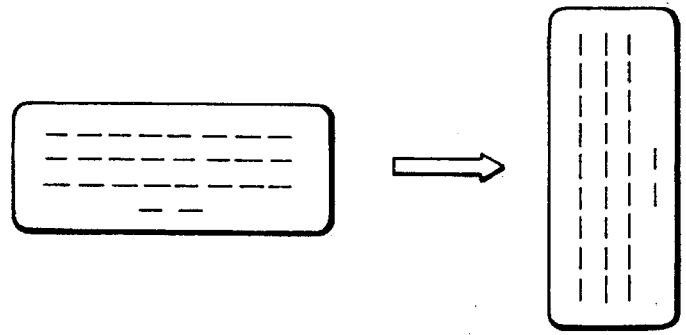
Fig. 28B
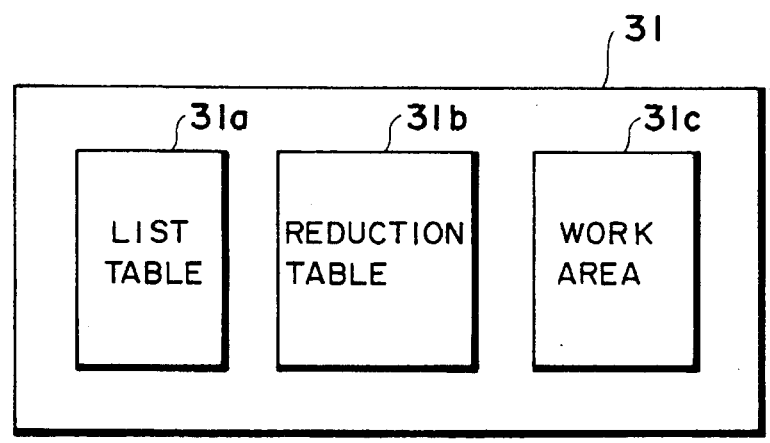
Fig. 28C
| (mm) | (TIMES) |
| --- | --- |
| REFERENCE SIZE DATA | REDUCTION MAGNIFICATION |
| 250 | 20 |
| 185 | 16 |
| 127 | 12 |
| 95 | 8 |
| 64 | 6 |
| 1 | 4 |
REDUCTION TABLE y: VERTICAL MAGNIFICATION
x: HORIZONTAL MAGNIFICATION c'''dot = c''/ REDUCTION MAGNIFICATION
d'''dot = d''/ REDUCTION MAGNIFICATION M: NUMBER OF LABELS IN HORIZONTAL DIRECTION
N: NUMBER OF LABELS IN VERTICAL DIRECTION

Fig. 59

| INPUT KEY | MEMBER LIST |
|---|---|
| ( | （ 「 " [ 〈 { 『 《 【 ' 〔 |
| ) | ） 」 " ] 〉 } 』 》 】 ' 〕 |
| — | — - ~ · ‥ … ‐ = |
| 、 | 、 ． ／ ＼ ： ； ‖ ｜ † ‡ |
| 。 | ． ・ ？ ！ ¶ |

Fig. 60

| INPUT KEY | MEMBER LIST |
|---|---|
| 1 | 1　①　(1)　1.　I　i　一 |
| 2 | 2　②　(2)　2.　II　ii　二 |
| 3 | 3　③　(3)　3.　III　iii　三 |
| 4 | 4　④　(4)　4.　IV　iv　四 |
| 5 | 5　⑤　(5)　5.　V　v　五 |
| 6 | 6　⑥　(6)　6.　VI　vi　六 |
| 7 | 7　⑦　(7)　7.　VII　vii　七 |
| 8 | 8　⑧　(8)　8.　VIII　viii　八 |
| 9 | 9　⑨　(9)　9.　IX　ix　九 |
| 0 | 0　　0.　○ |

LABEL PRINTING APPARATUS AND WORDPROCESSOR

This is a division of application No. 08/029,662, filed Mar. 11, 1993, now U.S. Pat. No. 5,448,695.

BACKGROUND OF THE INVENTION

1. Field of the Invention

The present invention mainly relates to a label printing apparatus for printing information on a label sheet on which a large number of labels having the standardized layout and shape, and the like are adhered.

2. Related Background Art

Identical index labels are often adhered to a large number of samples in, e.g., an exhibition. Strong demand has arisen for suitable filing using index labels corresponding to the kinds of information in diversification of information. In addition, the same information may be shared by a plurality of persons at a plurality of locations. Conventional labels of this type are handwritten to result in cumbersome operations and poor appearance.

In order to solve the above problems, there is provided a printing apparatus capable of efficiently printing the same contents at the upper and lower positions of a ruled label by properly selecting a printing direction (Japanese Utility Model Laid-Open No. 1-178,948).

There is also provided a label printing apparatus for setting an input character count and an input line count to fall within one label and calculating a label count as an integer on one label sheet (Japanese Patent Laid-Open No.61-175722).

There is further provided a label printer for automatically calculating a character size to a full-height, full-width size or a full-height, half-width size, so that characters can be printed within a predetermined label width (Japanese Patent Laid-Open No. 63-189276).

There is further provided a label printer capable of inputting a printing format of a label as a single slip and printing information on labels having different sizes (Japanese Patent Laid-Open No. 62-158072).

In the device of Japanese Utility Model Laid-Open No. 1-178948, processing for properly printing information on one index label is described in detail, but no description is made for an operation for detecting the positions and sizes of a plurality of index labels and a control method of printing information on each label.

The prior arts described in Japanese Patent Laid-Open Nos. 61-175722, 63-189276, and 62-158072 are associated with the way of properly printing information on one label, but not with the way of printing information on a large number of labels arranged on a label sheet.

In a conventional label printing apparatus, information is printed on each individual label with a character size designated beforehand. However, since the kinds of labels are several hundreds, the character size must be selected in accordance with the size of each individual label. In addition, the character size must be changed in accordance with the character count and line count of characters to be printed. An operation for setting these conditions is so cumbersome as to perform printing in accordance with the desired layout of a user.

SUMMARY OF THE INVENTION

It is an object of the present invention to provide a label printing apparatus capable of printing a character string in a proper state on a large number of labels adhered on a label sheet.

It is another object of the present invention to provide a label printing apparatus capable of eliminating cumbersome character size setup required for properly performing printing on a desired label.

According to an aspect of the present invention, there is provided a label printing apparatus for inputting a desired character string with keys and printing the input character string in units of labels arranged on a label sheet, comprising a storage means and a processing means.

The storage means stores label information for specifying a size, a layout position, and the like of each of the labels arranged on the label sheet, identification codes corresponding to various pieces of label information, and character size information defining a plurality of character sizes as character sizes subjected to printing.

The processing means comprises:

- a first processing means for specifying label information corresponding to an input identification code;
- a second processing means for discriminating a printing area of the label from the specified label information, comparing a vertical length of the printing area with a horizontal length of the printing area to determine a smaller one of the vertical and horizontal lengths as a reference length, and selecting a maximum character size falling within a square area having one end as the reference length from the character size information;
- a third processing means for calculating a horizontal length of a generated character string when the horizontal length of the selected character size is defined as a reference and every time an input character count is increased/decreased; and
- a fourth processing means for always comparing the horizontal length of the generated character string with the horizontal length of the printing area of the label, selecting a character size smaller than a character size of the character string from the character size information when the horizontal length of the character string is larger than that of the printing area, and changing all character sizes to this small character size.

Of the first to fourth processing means, the third processing means calculates the horizontal length of the generated character string in units of lines when the number of characters input to each line is increased/decreased, and the fourth processing means can select a character size smaller than a character size of the character string and change the character sizes of all lines to this small character size when the fourth processing means always compares the horizontal length of the generated character string with the horizontal length of the printing area of the label in units of lines, and a line in which the horizontal length of the character string is larger than that of the printing area is present.

When this processing is executed in the third and fourth processing means, a fifth processing means may be provided.

The fifth processing means adds the vertical lengths of the character sizes determined by the fourth processing means to obtain an overall length of all the lines, compares the overall length with the vertical length of the printing area of the label, selects a character size smaller than the character string when the overall length is larger than the vertical length of the printing area, and changes the character sizes of all the lines to this selected small character size.

The label sheet used in the label printing apparatus having the above arrangement basically has standard vertical and horizontal lengths of labels arranged on the label sheet and standard layout positions of labels on the sheet in accordance with the type of label sheet. Identification codes are assigned to the standards, respectively.

Note that the any labels can be used if they can be separated from the label sheet. For example, labels may be detachably adhered on the label sheet, may be cut from the label sheet, or the like.

According to another aspect of the present invention, there is provided a wordprocessor, comprising:

a keyboard having keys assigned with characters, symbols, and numbers, cursor shift keys, a conversion key, and a confirmation key;

a display means for displaying data input from the keyboard;

a storage means for storing a plurality of symbols or numbers in divided groups;

a forty-ninth processing means for displaying on the display means a symbol or number assigned to a depressed key as non-confirmed data when a key assigned with the symbol or number of the keyboard is depressed;

a fiftieth processing means for reading out all data of the same group as that of the non-confirmed data and displaying all the data as a selected data group upon depression of the conversion key; and a fifty-first processing means for confirming desired data as input data replacing the desired data with the non-confirmed data, and displaying the non-confirmed data as the desired data on the display means after the cursor shift keys are operated to move a cursor to the desired data in the selected data group displayed on the display means and the confirmation key is depressed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIGS. 16A. 16B, and 16C are views for explaining messages displayed when line overflow occurs;

FIG. 17 is a view for explaining a state in which an overflow mark is displayed within a character string;

FIG. 19 is a view showing the contents of a character size up table;

FIGS. 20A to 20F are views showing display contents in character size change processing;

FIGS. 21A to 21E are views showing display contents in character size change processing;

FIG. 59 is a view showing group formation of a conversion table; and

FIG. 60 is a view showing group formation of the conversion table.

DETAILED DESCRIPTION OF THE PREFERRED EMBODIMENTS

Figure 1:
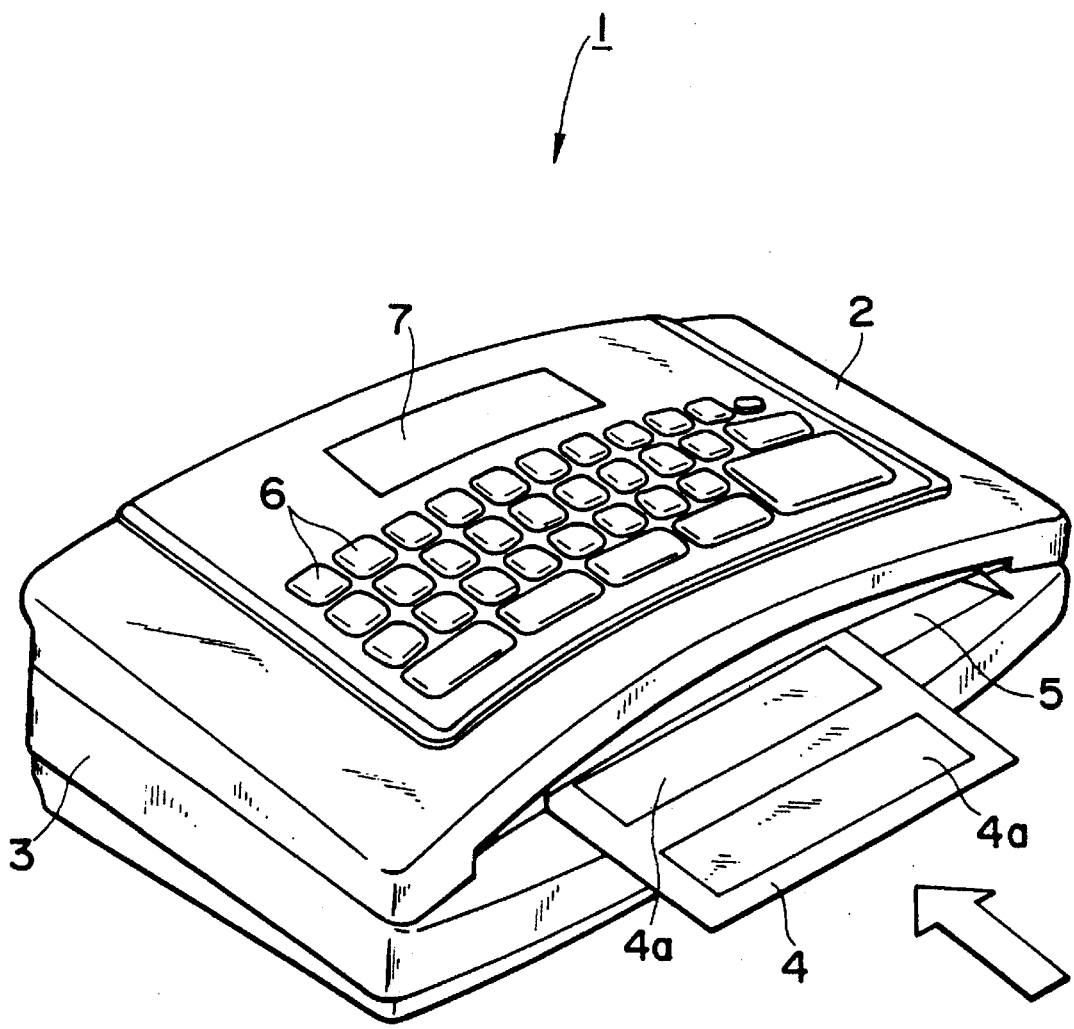
FIG. 1 is a perspective view showing the outer appearance of a label printing apparatus according to the present invention.
Figure 2:
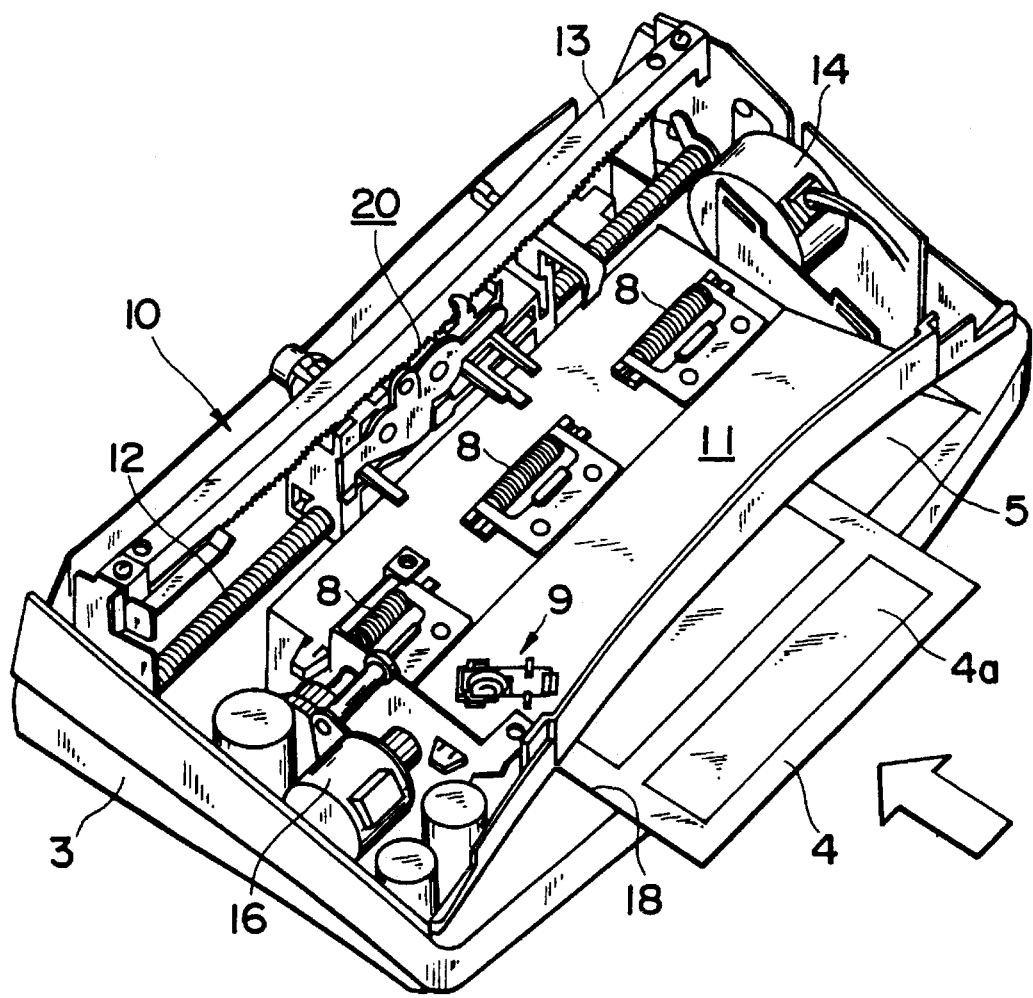
FIG. 2 is a perspective view showing the internal mechanism of the label printing apparatus.
Figure 3:
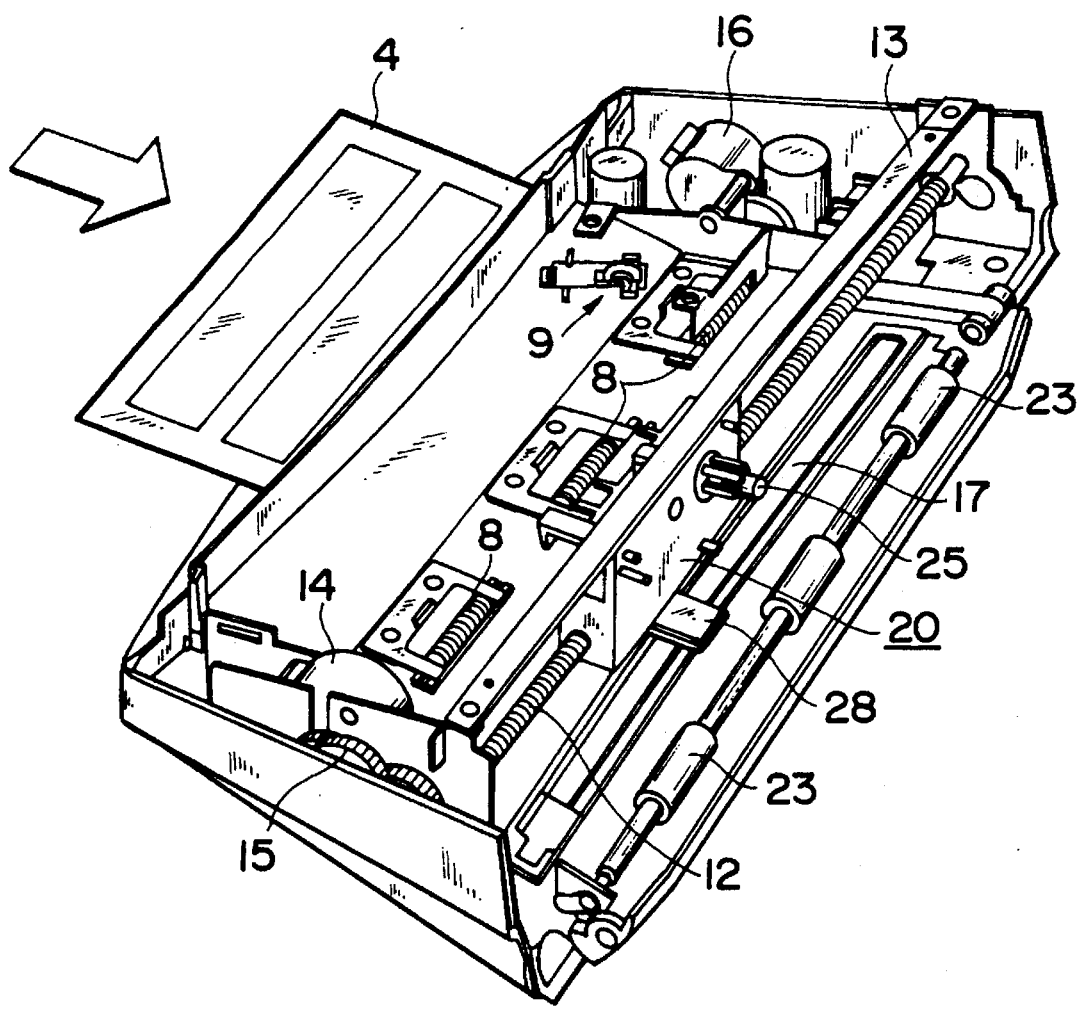
FIG. 3 is a perspective view showing the internal mechanism of the label printing apparatus.

Preferred embodiments of the present invention will be described in detail with reference to the accompanying drawings.

<First Embodiment>

FIGS. 1 to 4 show the outer appearance and the internal mechanism of a label printing apparatus 1. The label printing apparatus (to be referred to as an apparatus thereinafter) 1 is an apparatus for performing printing on a large number of labels 4a regularly arranged on a label sheet 4. The apparatus 1 comprises an upper half 2 and a lower half 3. An insertion port 5 for the label sheet 4 is formed between the upper and lower halves 2 and 3.

Figure 4:
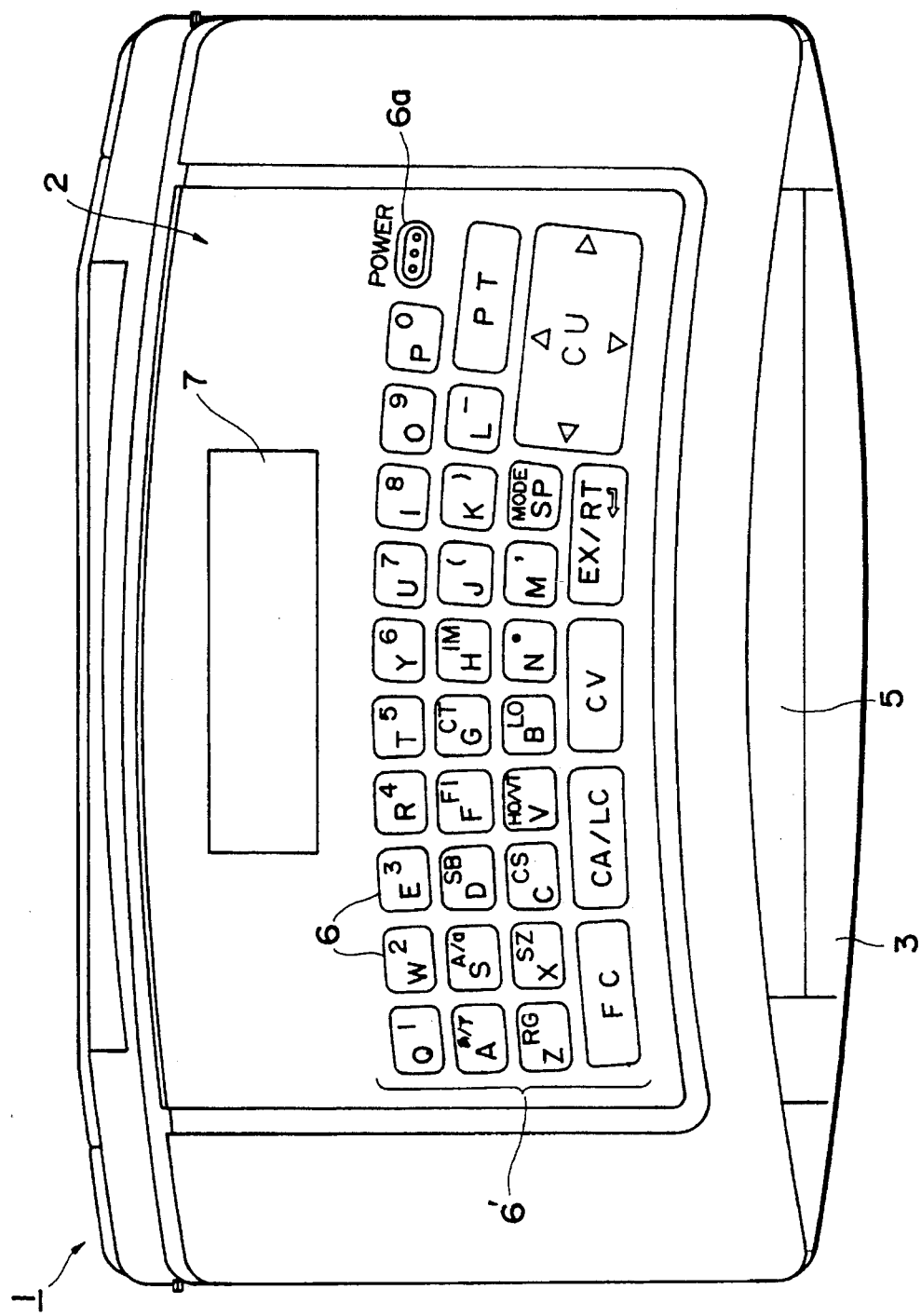
FIG. 4 is a plan view showing the key layout of the label printing apparatus.

A large number of keys 6 which can be used to input characters or the like are arranged in the upper half 2 of the apparatus 1. A liquid display unit 7 consisting of a liquid crystal panel for displaying a predetermined character count, a line count, or an input character string is arranged above the keys 6. The screen of the liquid display unit 7 is scrolled in four directions when the character and line counts exceed the size of the screen. The keys 6 include character keys such as the alphabet, function keys such as "function" (CV in FIG. 4), "cancel" (CA/LC in FIG. 4), "conversion" (CV in FIG. 4), "execution" (EX/RT in FIG. 4), and "print" (PT in FIG. 4) keys, and cursor keys as arrow keys representing four directions. Further, as shown in FIG. 4, some of the alphabet keys respectively have special functions executed by depressing together with the depression of the function key. The functions are referred by symbols shown in on the upper right side of in the top of the key. For example "RG" shows the region determination, "SZ" shows the changing size, "CS" shows the character string, etc. The contents of the keys are marked on their key tops.

The insertion port 5 and a feed path 11 extending backward from the insertion port 5 are formed in the lower half 3. A guide roller 9 for guiding the inserted label sheet 4 is disposed on the upper surface of the feed path 11. Three paper feed rollers 8 driven and rotated by a sheet feed motor 16 are disposed behind the guide roller 9 to feed the inserted label sheet 4. A printing unit 20 is arranged behind the paper feed rollers 8.

A guide side wall 18 is formed on one side, e.g., the left side of the insertion port 5 and the feed path 11. The label sheet 4 is inserted with the left side being guided along the side wall 18. The apparatus 1 serves as a mechanism for performing printing with reference to the leading end of the left side (i.e., the front left corner portion) of the label sheet 4. The left side of the label sheet 4 abuts against the side wall 18 to position the label sheet 4.

Figure 5:
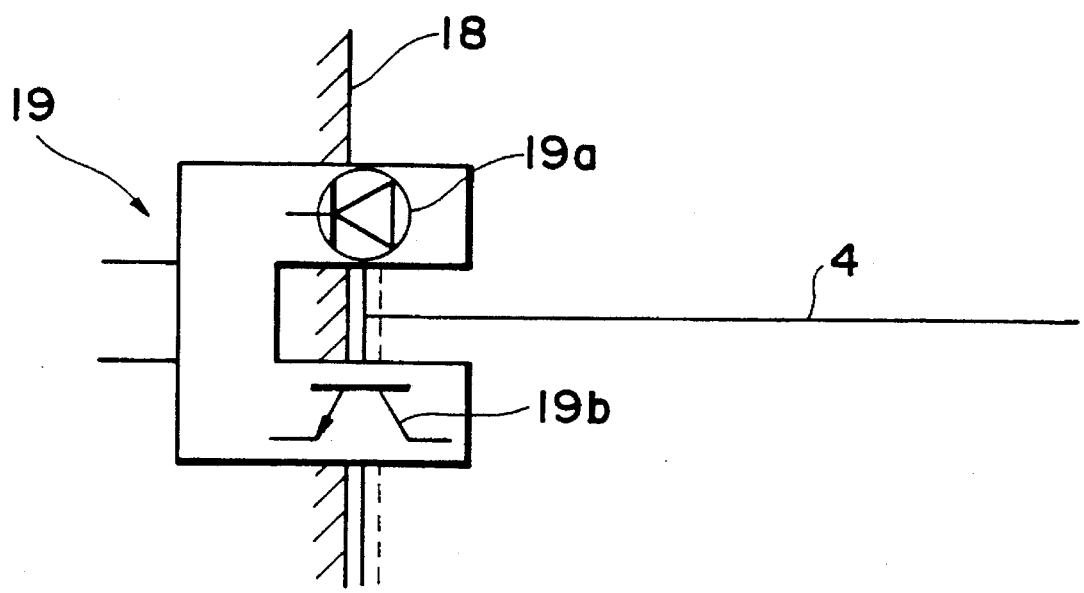
FIG. 5 is a view showing an arrangement of a sheet sensor.

A sheet sensor 19 of a photointerrupter or the like constituted by a pair of a light-emitting element 19a and a light-receiving element 19b on the upper and lower surfaces is arranged on the side wall 18 at the downstream position of the feed path of the feed rollers 9 so as to detect whether feeding is accurately performed, as shown in FIG. 5. That is, while the fed sheet is interposed between the light-emitting element 19a and the light-receiving element 19b and light from the light-emitting element 19a is received by the light-receiving element 19b, the sheet sensor 19 recognizes that the left side of the label sheet is in contact with the side wall 18. In this case, the sheet sensor 19 determines that an appropriate feed state is set.

The lower portion of the printing unit 20 is threadably engaged with a spiral shaft 12 extending in a direction perpendicular to the insertion direction of the label sheet 4, and rotation of a carriage motor 14 is transmitted to the spiral shaft 12 through a gear train 15. The printing unit 20 reciprocates along the rotating spiral shaft 12. A rack 13 is supported in the upper portion of the printing unit 20 so as to be parallel to the spiral shaft 12. The teeth of the rack 13 are formed at the lower portion so as to oppose the printing unit 20, so that a gear in the printing unit 20 is meshed with the rack 13. A thermal head 28 consisting of a dot array capable of printing one character extends from the lower portion of the printing unit 20. A rubber platen 17 is disposed in the lower half 3 at the lower portion of the thermal head 28. The printing unit 20 also serves as a cassette holder for mounting a ribbon cassette (not shown) of an ink ribbon. The printing unit 20 includes a take-up shaft 25 for taking up the ink ribbon.

The liquid crystal display unit 7 can display selection screens of an input character string, an edited character string, an identification code, character string information read out from a storage unit 31, and other information.

Figure 6:
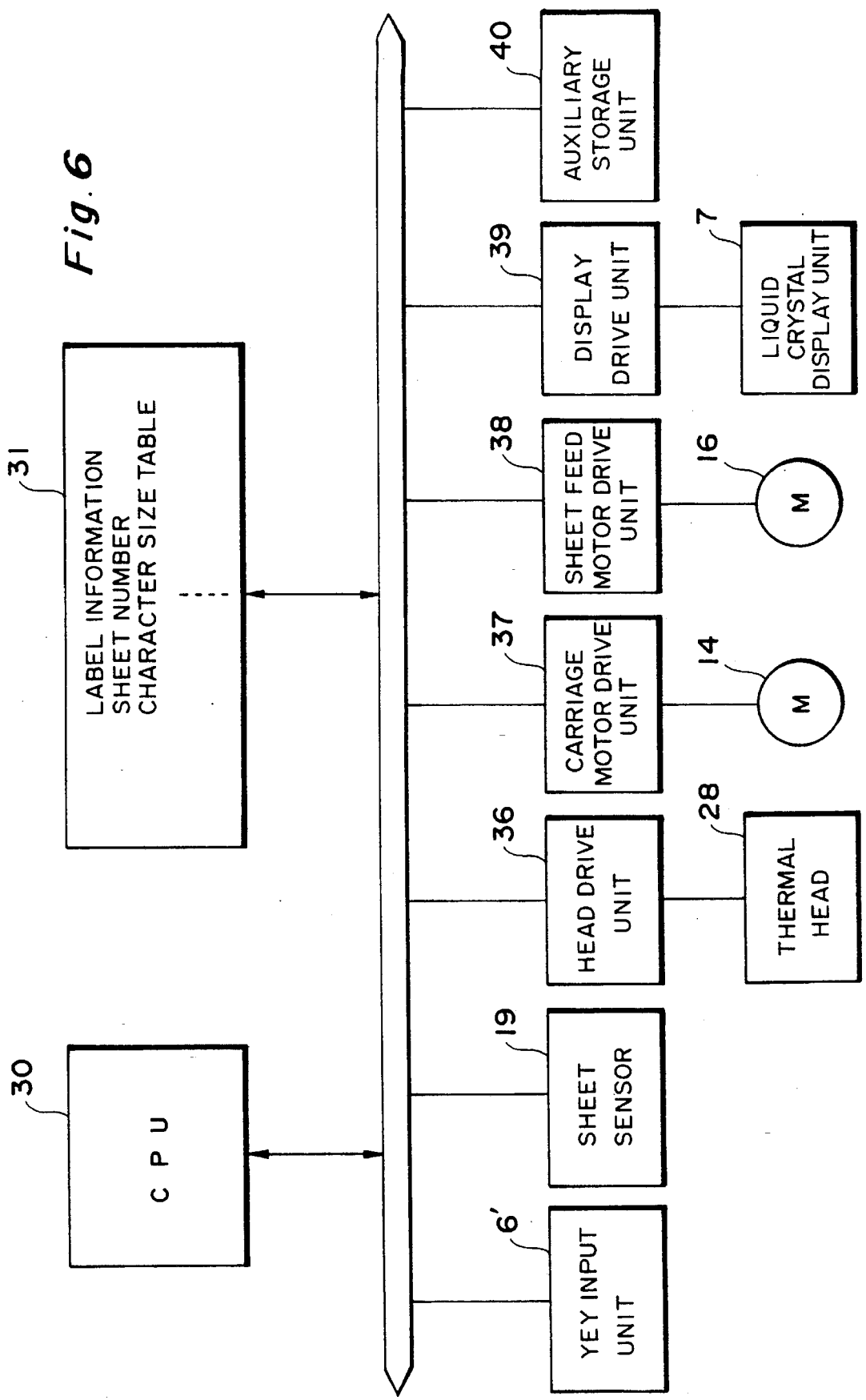
FIG. 6 is a control block diagram of the label printing apparatus.

The control block diagram of the label printing apparatus will be described with reference to FIG. 6.

The apparatus 1 comprises a central processing unit (to be referred to as a CPU hereinafter) 30 for controlling the overall operation of the apparatus, and the storage unit 31 constituted by a ROM, a RAM, and the like.

The CPU 30 is connected to a head dive unit 36 for driving to bring the thermal head 28 into contact with or separate it from the label sheet and outputting a character signal, a carriage motor drive unit 37 for controlling to drive the carriage motor 14, a sheet feed motor drive unit 38 for controlling to drive the sheet feed motor 16 for synchronously driving the paper feed rollers 8 and paper discharge rollers 23, and a display drive unit 39 for driving the liquid crystal display unit 7.

The CPU 30 has an internal counter for counting the number of sheets and a timer for synchronizing sheet feeding. The CPU 30 receives input information from a key input unit 6' and a detection signal from the sheet sensor 19, outputs control signals to the corresponding circuit sections, and systematically controls a character input, character editing, selection of the type of label sheet, display operations, and printing operations (to be described later).

The CPU 30 monitors the detection signal from the sheet sensor 19. The CPU 30 determines whether insertion and feeding of the label sheet 4 are accurately performed in accordance with whether a detection signal representing the front left corner of the label sheet 4 is input. At the same time, the CPU 30 indirectly measures the position of the label sheet during feeding in accordance with rotation pulses of the sheet feed motor 16 upon generation of the detection signal or with time management.

The storage unit 31 stores a program for controlling the overall operations (e.g., editing and printing) of the apparatus, a kana/kanji conversion dictionary memory, label information representing the layout positions of labels arranged on each type of label sheet, and the vertical and horizontal sizes of the label, a sheet number in the form of an identification code for specifying the type of label sheet, and the following character size table (Table 1):

TABLE 1

| Size Classi- fication | Square Character (6 Types) | Horizontally Elongated Character (5 Types) | Vertically Elongated Character (5 Types) |
|---|---|---|---|
| | (vertical × horizontal; unit: dot) | | |
| SS | 16 × 15 | 16 × 30 | 32 × 15 |
| S | 22 × 22 | 22 × 44 | 44 × 22 |
| M | 32 × 30 | 44 × 66 | 66 × 44 |
| L | 44 × 44 | 44 × 88 | 88 × 44 |
| LL | 66 × 66 | 66 × 88 | 88 × 66 |
| 3L | 88 × 88 | — | — |

Table 1 shows character sizes ranging from the SS size to the 3L size. The types of printable label sheets are of several hundreds in the label printing apparatus 17. of this type. A large number of character sizes subjected to printing are required. The horizontally elongated characters and the vertically elongated characters can be designated in addition to the square characters. In this manner, the selection jobs can be facilitated by selecting character sizes using size classification symbols.

Various shapes of label sheets for a general quadrangular label, a ruled label, a tack index label, a box label, and a cassette label are available. In addition, there are various adhesion positions on label sheets, which are respectively standardized. Referring to FIG. 6, an external input/output device such as an extension cartridge represented as an auxiliary storage unit 40 is connected to the apparatus in FIG. 6. It is possible to register new types of label sheets and non-standard formats when the types of label sheets are to be increased, or printing is to be performed on a desired non-standard label sheet.

Figure 7:
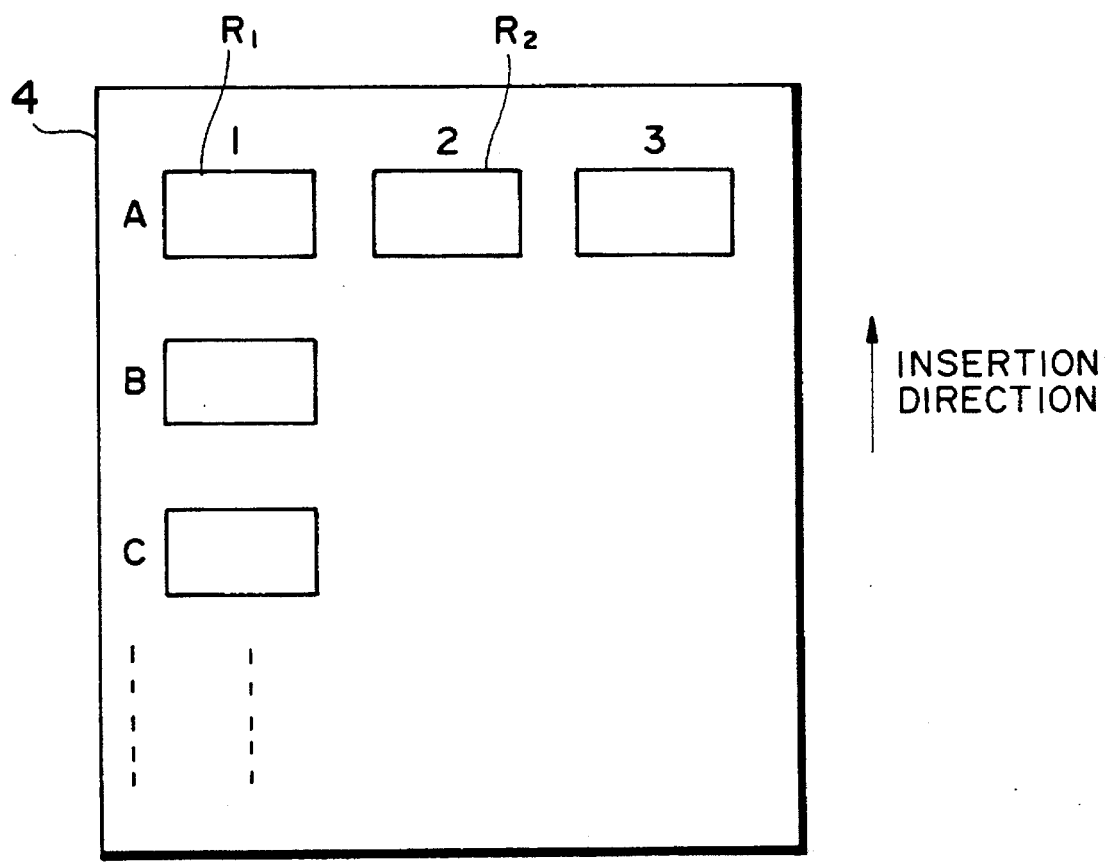
FIG. 7 is a plan view showing the positional relationship of labels on a label sheet.

FIG. 7 shows a relationship between a label sheet and labels. Labels $R_1$, $R_2$, ... having the same size are regularly adhered on a label sheet 4 at predetermined intervals. The label positions on the label sheet 4 are designated as 1, 2, 3, ... in the column direction, and A, B, C, ... in the row direction. Note that the numbers or letters representing the label positions are preferably marked on the label sheet 4.

The sheet number is selected by inputting an identification code consisting of one character or two characters (including a number), thereby facilitating the selection job. A table (not shown) in which sheet numbers are stored in this embodiment represents sheet numbers as label sizes. The table stores sizes with reference to the corner position as the leading end of the left side of the label sheet 4 which is detected by the sheet sensor 19. The sizes are determined by data required to specify label positions on a label sheet from the horizontal and vertical lengths of a label sheet, the shape of a label, the vertical and horizontal lengths of a label, vertical and horizontal intervals between the labels, and the number of labels on one label sheet. If only position data of the printing start point with reference to the front end of the left side of the label sheet is used in place of the above lengths and intervals, the memory capacity can be reduced. The sizes are designated in units of millimeters (mm). In this embodiment, the sizes are coded to reduce the memory capacity. The CPU 30 calculates a printing position, i.e., the label position on the basis of the stored size data of the designated sheet number (identification code) to be described later.

The table which stores the sheet numbers includes cut sizes. The cut sizes define blank sizes of the peripheral label portions which are not subjected to printing. First, a system for actually measuring a label position and performing printing is not employed, but a simple system for controlling all positions with reference to the corner position of the label sheet is employed. Information can be property printed within each label even if a small feed error of the sheet by the paper feed rollers 8 and the like occurs. Second, the same effect as described above can be obtained when the label size is stored in a size slightly smaller than the actual size. In this case, an image character (on the screen) does not coincide with the actually printed character, resulting in inconvenience.

Various operations for inputting characters in the apparatus 1 will be described below.

Figure 8A:
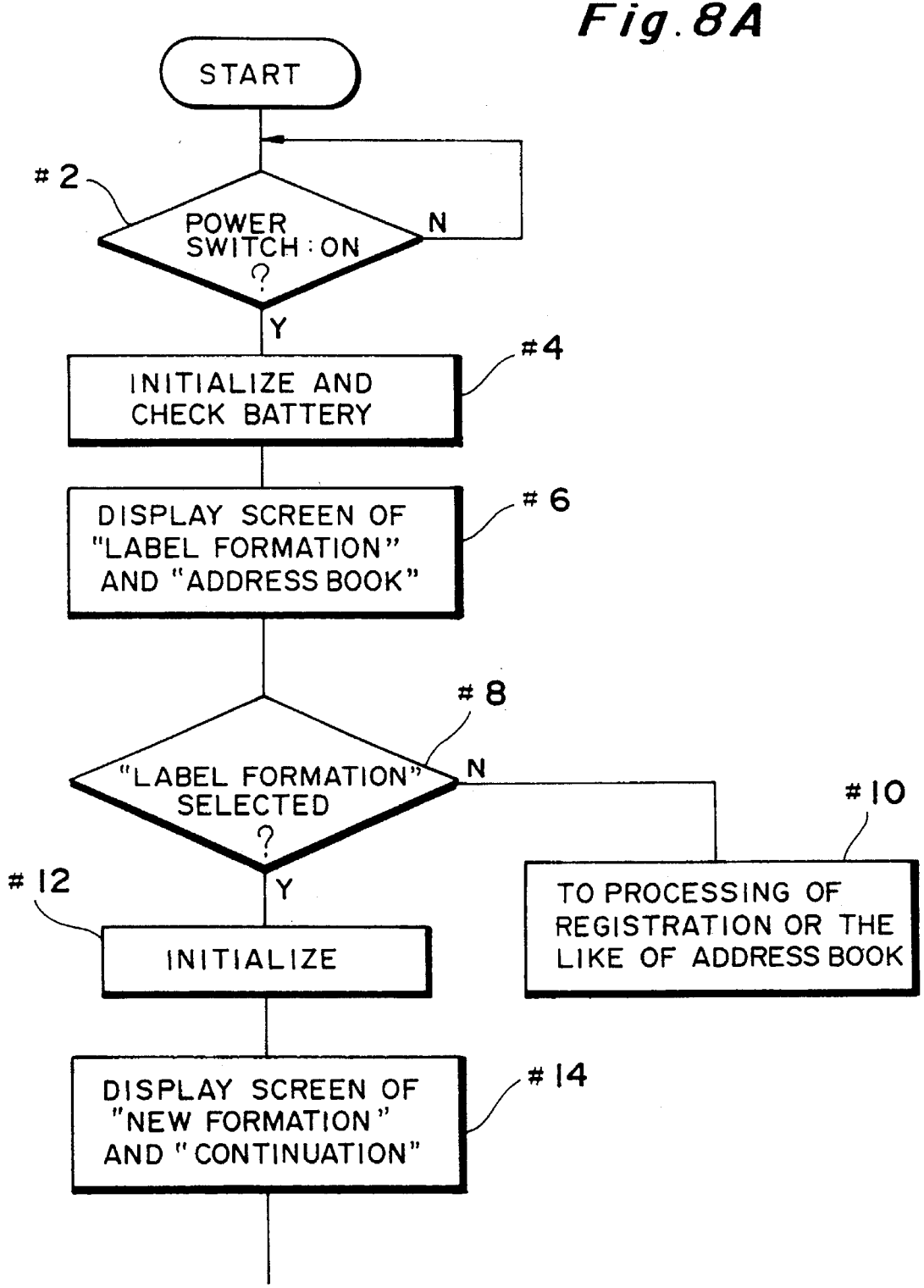
FIG. 8 is a flow chart showing an operation sequence for a start screen.
Figure 8B:
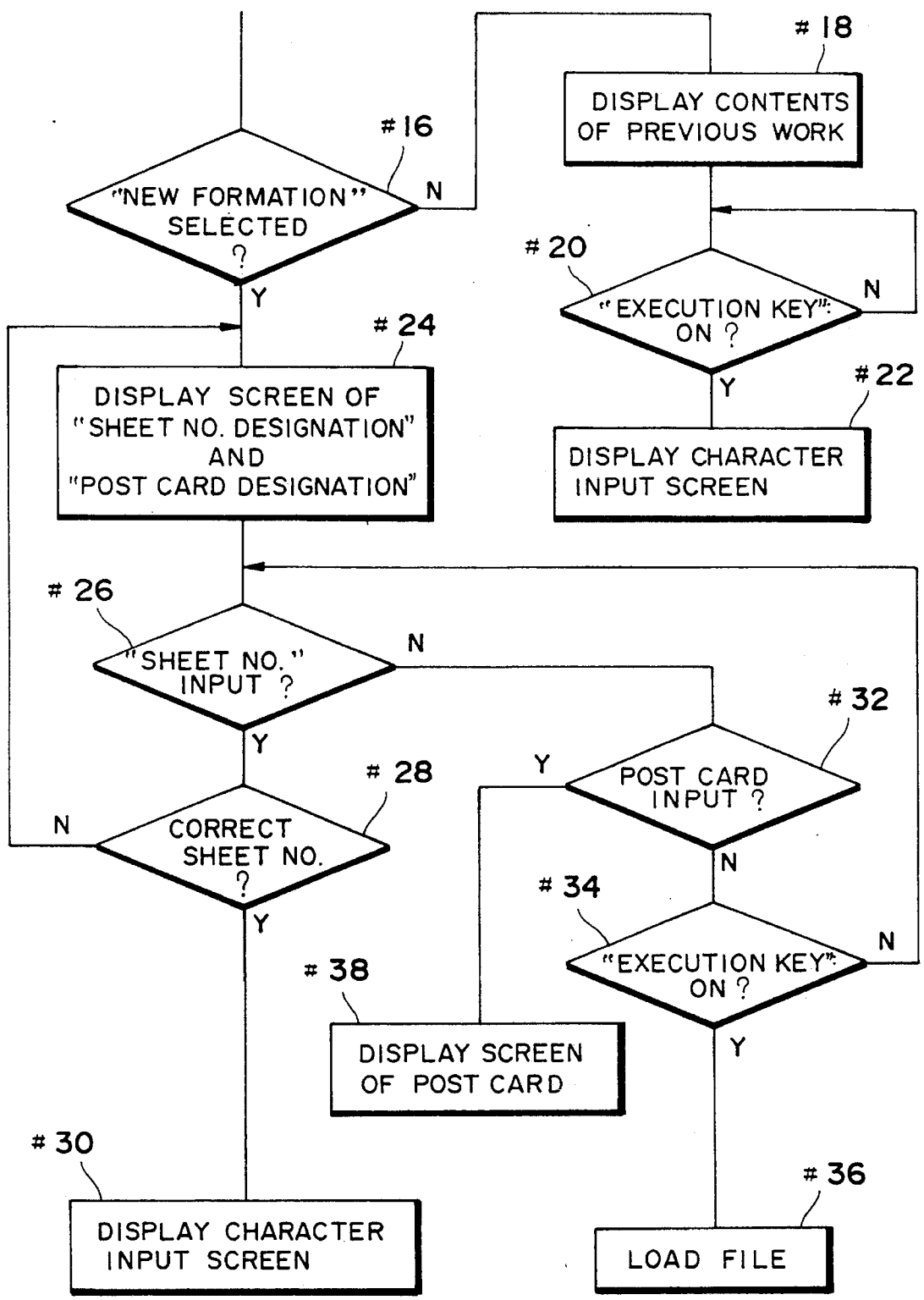

The basic sequence for a start screen will be described with reference to a flow chart in FIG. 8.

When a power switch 6a is turned on (#2), the RAM in the storage unit 31 is initialized, the printing unit 20 is set to the initial position, hardware is initialized, and the built-in battery is checked (#4).

The initial screen including selection menus of "label formation" and "address book" is displayed on the liquid crystal display unit 7 (#6). The cursor keys are used to shift the cursor to the position of the desired item, and the "execution" key is depressed, thereby obtaining the next work screen. The CPU 30 determines which item is selected and designated (#8). If the selection menu of "label formation" is selected, necessary initialization is executed (#12). During this operation, a message such as "Please wait" is displayed on the screen. On the other hand, the selection menu of "address book" is selected, the current screen is switched to a work screen for registering, changing, and retrieving a name, a telephone number, and an address (#10).

When the selection menu of "label formation" is selected and the above initialization is completed, selection menus of "new formation" and "continuation" are displayed on the screen (#14). The CPU 30 determines which selection menu is selected and designated (#16). If the selection menu of "continuation" is selected, the contents of the previous work are displayed on the screen (#18). If a character string has already been formed, a sheet number or the like is displayed. If a post card has already been formed, a message indicating this is displayed. When the "execution" key is depressed (#20), the previous work screen is displayed, so that the user can input a character (#22). In this manner, since the previous work contents are stored in the RAM of the storage unit 31, the interrupted work can be easily restarted.

On the other hand, when the selection menu of "new formation" is selected ("YES" in #16), the screen is switched to a screen for designating a label sheet so as to form a new character string (#24). When a desired sheet number (identification code) is input ("YES" in #26), the CPU determines whether this sheet number is present in the table in the ROM in the storage unit 31 (#28). If the designated sheet number is present, the screen is switched to a character input screen (#30). If not, a message such as "This sheet is not registered" is displayed for three seconds, and the previous designation screen (#24) is restored.

On the other hand, when the user does not know a registered sheet number, he depresses the "execution" key without entering any input ("NO" in both #26 and #32 and "YES" in #34), and the screen is switched to a file load screen (#36). At this time, when a character string to be loaded is selected, this character string information is displayed on the screen together with its sheet number.

When the selection menu of "post card" is selected on the screen in #24 ("YES" in #32), the screen is switched to a screen of "direction designation of sentence". When the user designates the direction of a sentence and depresses the "execution" key, the screen is switched to a normal character input screen (#38). Since a character input method after #22, #30, #36, and #38 is almost the same as that of a conventional wordprocessor, a detailed description thereof will be omitted.

After the initial conditions are set as described above, a desired character string is formed on the character input screen. In this apparatus 1, the character size is automatically set in accordance with the numbers of characters and lines of an input character string. Automatic setup of this character size is to automatically set the size of characters which can be properly printed within the label in accordance with the character string input on the character input screen. The character size is selected from those in Table 1.

The automatic setup processing of the character size will be described with reference to flow charts in FIGS. 9 and 10.

Figure 11A:
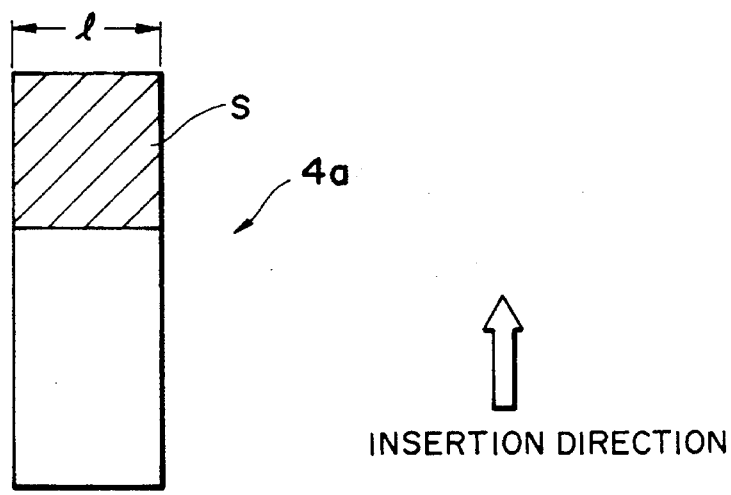
FIGS. 11A and 11B are views for explaining a method of setting initial values of character sizes in correspondence with label shapes.
Figure 11B:
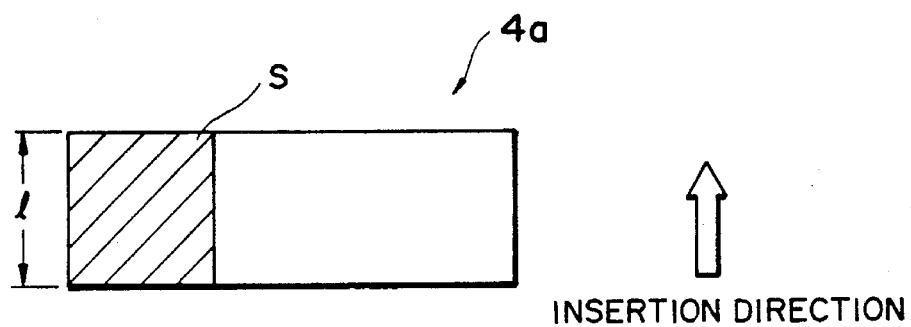

The initial value of the character size is set. In the initial setup described above, a label to be used is specified (#102), and a printing area in the label is determined on the basis of this label information. The vertical length of the printing area is compared with the horizontal length of the printing area (#104). By this comparison, the shorter length is selected. If the horizontal length is smaller than the vertical length, as shown in FIG. 11A, a square area S having the horizontal length l as one side is assumed (#106). However, when the vertical size is shorter than the horizontal size, as shown in FIG. 11B, a square area S having the vertical length l as one side is assumed (#108). The character size corresponding to the character size of a maximum square character falling within the square area S is selected from Table 1. The selected character size is set as the initial value (#110).

After the initial value of the character size is determined, the CPU 30 waits for a character (including a symbol and the like) input. Every time the number of input characters is increased or decreased by one, the horizontal length of the formed character string is calculated. When the character string extends in a plurality of lines, the horizontal length of each line is calculated (#202). The horizontal length of the character string is compared with the horizontal length of the set printing area in units of lines to determine whether the formed character string can be printed within the horizontal length of the set label (#204). If the horizontal length of the character string is larger than the horizontal length of the printing area, a character size smaller than the set character size by one size is selected from Table 1. The character sizes of all the lines are changed to this new character size (#206). Thereafter, the operations in #202 and #204 are repeated. In this manner, an appropriate character size is determined with reference to the horizontal length of each line of the character string and the horizontal length of the printing area.

All the vertical lengths of the lines are added on the basis of the determined character size to obtain an overall vertical length (#208). The overall vertical length is compared with the vertical length of the printing area. The CPU 30 determines whether the formed character string can be printed within the overall vertical length of the set label (#210). If the overall vertical length of the formed character string is larger than the vertical length of the label, a character size smaller than the determined character size by one size is selected from Table 1, and the character sizes of all the lines are changed to this new character size (#212). Thereafter, operations in #208 and #210 are repeated. In this manner, the maximum character size capable of printing the character string within the printing area is finally set. Note that each calculation expression is stored in the ROM of the storage unit 31 in advance, but the calculation result is utilized using a stored conversion table.

The same character size is set for all the lines within the formed character string. Inconvenience caused when different character sizes are set for all lines having different numbers of characters can be solved. When the character size is to be switched from the S size to the SS size smaller than the S size in Table 1, the character size is changed to the SS size of the horizontally elongated character without being unconditionally changed.

This automatic character size setup is always performed when the input character or line state is changed such that the character size already input is changed, that the character appearance attribute already input is changed, or that a line feed or deletion of a line feed is performed.

Each character size can be manually set to a specific size in advance or as needed. In this case, in #202, the horizontal length of the manually set character is added to the horizontal length of each automatically set character to calculate the length of the character string in units of lines. In #208, characters each having the maximum vertical size are extracted from all the lines and are added to each other.

<Second Embodiment>

As described above, although the character size is automatically set, a spacing between characters to be printed, i.e., a character spacing can be automatically set constant in an apparatus 1 of this embodiment (character spacing assigning means).

Automatic character spacing setup will be described with reference to a flow chart in FIG. 12. Symbols used in this flow chart are defined below with reference to FIG. 13. FIG. 13 shows one label 4a on which characters having different sizes are printed in hatched portions.

$l_n$ : a spacing between the end portion of the printing area and the most leading or trailing portion on the nth line $k_n$ : a character spacing on the nth line q: a spacing between the end portion of the printing area and a character having a maximum vertical length on the uppermost or lowermost line p: a line spacing (i.e., a spacing with reference to a character having a maximum vertical length)

Figure 12A:
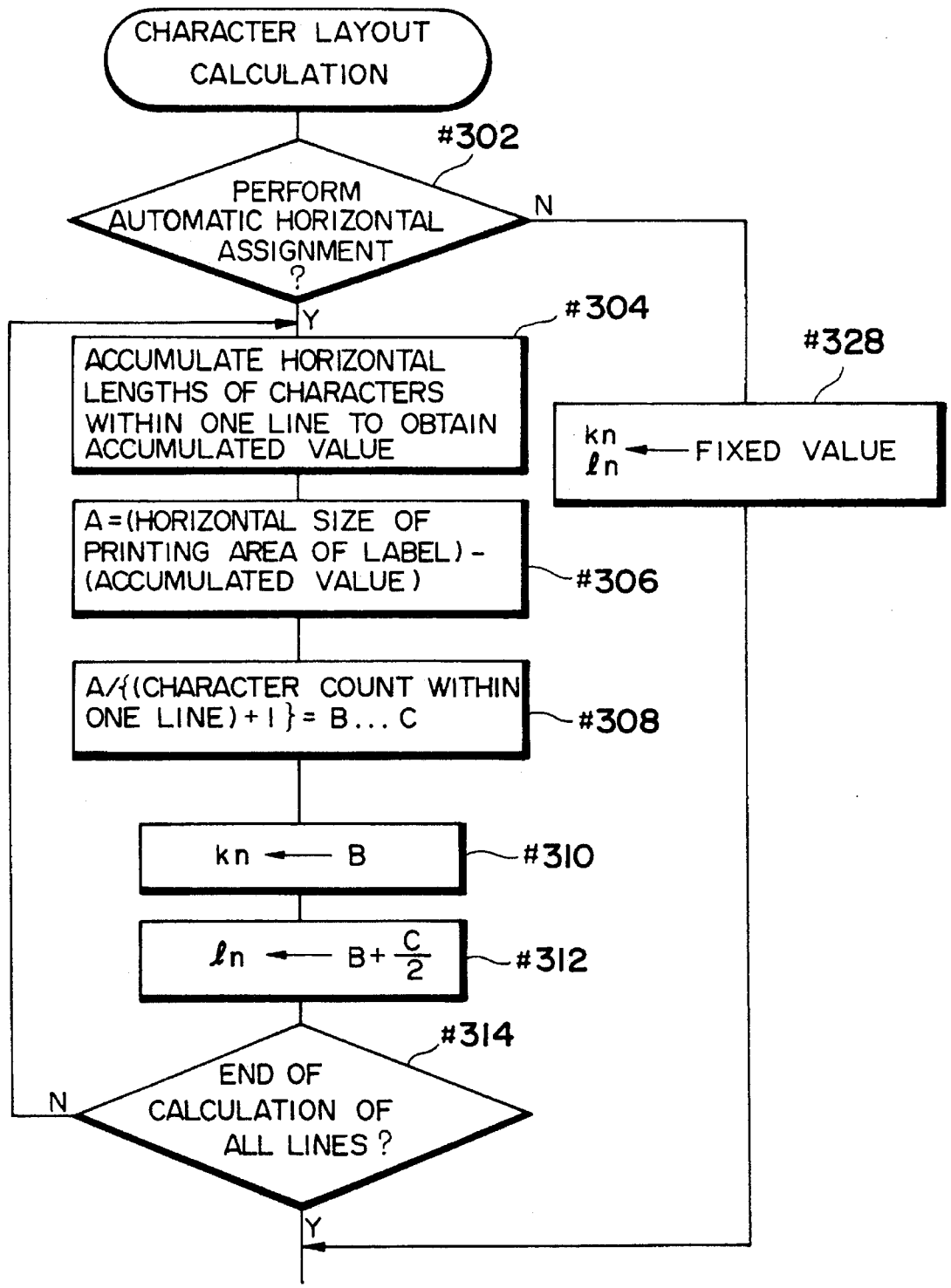
FIG. 12 is a flow chart for explaining automatic setup of a character spacing and a line spacing.
Figure 12B:
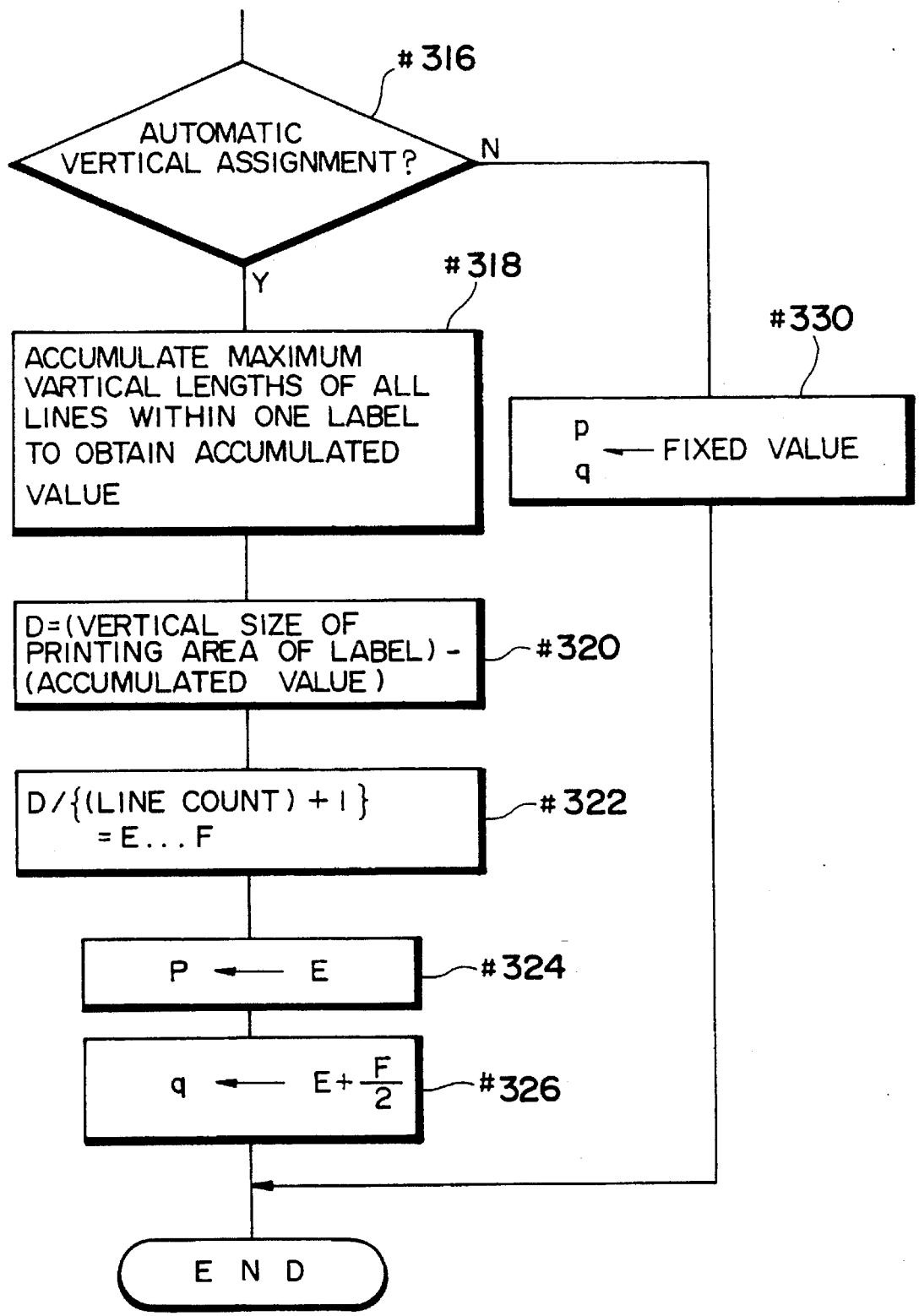
Figure 13:
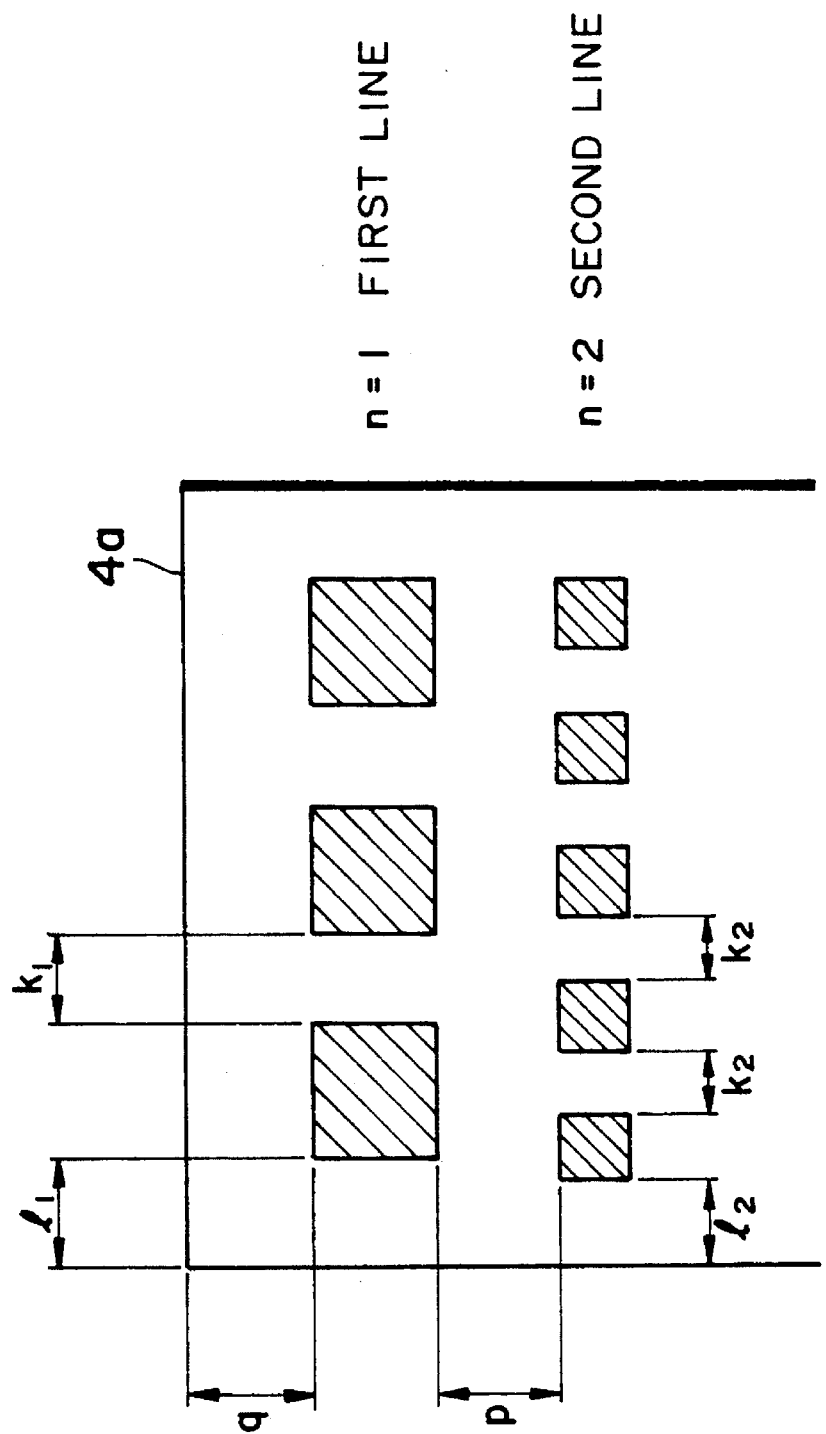
FIG. 13 is a schematic plan view for explaining the relationship between lengths (e.g., a character spacing and a line spacing) of the respective portions of a label subjected to printing and the symbols representing these portions.

Referring to FIG. 12, when automatic character spacing setup is to be performed ("YES" in #302), the horizontal lengths of the input characters are added to each other to obtain an overall horizontal length of each line (#304). At this time, when the automatically set character is mixed with the manually set character, the horizontal lengths of both the automatically and manually set characters are added to obtain a sum. The operation in #304 is the same as that in #202 for automatic character size setup. For this reason, every time the number of input characters is increased or decreased by one or the character size is changed, the operation in #504 is performed.

Figure 9:
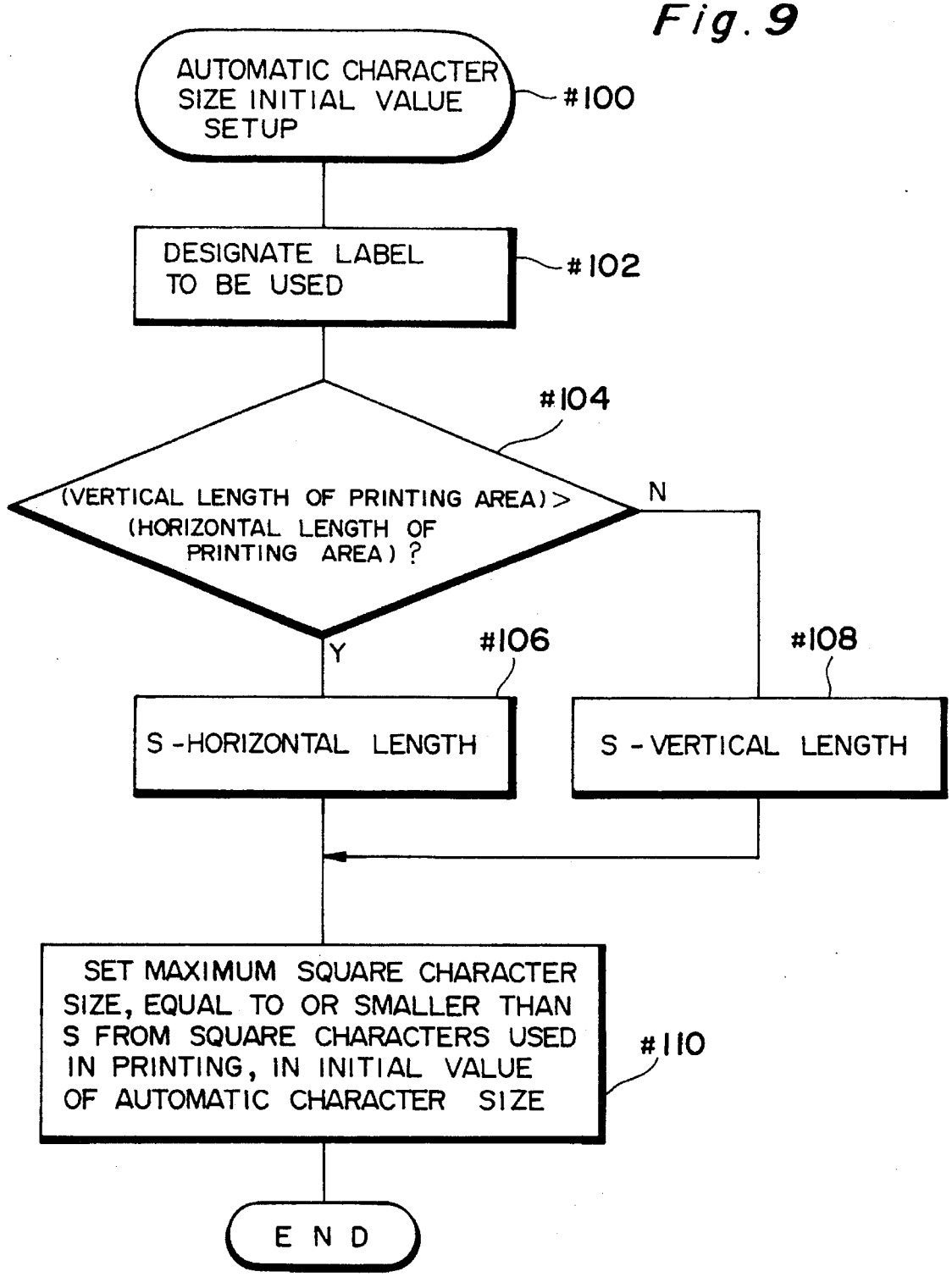
FIG. 9 is a flow chart for explaining initial value setup of character sizes in automatic character size setup.
Figure 10:
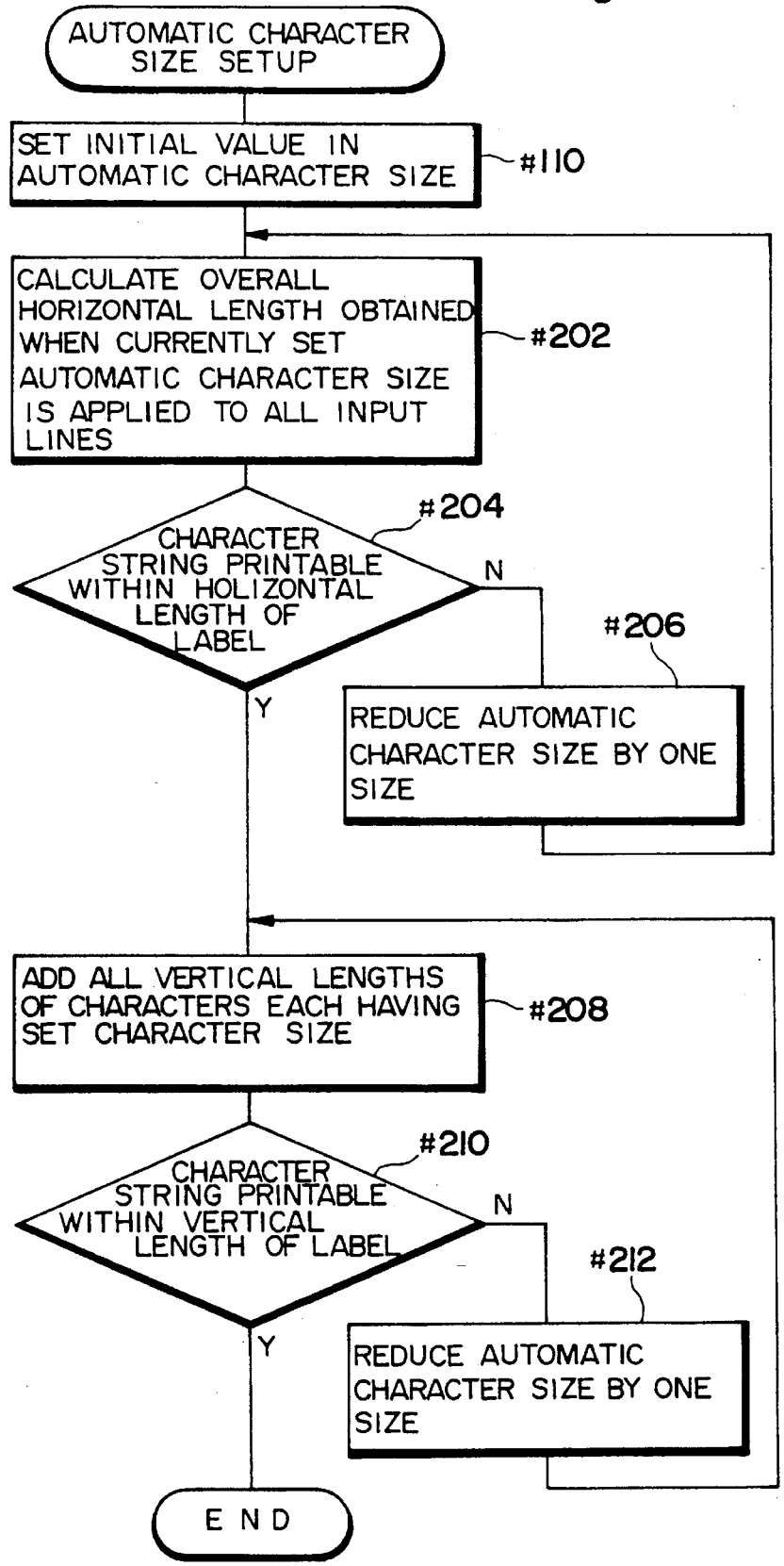
FIG. 10 is a flow chart for explaining automatic character size setup.

On the other hand, the horizontal length of the printing area is already obtained in the flow (FIG. 9). The sum of the length of the characters, which is calculated in #304, is subtracted from the horizontal length of the printing area (#306). Therefore, a horizontal length A of the blank area formed in the printing area is obtained.

The value of the length A is equally assigned between the characters. In this case, the value of the length A is divided by a value obtained by adding 1 to the character count, so that the blank areas each having the same length as the character spacing are formed at the leading and trailing portions of the character string. As a result, a quotient B and a remainder C are obtained (#308), and the quotient B is obtained as a character spacing $k_n$ of the target (#310). If the remainder C is obtained, it is divided into halves which are assigned as character spacings ($l_n$) formed at the leading and trailing portions of the character string (#312). If any other line subjected to character spacing setup is present (i.e., "NO" in #314), control is shifted to the line subjected to character spacing setup, and the operations in #304 to #312 are repeated.

As described above, the character spacings of all the lines in the horizontal direction are equally set ("YES" in #314). In the apparatus 1, if a character string extending in a plurality of lines is present within the printing area ("YES" in #316), the line spacings can also be equally assigned (line spacing assigning means).

A character size having a maximum vertical length is extracted in units of lines. The extracted vertical lengths of the character sizes are added to each other to obtain a sum of the vertical lengths of all the lines (#318). The operation in #318 is the same as that in #208 for automatic character size setup. For this reason, when the maximum character size of each line is changed, i.e., when a line feed or deletion of a line feed is performed or an input character or line state is changed, the operation in #318 is always performed.

The sum of the vertical lengths of all the lines, which is calculated in #318, is subtracted from the vertical length of the printing area. Therefore, a vertical length D of a blank area formed within the printing area is obtained (#320).

The value of the length D is equally assigned between the lines. In this case, the value of the length D is divided by a value obtained by adding 1 to the line count to obtain a blank area having the same width as that of the line spacing above the uppermost line or below the lowermost line. As a result, a quotient E and a remainder F are obtained (#322). The quotient is determined as a line spacing p (#324). If the remainder F is present, it is divided into halves which are assigned to line spacings q formed above the uppermost line and below the lowermost line (#326).

The apparatus 1 can automatically set the character and line spacings as described above. However, specific character and line spacings can be manually set by the user. In manual setup, either the character spacing or line spacing is manually set, and the remaining spacing may be automatically set. In the flow chart in FIG. 12, the operation in #328 is performed to manually set the character spacing. The operation in #330 is performed to manually set the line spacing. In this case, the blank calculation described above is not performed.

Processing for equally assigning the character spacing in #306 to #314 and processing for equally assigning the line spacing in #318 to #326 are performed every time a key input representing an end of character editing for one label is detected, i.e., every time the "print" key is depressed, every time a key for displaying an image of the layout of input characters is depressed during editing, or every time an operation for registering the formed character string is performed.

An apparatus 1 shown in this embodiment can perform printing even on a non-standardized label sheet if this sheet can be physically inserted from an insertion port 5. If label information is accurately registered, the character size can be automatically set on a free-size label sheet (printing sheet), the label information (e.g., a label sheet size) of which is set and registered by the user himself, in accordance with the flow chart.

In this embodiment, automatic character spacing setup in units of lines has been exemplified. However, as another processing method, a minimum character spacing set within the printing area can be set as the character spacing of all the lines, and only the spacing $l_n$ with the end of the printing area may be determined every line. In this case, the character spacing $k_n$ on each line is predetermined, so that the print becomes symmetrical about the central vertical line.

Note that when automatic character spacing setup is canceled and printing is performed, printing is performed at a predetermined character spacing which is arbitrarily set. In this case, the printed characters are aligned at the left margin. Similarly, when automatic line spacing setup is canceled, printing is performed at a predetermined line spacing which is arbitrarily set, and the printed characters are aligned at the upper margin.

The processing for equally assigning the character spacing and the processing for equally assigning the line spacing are executed every time a key input representing an end of character editing for one label is detected. However, the above processing is performed every time the number of input characters or lines is increased or decreased or the character size is changed as in automatic character size setup.

<Third Embodiment>

An apparatus 1 always calculates a printable line count on the basis of a label size and a character size. When the user inputs characters or edits a character string on lines exceeding the printable line count, a message indicating this is displayed, thereby inhibiting operations such as a character input or a line feed (line overflow determining means). In addition, in the apparatus 1, overflow characters which cannot fall within one line during current editing (input) are added to the same line after an overflow mark, so that the user can know that the characters do not fall within one line (character string overflow determining means). Therefore, the overflow characters within one line will not be automatically fed to the next line against the will of the user.

Figure 14:
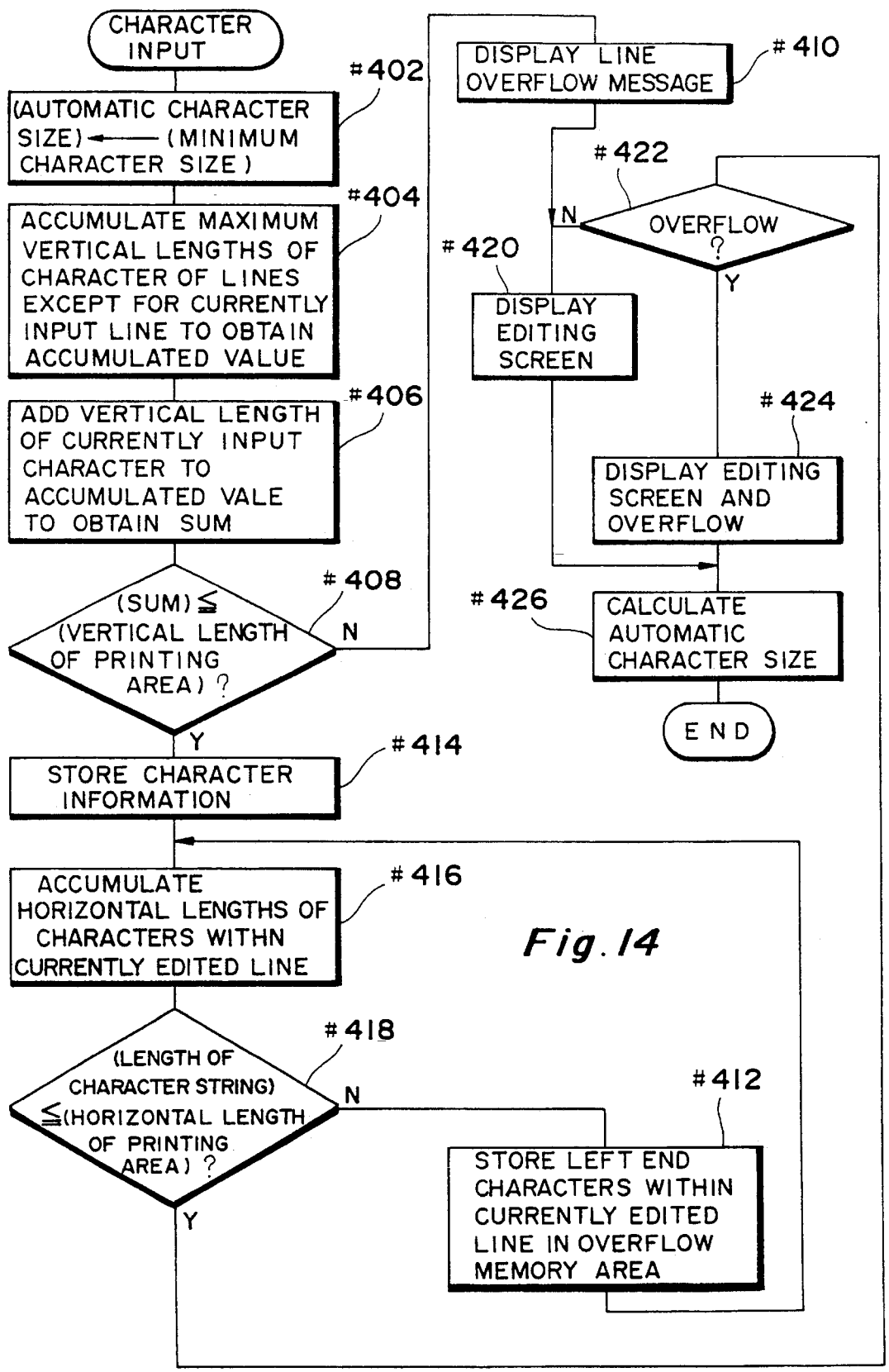
FIG. 14 is a flow chart showing processing when an input character or line count exceeds the size of the printing area.

Processing performed when the number of input characters or lines exceeds the printable character count per line or the printable line count will be described with reference to a flow chart in FIG. 14.

A CPU 30 determines whether input characters can be printed within the vertical length of the printing area of a label currently designated.

Upon reception of a character input from the user, the automatically set character sizes on the line during the current input operation (editing) and the already edited line are changed to the minimum character size in Table 1 (#402). The maximum vertical character sizes of the lines except for the current line are extracted and added to obtain an overall vertical length of all the lines (#404) because characters having arbitrary character sizes may be present in the lines. The overall length obtained in #404 is added to the vertical length of the currently input character size (#406). If the currently input character is an automatically set character, it is the minimum character size. However, if the currently input character is an arbitrarily set character, the vertical length of the arbitrarily set character is added to the overall length obtained in #404. The resultant overall vertical length is compared with the vertical length of the set printing area to determine whether the input characters can be printed within the printing area (#408). If the overall vertical length is larger than the vertical length of the printing area ("NO" in #408), the CPU 30 determines that printing within the printing area is impossible, and a message representing the line overflow is displayed on a liquid crystal display unit 7 for 3 seconds (#410). The screen returns to the editing display screen (#412).

A line overflow message shown in FIG. 16A is displayed when the number of characters is larger than that of the printing area due to the large character size. A line overflow message shown in FIG. 16B is displayed when the size of the confirmed character is changed or the characters overflow the line because of the presence of a frame or underline. When a space capable of printing characters in the printing area is determined ("YES" in #408), a non-confirmed character string before conversion and confirmation is stored as character information in a storage unit 31 (#414).

Various editing operations are performed such that input characters are converted into characters having a predetermined font such as Courier, Roman, etc., and an input character is converted into a character having a predetermined size, thereby sequentially confirming the input characters. Besides, in the apparatus need in Japan, the conversion also may includes a conversion from hirakana to kanji. In this case, every time the input character is confirmed, the operations in #402 to #408 are repeated.

In this editing operation, every time the character is confirmed, it is also determined whether the confirmed character string falls within one line during editing. If the character size is of an automatically set character, since the minimum character size is set in #402, the character size is the overall horizontal length of characters each having the minimum character size. However, when a character having an arbitrarily set character size is included, the horizontal length of this character is added. This value is accumulated every time an input character is confirmed (#416). Thereafter, the accumulated character length is compared with the horizontal length of the printing area (#418). If the accumulated character string length is larger than the horizontal length of the printing area, overflow characters which cannot fall within one line are included in the character string during editing. These overflow characters are sent to an overflow memory area in the storage unit 31 one by one from the right end of the character string within the editing line, so that the overflow characters seem to be erased from the input character string (#420). This processing is repeated until "YES" is obtained in #418. If "YES" in #418, only an input enable character string is present in the input character string, and an overflow portion of the character string is separately stored in the overflow memory area.

If such an overflow character is not present, "NO" is determined in #422, and the character string during editing is displayed on the editing screen (#412).

On the other hand, when an overflow character is present, "YES" is determined in #422, the character string portion stored in the overflow memory area and the character string falling within the one line are displayed on the liquid crystal display unit 7 (#424). As shown in FIG. 17, after the character string falling within the printing area, e.g., "new-business", an overflow mark 50 is displayed in a repeated flickering state of inverse display. A non-confirmed overflow character string such as "promotion-department" as a word is displayed to the right of the overflow mark 50. That is, the confirmed printable characters are located to the left of the overflow mark 50, and the non-confirmed overflow character string to the right of the overflow mark 50 is displayed.

In this manner, the character string which is located on the right side of the overflow mark 50 and does not fall within the printing area is informed to the user. This overflow mark 50 is displayed when the input character size or character appearance attribute is changed or the horizontal length of the input character string exceeds the printing area. When this overflow mark 50 is displayed, the user changes the size of the confirmed characters, or a line feed is performed to feed the character string located on the right side of the overflow mark 50 to the next line. Therefore, a desired character string which falls within the printing area is formed.

Figure 15:
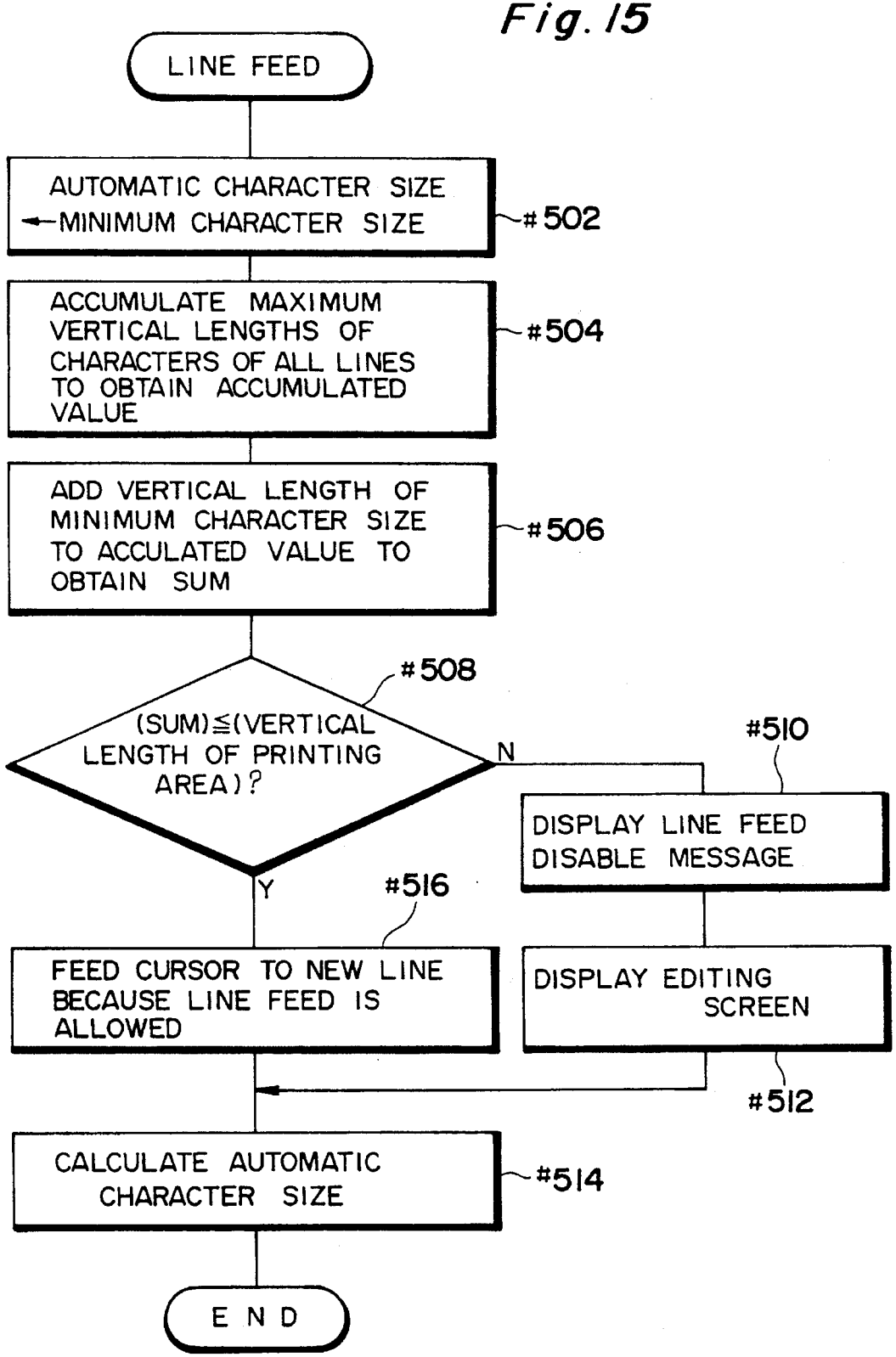
FIG. 15 is a flow chart showing processing when an input line count exceeds the size of the printing area upon a line feed.

Processing performed when the character or line count exceeds the printable horizontal or vertical length has been described above. However, a flow chart for performing a line feed from the lowest line to form a new line is shown in FIG. 15.

In this case, the automatically set character size is changed to the minimum character size in Table 1 (#502), and maximum character sizes of all the lines in the vertical direction are extracted, and the extracted vertical lengths are added (#504). The vertical length of the minimum character size is added to the vertical length obtained in (#504) to obtain an overall vertical length of all the lines (#506). The overall vertical length of all the lines is compared with the vertical length of the printing area (#508). If the overall vertical length is larger than the vertical length of the printing area ("NO" in #508), after a line feed disable message shown in FIG. 16C is displayed on the liquid crystal display unit 7 for 2 seconds (#510), the editing screen is displayed (#512). On this editing screen, when a character is input or deleted or the character size is changed, the character size is automatically set in accordance with the flow charts of FIGS. 9 and 10 (#514). However, when the overall vertical length is smaller than the vertical length of the printing area ("YES" in #508), the CPU 30 determines a line feed, so that the cursor is shifted to the new line (#516). Thereafter, a character size is automatically set under the condition that the new line is formed (#514).

<Fourth Embodiment>

An apparatus 1 can arbitrarily change the character size of a temporarily input character and displays the character size in an actual size (character size display means).

Figure 18:
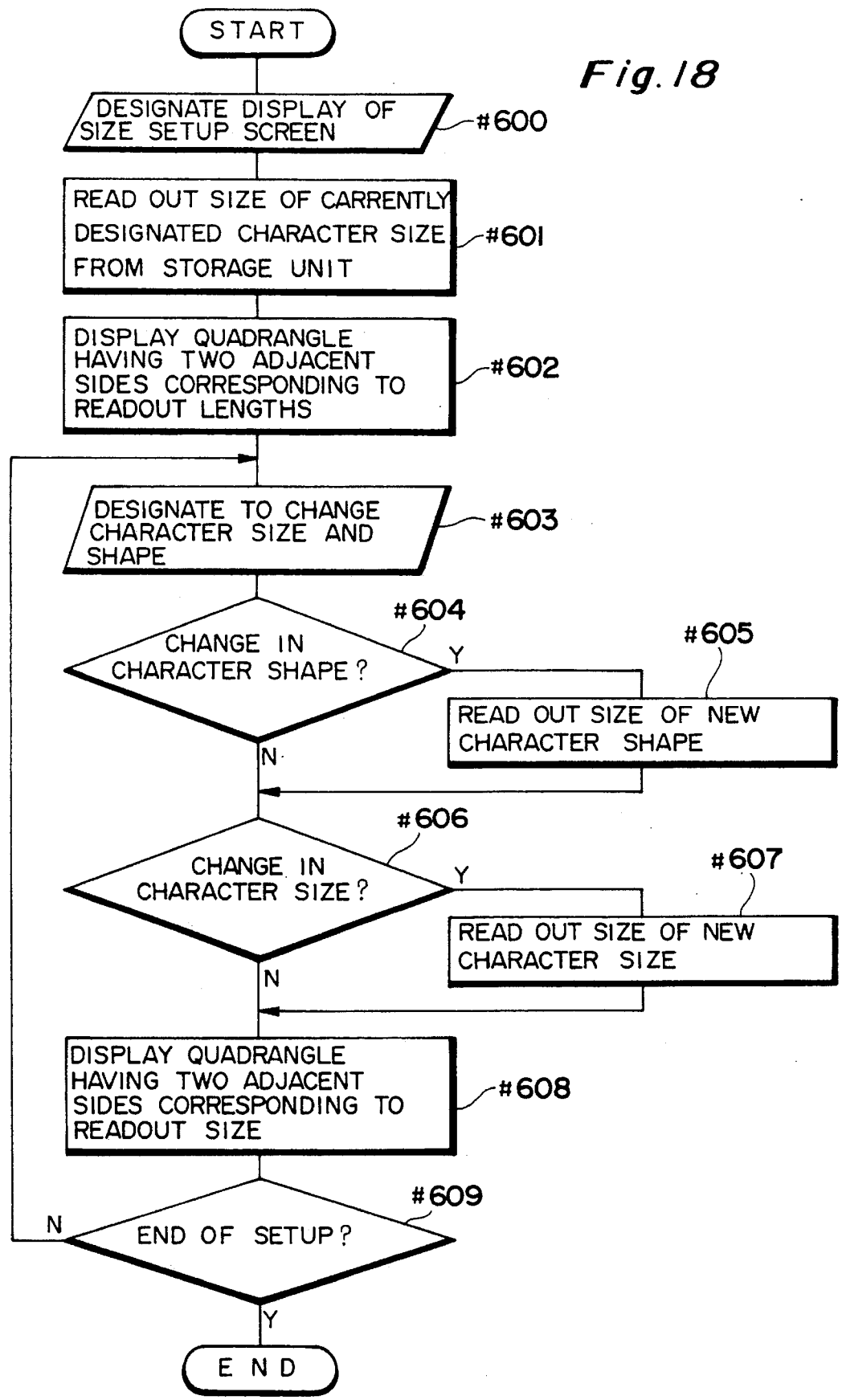
FIG. 18 is a flow chart showing character size change processing of a character string.
Figure 22A:
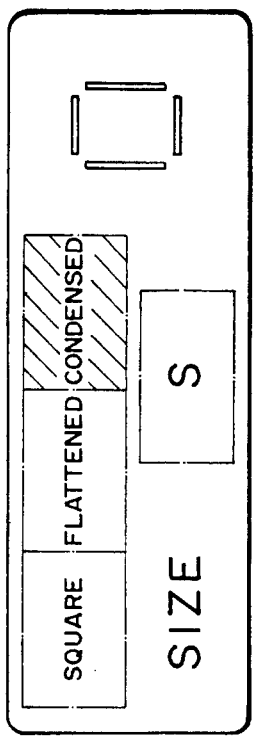
FIGS. 22A to 22E are views showing display contents in character size change processing.
Figure 22B:
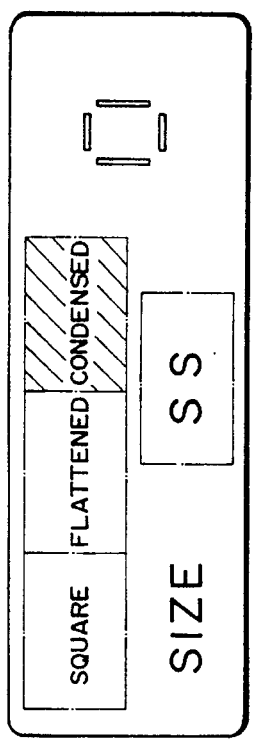
Figure 22C:
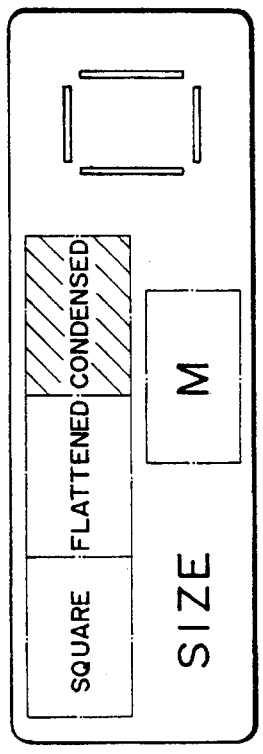
Figure 22D:
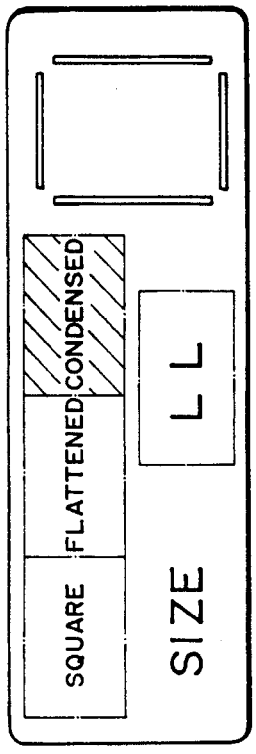
Figure 22E:
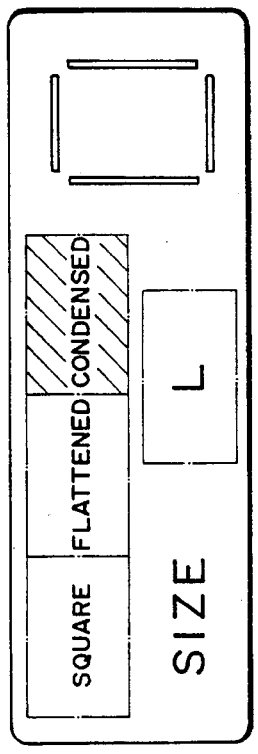
Figure 23:
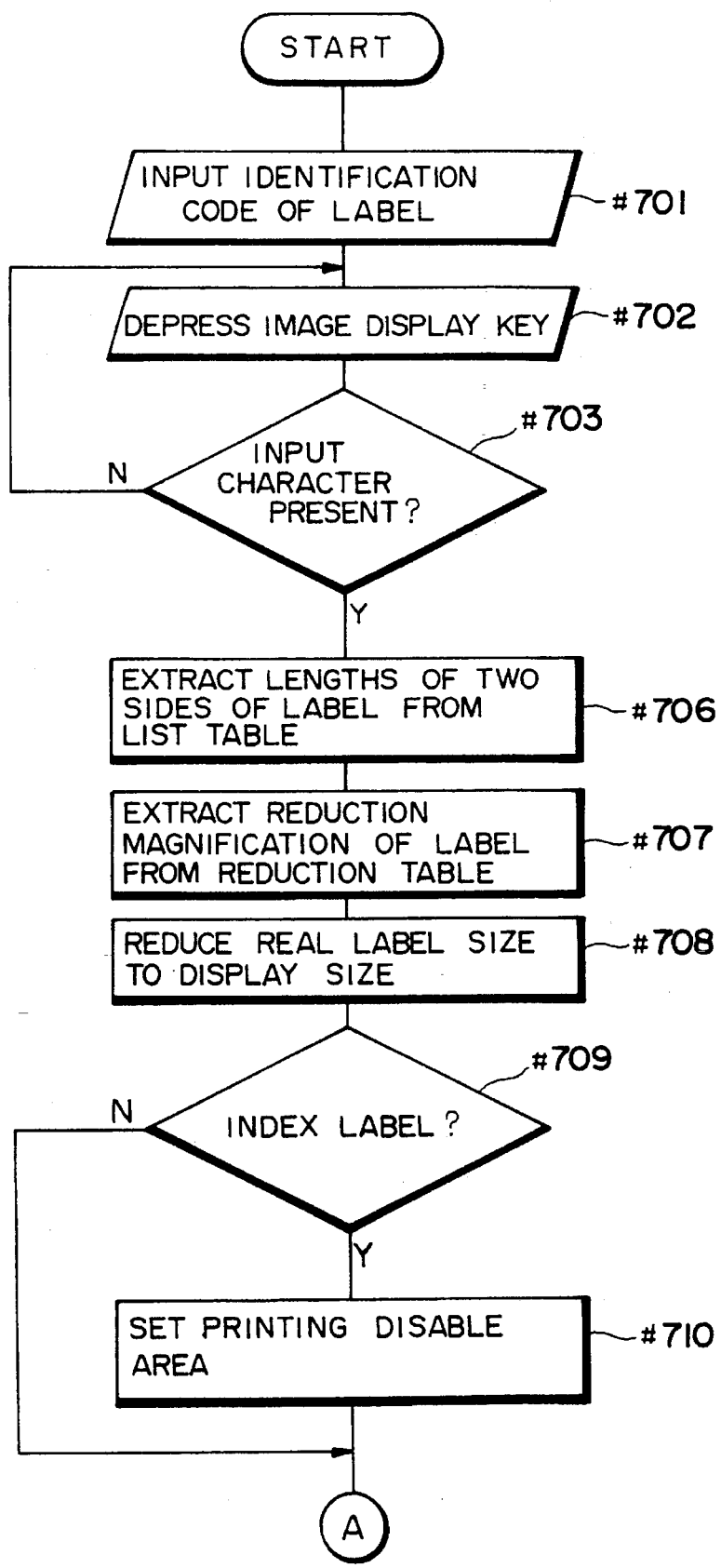
FIG. 23 is a flow chart showing the flow of image display processing.
Figure 24:
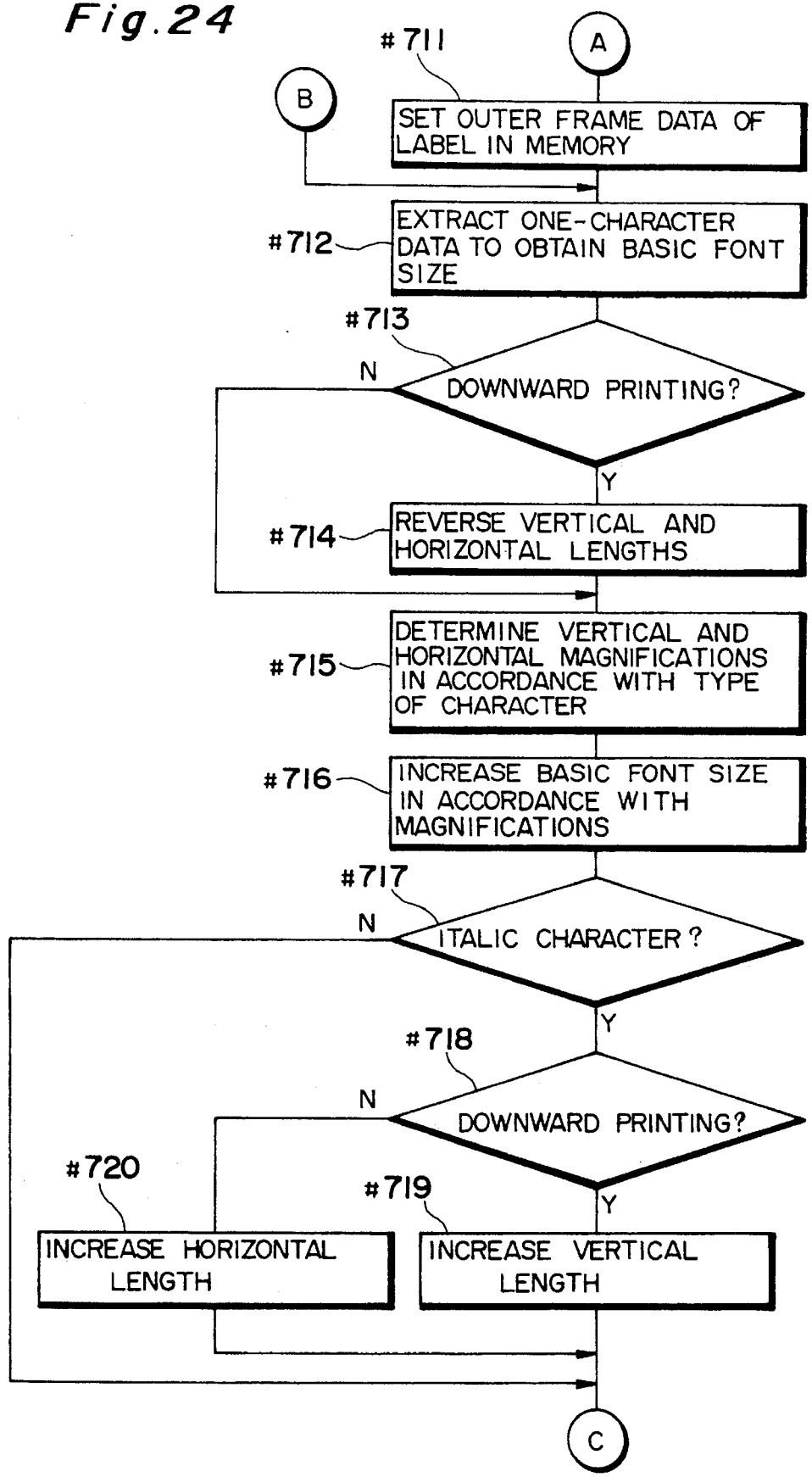
FIG. 24 is a flow chart showing the flow of image display processing.
Figure 25:
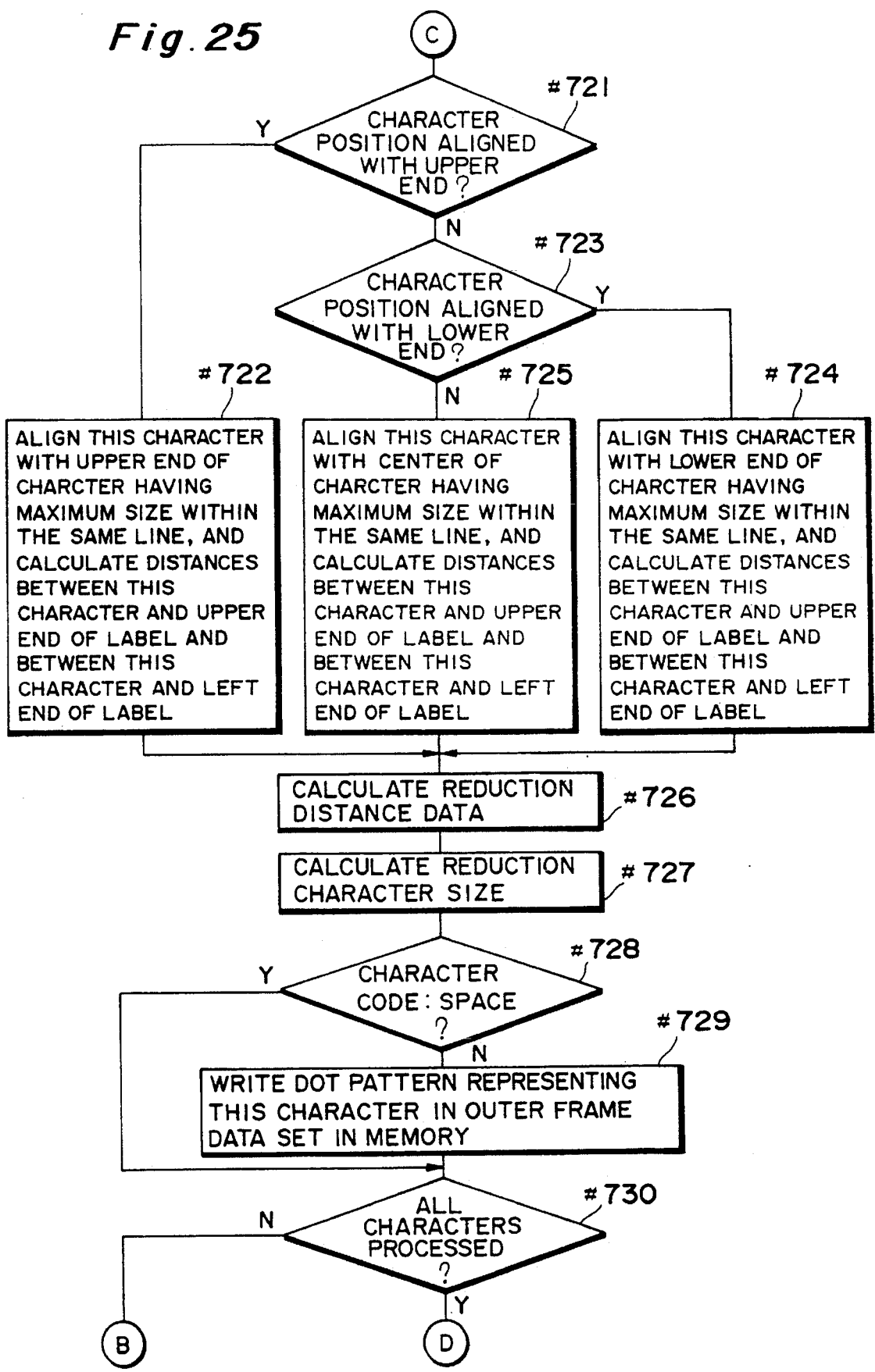
FIG. 25 is a flow chart showing the flow of image display processing.
Figure 26:
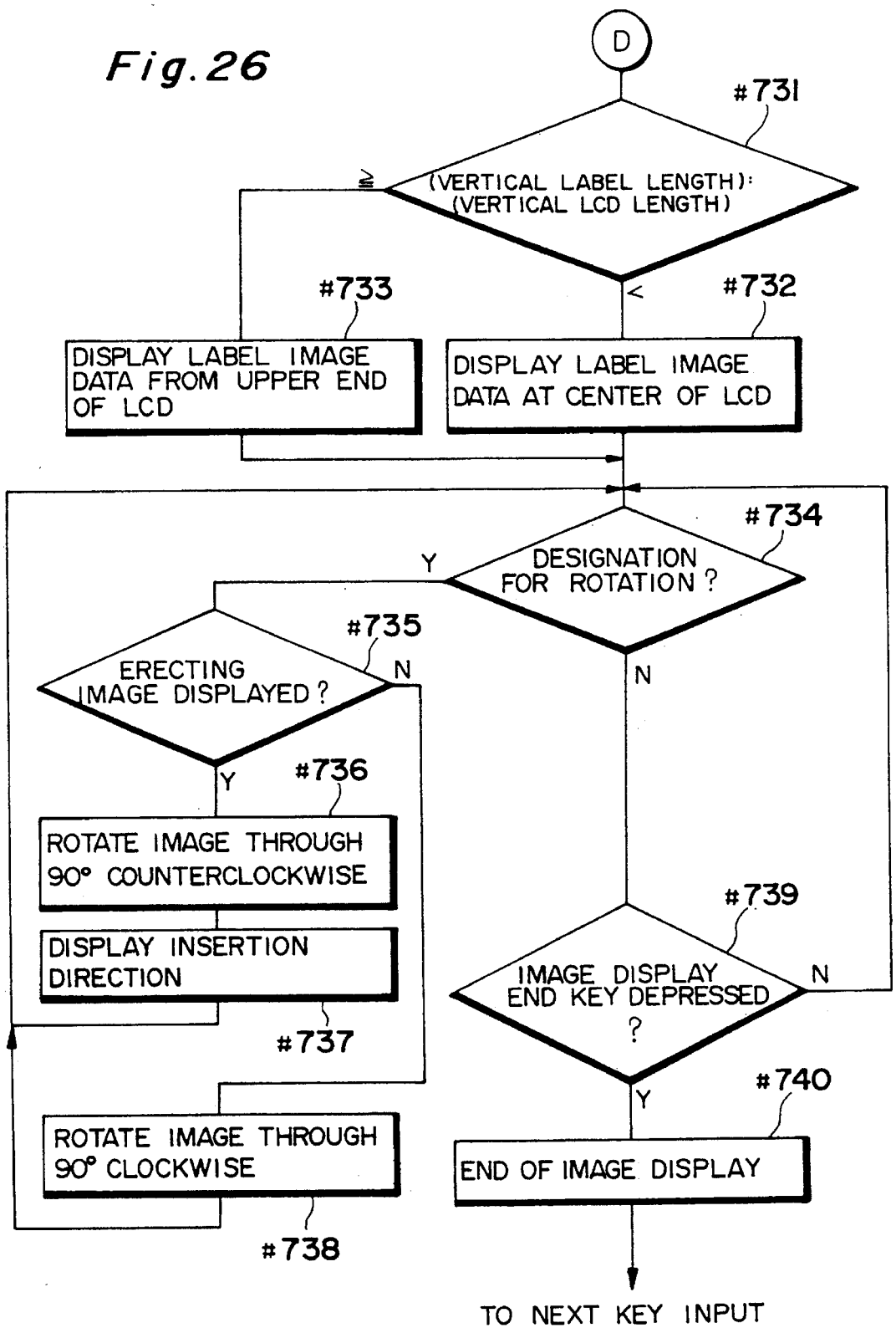
FIG. 26 is a flow chart showing the flow of image display processing.

Processing for changing the character size of a character string will be described with reference to a flow chart in FIG. 18. When a predetermined key 6 is depressed by the user as designation for displaying a size setup screen (#600), the character size currently designated is read out from a storage unit 31 (#601). A character size setup table shown in FIG. 19 is stored in the storage unit 31. Character size information is held in this table. The character sizes are classified in accordance with six character sizes ranging from SS to 3L and three character shapes, i.e., a square (square character), a flattened character (horizontally elongated character), and a condensed character (vertically elongated character).

The character size information is represented by a printing dot count at a printing unit 20 and a display dot count on a liquid crystal display unit 7. Information read out in #601 is represented by the display dot count. The dot pitch at the printing unit 20 is about 0.141 mm, and a dot pitch on the liquid display unit 7 is about 0.5 nun. Therefore, the table has the following relationship between the printing dot count and the display dot count:

(Printing Dot Count)×0.141 mm≈(Display Dot Count)×0.5 mm wherein the printing and display dot counts are predetermined integers, respectively.

A quadrangle having the readout vertical and horizontal lengths as two adjacent sides is displayed at the central right portion of the liquid crystal display unit 7 (#602). The selection screen for selecting the shape of a target character string from the square character, the flattened character, and the condensed character is displayed at the upper left portion of the liquid crystal display unit 7, and a selection screen for selecting a character size ranging from SS to 3L is displayed at the lower left portion of the liquid crystal display unit 7. The quadrangle displayed in #602 indicates the character size of a character string to be printed on a label. However, the display position may be slightly shifted from the printing position due to the difference between the dot pitches of the printing unit 20 and the liquid crystal display unit 7.

When the user designates a change in character shape of the character string upon operations of the keys 6 while observing the display contents on the liquid crystal display unit 7 (#603 and #604), the size of a new character shape is read out from the table in the storage unit 31 (#605). When the user designates to change the character size to any one of the sizes ranging from SS to 3L (#603 and #606), a new character size is read out from the table in the storage unit 31 (#607). A quadrangle formed by the readout Vertical and horizontal lengths is displayed at the central right portion of the liquid crystal display unit 7 (#608). Until the character size change processing is completed, the operations in #603 to #608 are repeated (#609).

The display contents of the liquid crystal display unit 7 in the above change processing are shown in FIGS. 20A to 22E. FIGS. 20A to 20F show a change in character size when a character string to be printed is a square shape. FIG. 20A shows a case in which a character having a size of "3L" is designated. In this case, "3L" is displayed at the central right portion of the liquid crystal display unit 7, and a quadrangle representing the square frame of the character size is displayed. This quadrangle indicates the actual size when a character is printed on a label. FIG. 20B shows a case in which a character having a size of "LL" is designated. FIGS. 20C to 20F show cases in which characters having sizes of "L" to "SS" are designated, respectively.

Similarly, FIGS. 21A to 21E show a case in which the character size is changed when the character shape of a character string to be printed is of a flattened character, and FIGS. 22A to 22E show a case in which the character size is changed when the character shape of a character string to be printed is of a condensed character.

As described above, in the change in character size, the actual size is displayed, thereby facilitating smooth character editing and label formation by the user.

The quadrangle displayed on the liquid crystal display unit 7 is displayed in the form of a frame of a character to be actually printed. The user can easily grasp the actual character size by this display.

<Fifth Embodiment>

In a conventional label printing apparatus, an input character string is displayed on the display, so that user can confirm whether the input is correctly performed. However, the user cannot know how the input character string is printed on the label until it is actually printed. For this reason, a character string must be printed on labels several times to check whether a desired label is formed.

In a label printing apparatus according to the present invention, the image of each character to be printed on a label is displayed (image display means).

Figure 27A:
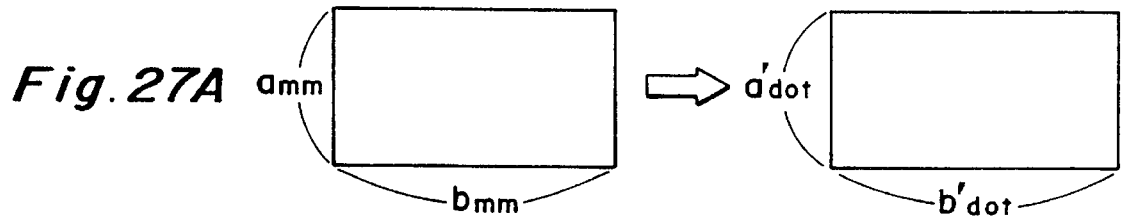
FIGS. 27A to 27D are views showing the concept showing the contents of image display processing.
Figure 27B:
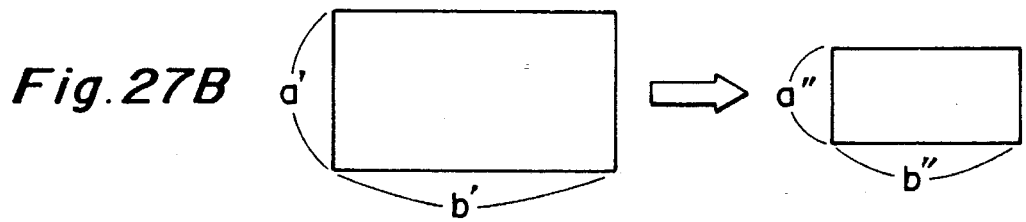
Figure 27C:
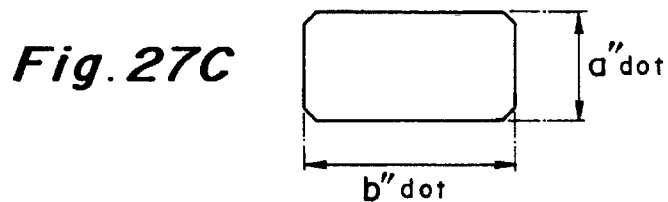
Figure 27D:
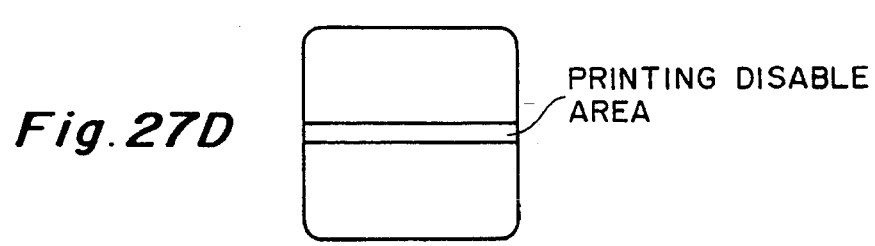

This image display processing will be described with reference to flow charts in FIGS. 23 to 26 and conceptual views of FIGS. 27A to 31C. In this processing, the user inputs a sheet number of a label sheet on which printing is to be performed (#701). In a character string input enable state or a state wherein an image is already displayed, when the user depresses keys (shift key+H key) for image display (#702), a CPU 30 determines whether the character is already input (#703). If "NO" in #703, an image cannot be displayed, and the key input operation for image display is invalidated, and the flow returns to #702. When a character is already input, the vertical and horizontal lengths of the label corresponding to the sheet number input in #701 are read out from a list table: 31a of a storage unit 31 (#706; FIG. 28B). The list table 31a store the vertical and horizontal lengths of a plurality of labels in mm. Of the readout lengths, a reduction magnification corresponding to the long side is extracted from a reduction table 31b in the storage unit 31 (#707; FIGS. 28B and 28C). The reduction table 31b is a table of correspondence between a plurality of reference size data (1 mm, 64 mm, 95 mm, . . . ) and reduction magnifications (4 times, 6 times, 8 times, . . . ), and the reduction magnification corresponding to the largest reference length smaller than the long side is selected from the reference sizes. The label represented by the reduction table 31b is changed to a size displayable within the screen of a liquid crystal display unit 7. The vertical and horizontal lengths read out in #706 are reduced in accordance with the reduction magnification to obtain reduction data (#708). In this reduction processing, the unit of the vertical and horizontal lengths is changed from millimeters (mm) to a dot count (FIG. 27A). The converted values are divided by the reduction magnification, thereby obtaining the actual display size (FIG. 27B). Data obtained by extracting one dot at each corner is given as outer frame data on the basis of a quadrangular frame obtained by the reduction data (FIG. 27C). If the label is an index label (#709), a printing disable area is set at the center of the outer frame data (#710; FIG. 27D). The outer frame data thus formed is set in the work area in the storage unit 31 (#711).

Figure 29A:
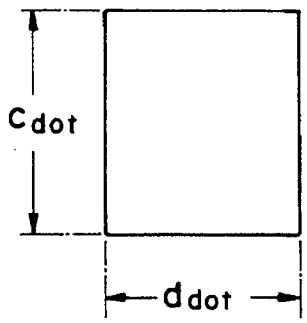
FIGS. 29A to 29C are views showing the concept showing the contents of image display processing.
Figure 29B:
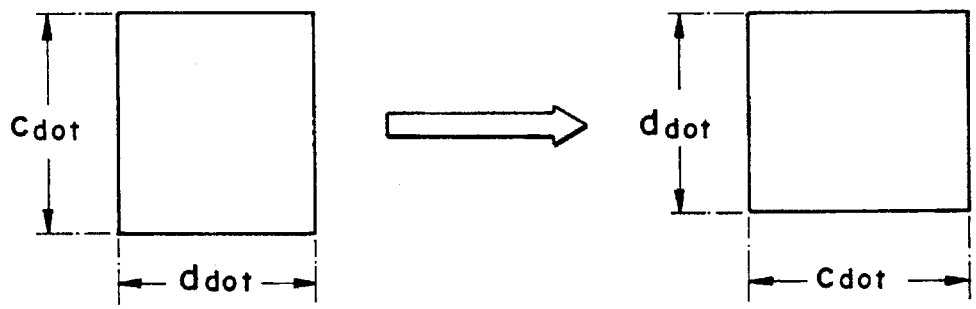
Figure 29C:
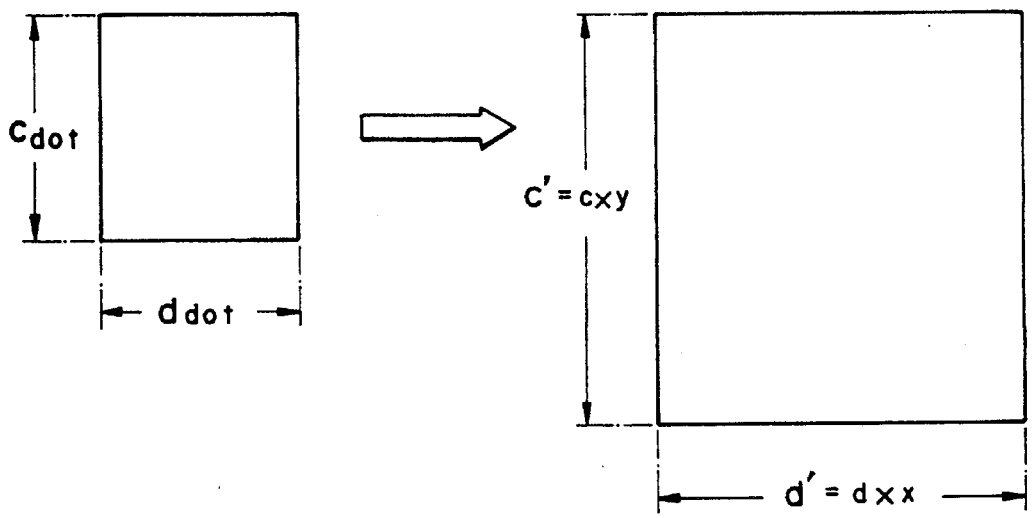
Figure 30A:
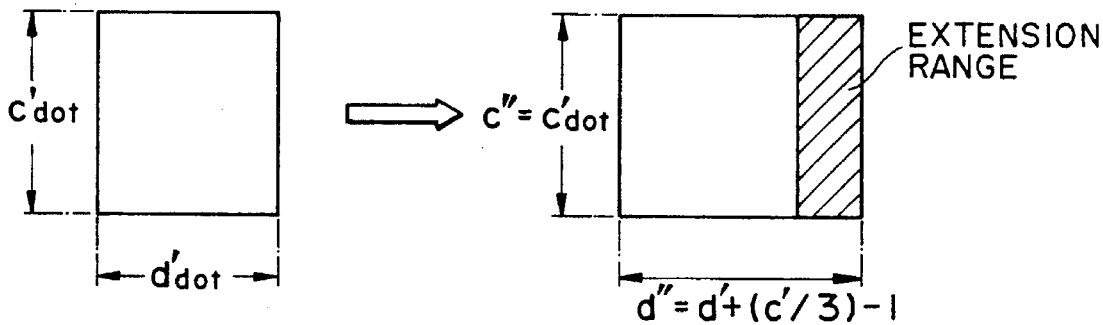
FIGS. 30A to 30C are views showing the concept showing the contents of image display processing.

Characters are extracted one by one from the input character string to obtain a basic font size (#712; FIG. 29A). The basic sizes of the character fonts are exemplified by 16 dots and 24 dots. When characters are designated to be printed downward (#713), the vertical and horizontal lengths of characters to be extracted are reversed (#714, FIG. 29B). The magnification of the vertical and horizontal lengths for the basic font is determined in accordance with the types of extracted characters (#715). The basic font size is increased using this magnification (#716; FIG. 29C). When italic characters are designated to be printed downward (#717 and #718), the size in the vertical direction is increased (#719; FIG. 30A). This increase is performed by adding {(Horizontal Length)/3−1} to the vertical length. If italic characters are designated but these characters are not designated to be printed downward (#717 and #718), the horizontal length is increased (#720). This increase is also performed by adding {(Vertical Length)/3−1} to the horizontal length. The inclination of each italic character in the above increases is one horizontal dot for three vertical dots (or three horizontal dots for one vertical dot). The range of increase varies depending on the character size of the extracted character because the characters in all character sizes are set to be inclined at the same angle.

Figure 30B:
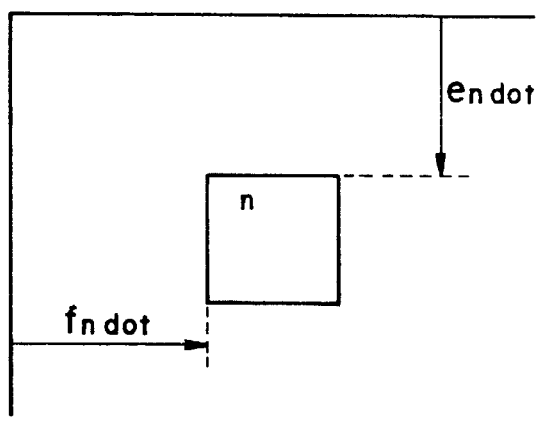

When the printing position of the extracted character is designated to be an upper end (#721), the upper end of the extracted character is aligned with the position of the upper end of a character having the largest size within the same line, and actual dot counts between the upper end of the label and this extracted character and between the left end of the label and the extracted character are obtained (#722; FIG. 30B). When the printing position of this extracted character is designated as the lower end (#723), the lower end of the extracted character is aligned with the position of the lower end of a character having the largest size within the same line, and actual dot counts between the upper end of the label and the extracted character and between the left end of the label and the extracted character are obtained (#724; FIG. 30B). When the printing position of the extracted character is designated as an intermediate position, the center of the extracted character is aligned with the position of the center of a character having the largest size within the same line, and actual dot counts between the upper end of the label and the extracted character and between the left end of the label and the extracted character are obtained (#725; FIG. 30B).

Figure 30C:
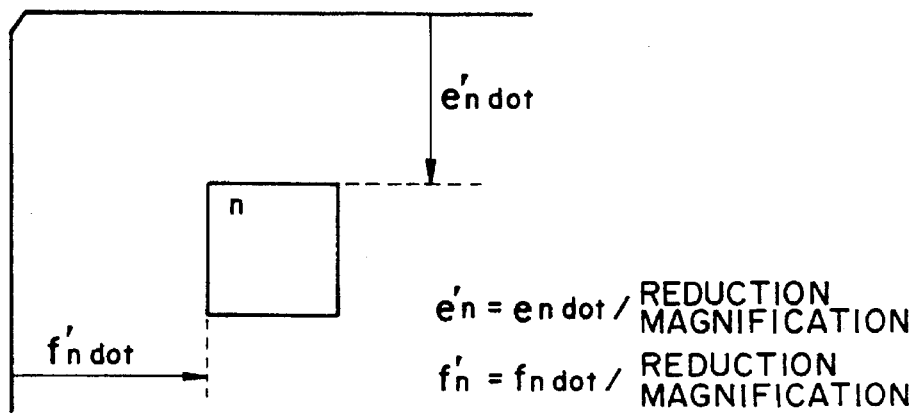
Figure 31A:
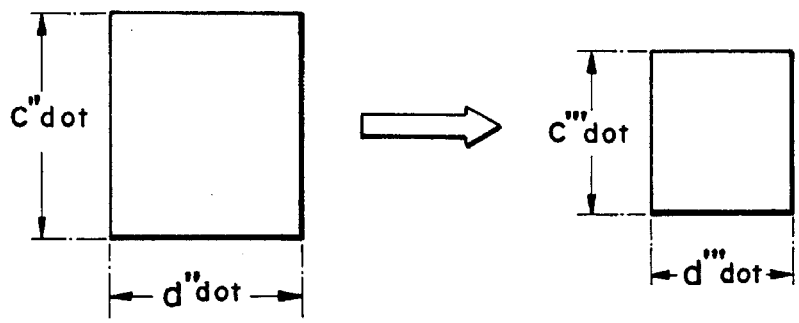
FIGS. 31A to 31C are views showing the concept showing the contents of image display processing.
Figure 31B:
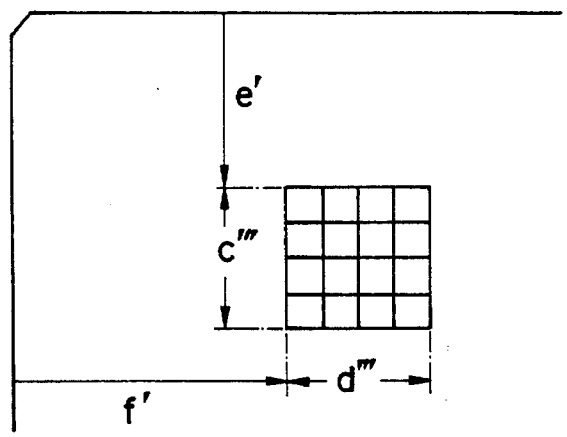
Figure 31C:
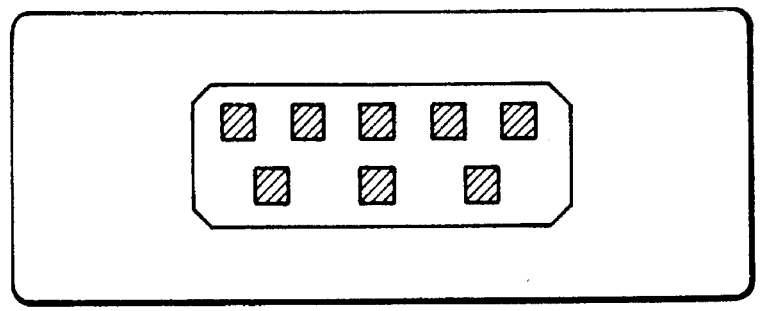

The actual dot counts obtained as described above are divided by the reduction magnification extracted in #707 to obtain reduction distance data representing the relative positions on the outer frame data formed in #708 (#726; FIG. 30C). Similarly, the character size of the extracted character is divided by the reduction magnification to obtain a reduction character size having the same magnification as that of the outer frame data (#727; FIG. 31A). If the character code of this extracted character does not represent a space (#728), a dot pattern representing this extracted character is written in the outer frame data set in the work area of the storage unit 31 (#729; FIG. 31B). More specifically, a quadrangle designated by the reduction character size is set at the relative positions on the outer frame data represented by the reduction distance data. In addition, the interior of the quadrangle is filled with dots, thereby forming a dot pattern. Processing in #712 to #729 is performed for all input characters (#730).

when the vertical length of the label is smaller than the vertical length of the liquid crystal display unit 7 (#731), the outer frame data set in the work area in the storage unit 31 and image data consisting of dot data representing each character are read out and displayed at the central portion of the liquid crystal display unit 7 (#732; FIG. 31C). When the vertical length of the label is larger than the vertical length of the liquid crystal display unit 7 (#731), the readout image data is displayed from the upper end of the liquid crystal display unit 7 (#733). In this case, since all the image data cannot be displayed on the liquid crystal display unit 7, the display position can be changed by scrolling.

when the operations in #732 and #733 are completed, an image (erecting image), the direction of which coincides with the label insertion direction, is displayed on the liquid crystal display unit 7.

The CPU 30 determines whether designation for rotating the display direction of this erecting image is input (#734).

Rotation is designated by the keys (shift key+H key) in an apparatus 1. While the image is displayed, its rotation can be designated by these keys. A rotation designation key is not arranged to prevent an increase in the number of keys.

If rotation designation is present in #734 (YES), the CPU 30 then determines whether the image is displayed as an erecting image (#735).

If the CPU 30 determines in #735 that the image is displayed as an erecting image, the erecting image is rotated counterclockwise through 90° (#736).

By this rotation, for example, in a state wherein the vertical length of the label is larger than the length of the liquid crystal display unit 7, and the erecting image is displayed, when some image data cannot be displayed without changing the display position by scrolling, all the image data along the longitudinal direction of the liquid crystal display unit 7 can be displayed.

When the erecting image is displayed in #735, an arrow indicating the insertion direction of the displayed label is displayed (#737).

On the other hand, when the displayed image is not an erecting image in #735, the displayed image is rotated clockwise through 90 ° (#738).

The image rotated clockwise is an erecting image.

When the operation in #732 or #733 is completed, the erecting image is always displayed. By the first rotation designation ("YES" in #734), the erecting image is rotated counterclockwise through 90°. By the second designation, the image rotated through 90° counterclockwise is replaced with the erecting image.

When rotation designation is not input in #734 ("NO"), the CPU 30 waits for depression of an image display end key (cancel key) (#739). If the end key is depressed, the image display is completed, and the screen returns to the normal editing screen (#740).

In the label printing apparatus of this embodiment, an image of a label having any size can always be displayed as a reduced image falling within the longitudinal size of the liquid crystal display unit. For this reason, printed images of all labels can be visually grasped without actually printing information on the labels.

<Sixth Embodiment>

A conventional label printing apparatus can print information on a label having a plurality of input columns, such as a tack index label or cassette label. In this case, the cursor must be manually shifted to each input column on the label after the user recognizes the positions and sizes of the input columns, resulting in cumbersome operations.

To the contrary, a label printing apparatus of this embodiment can easily execute input processing on a label having a plurality of input columns, such as a tack index label or cassette label.

Input processing for character strings to be printed on a tack index label and a cassette label will be described with reference to FIG. 32 to 36B.

Figure 32:
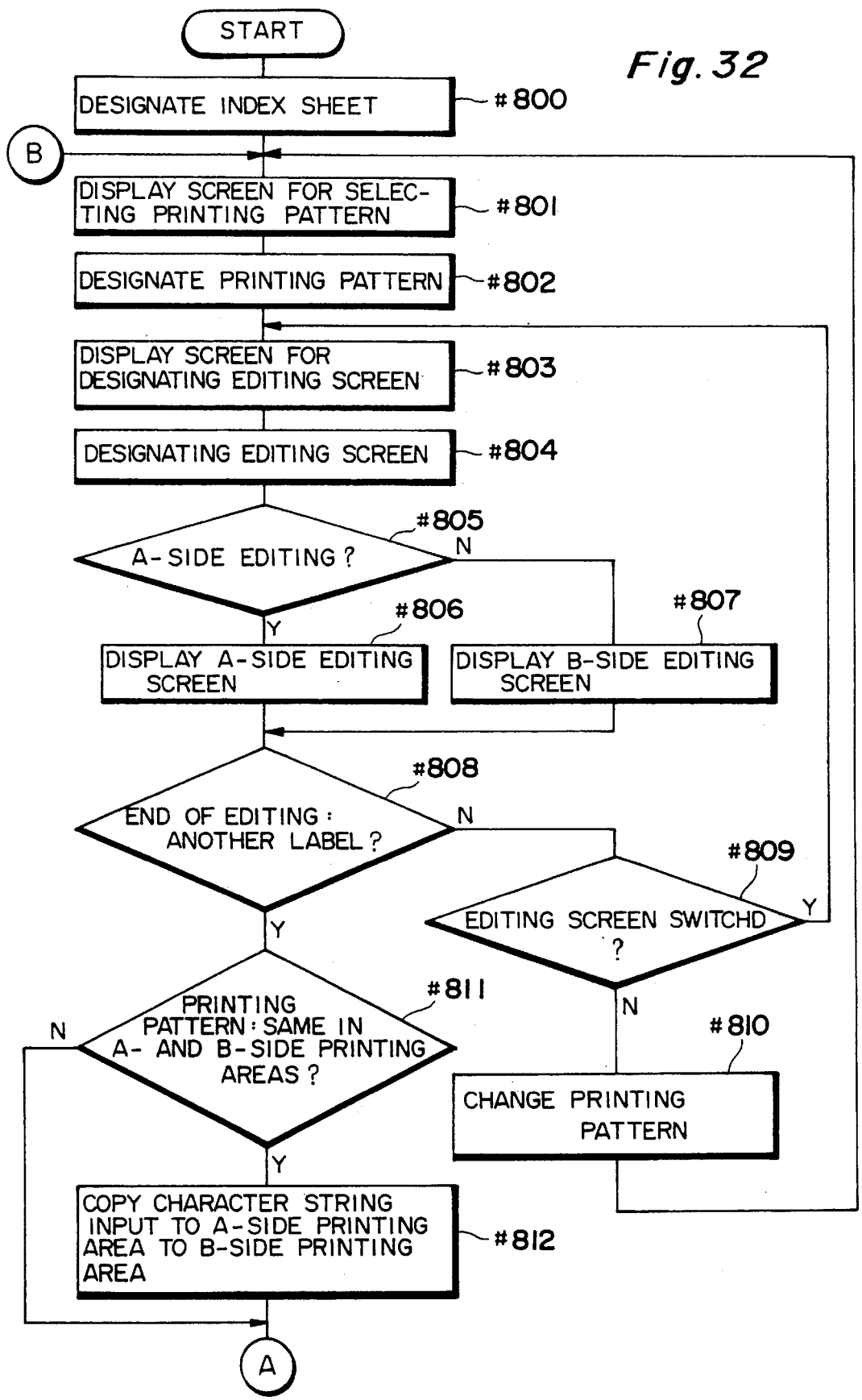
FIG. 32 is a flow chart showing input processing of a character string to be printed on a tack index label.
Figure 33:
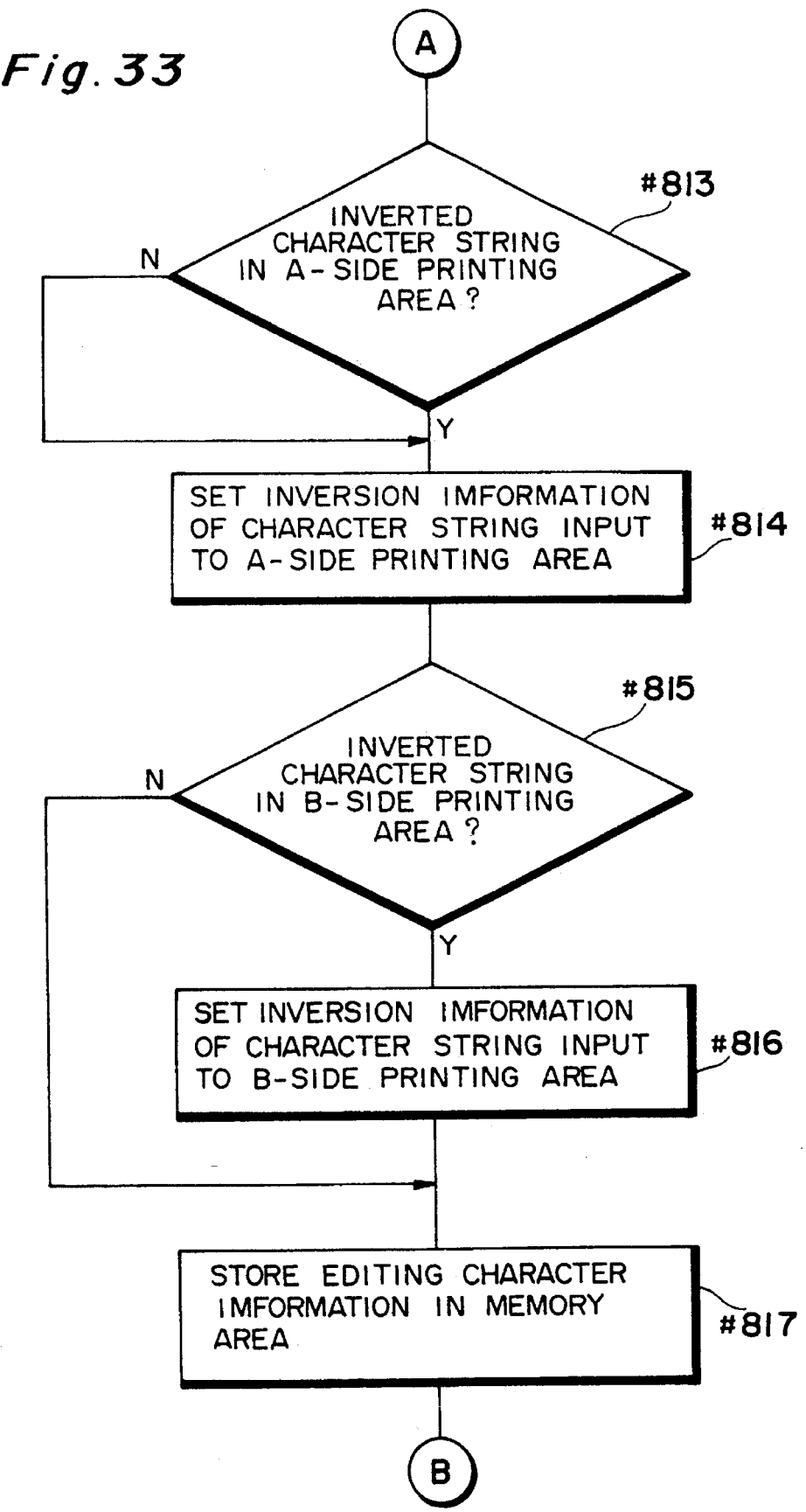
FIG. 33 is a flow chart showing input processing of the character string printed on the tack index label.
Figure 34:
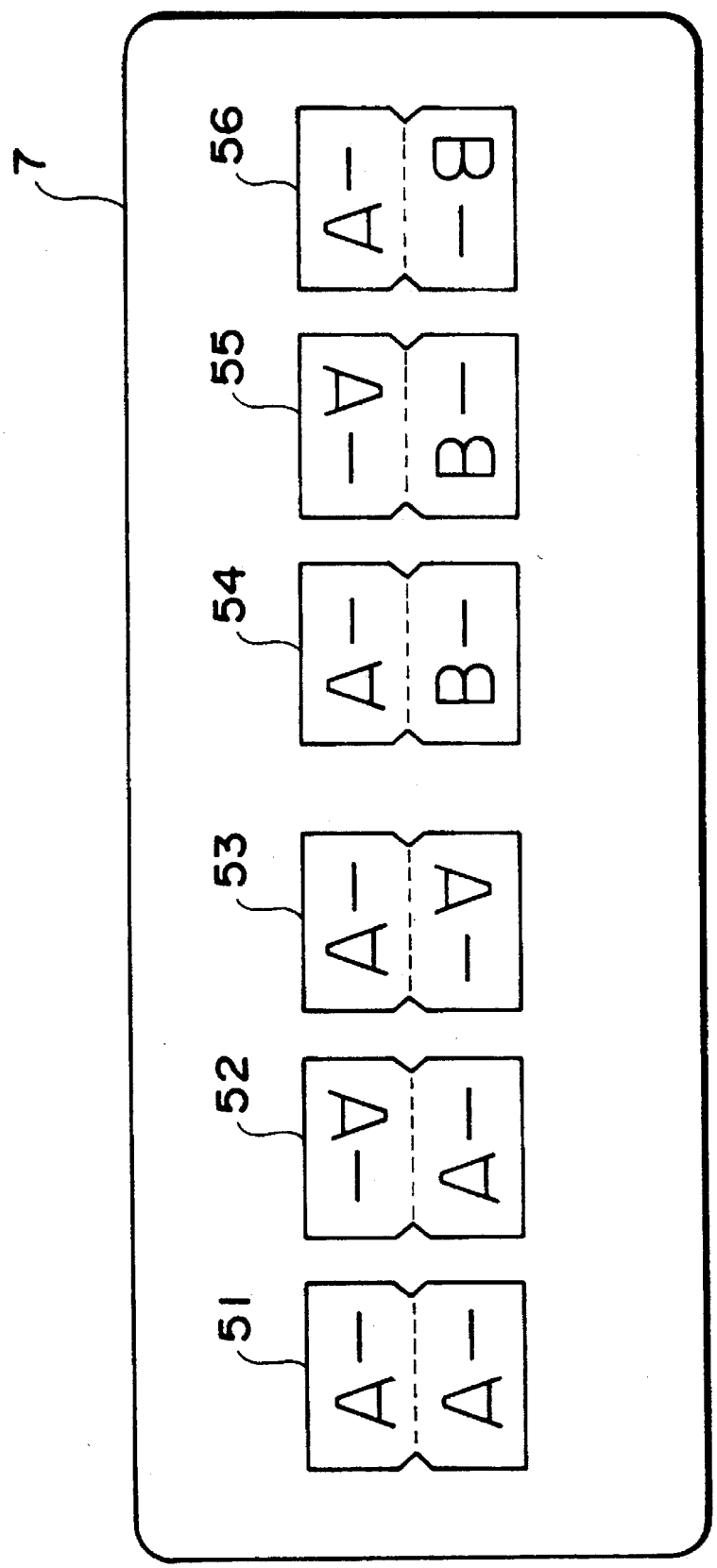
FIG. 34 is a view for explaining the display of a selection screen.

FIGS. 32 and 33 are flow charts showing input processing for a character string to be printed on a tack index label.

The sheet number assigned to the index sheet is input to specify all pieces of information such as the vertical and horizontal lengths and layout positions of the tack index labels (#800). A printing pattern selection screen as an input screen for the tack index label is displayed (#801). This selection screen consists of six types of label patterns 51 to 56 shown in FIG. 34. The label patterns 51 to 53 are patterns each for printing identical character strings in two printing areas (columns), while the label patterns 54 to 56 are patterns each for printing different character strings in two printing areas. When the user shifts the cursor to designate a desired label pattern (#802), the screen for designating the editing screen is displayed (#803). The editing screen includes an A-side editing screen and a B-side editing screen. The A side indicates the upper printing area of the tack index label, and the B side indicates the lower printing area of the tack index label. On this designation screen, when the user designates the A-side editing screen (#805), the A-side editing screen is displayed (#806). On the other hand, when the user designates the B-side editing screen (#805), the B-side editing screen is displayed (#807). However, when the label patterns 51 to 53 are designated on the printing pattern selection screen, the B-side editing screen cannot be designated because a character string input on the A-side editing screen is copied to the B side.

On these editing screens, editing operations for character strings to be printed on a label are performed. In the editing operations, even if a character string is to be printed upside down, the screen is displayed in an erected state. To restore the editing screen selection processing from the editing operation, the cursor is shifted upward. Upon shift of the cursor, the display is switched from the editing screen to the designation screen (#809 and #803). Thereafter, processing from #804 is continuously performed. When the cursor is further moved upward, the designation screen is switched to the printing pattern selection screen (#810 and #801). Thereafter, processing from #802 is continuously performed.

When the editing operation is ended in #806 or #807 (#808), it is checked in #802 whether the patterns 51 to 53 are designated (#811). If YES in #811, the character string input in the editing operation is copied to the B-side work area (#812). It is also checked in #813 whether the label patterns 52 and 55 are designated in #812. In this designation, since an inverted character string is printed in the A-side printing area, information for inverting the A-side input character string is set (#814). In addition, it is checked in #815 whether the label patterns 53 and 56 are designated in #802. In this designation, since an inverted character string is printed in the B-side printing area, information for inventing the B-side input character string is set (#816). Upon completion of the above processing operations, the edited character strings and various types of information are stored in a predetermined area of a storage unit 31 (#817). Since the input character strings and the selection contents are stored in the storage unit 31, even if the apparatus is powered off and then powered on, the input character strings are displayed on the liquid crystal display unit 7 in the input form. When processing in #817 is completed, the flow returns to #801, and processing continues.

Figure 35:
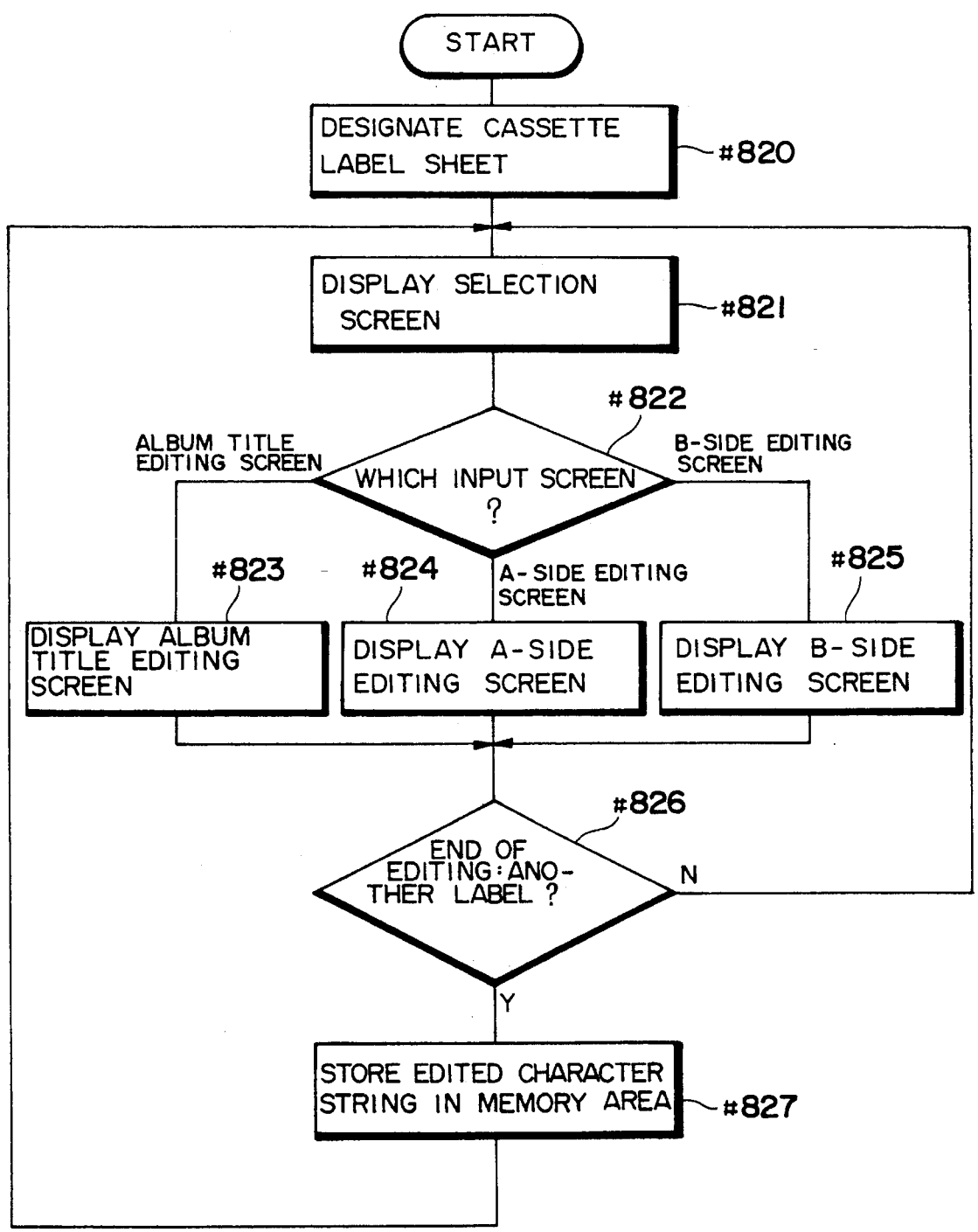
FIG. 35 is a flow chart showing input processing of a character string to be printed on a cassette label.
Figure 36A:
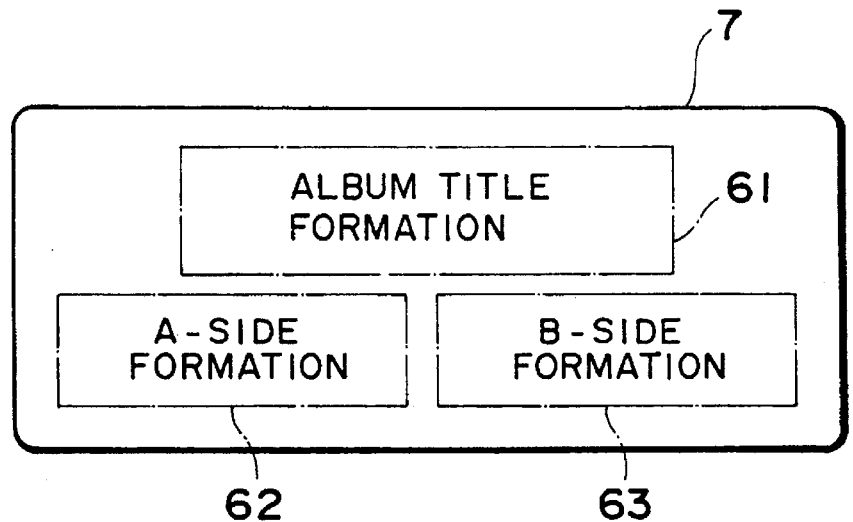
FIGS. 36A and 36B are views for explaining the display of a selection screen.
Figure 36B:
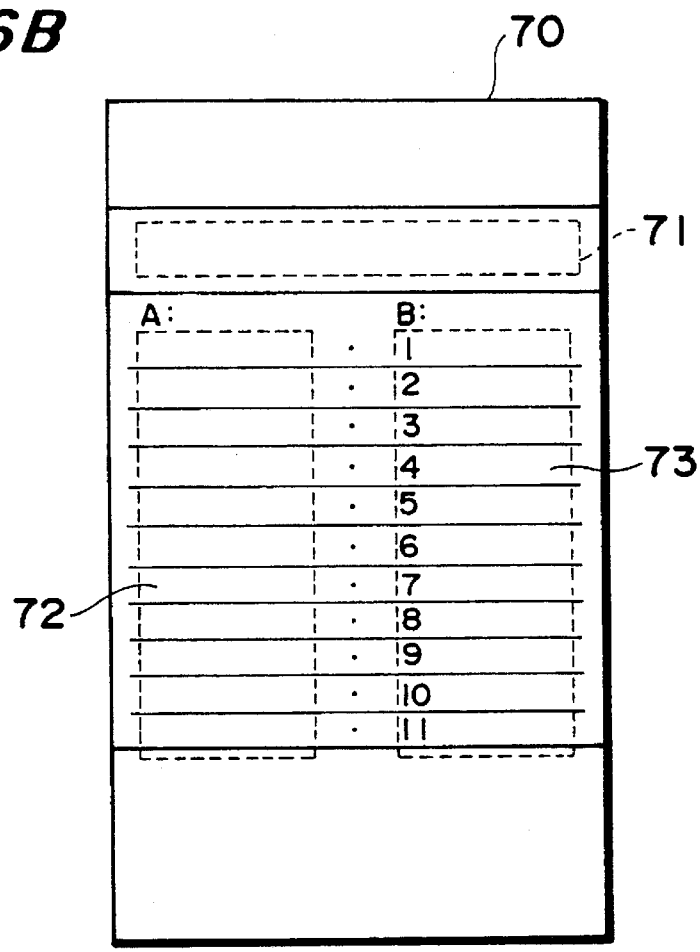

FIG. 35 is a flow chart showing processing for inputting a character string to be printed on a cassette label.

When a sheet number assigned to a cassette sheet is input, all pieces of information such as the vertical and horizontal lengths arid layout position of the cassette labels are designated (#820). A selection screen as a cassette label input screen is displayed (#821). This selection screen has three choices 61 to 63 (album title formation, A-side formation, and B-side formation), as shown in FIG. 35A. The choice 61 of these choices is a choice for inputting a character string to be printed in an album title column 71 of a cassette label 70 shown in FIG. 36B. Similarly, the choices 62 and 63 are choices for inputting character strings to be printed in A-side song title columns 72 and B-side song title columns 73, respectively. Of these choices, when the "album title formation" choice 61 is selected (#822), the album title editing screen is displayed (#823). When the "A-side formation" choice 62 is selected (#822), the A-side editing screen is displayed (#824). When the "B-side formation" choice 63 is selected (#822), the B-side editing screen is displayed (#825). The user edits the character strings to be printed on the label on these editing screens. To restore the selection screen from the editing operation, the cursor is shifted upward. Upon shift of the cursor, the editing screen is switched to the selection screen (#821). Thereafter, processing from #822 is continuously performed. When the editing operation in #823, #824, or #825 is completed (#826), the edited character strings are stored in a predetermined area of the storage unit 31 (#827). Thereafter, the flow returns to #821, and processing continues.

Since the character strings to be printed can be input to the corresponding columns of the label, selection errors can be minimized, and the label can be quickly formed.

<Seventh Embodiment>

The character strings to be printed are formed as described with reference to the above embodiments. The formed character strings are stored as character string information in a storage unit 31. Under the control of a CPU 30, printing is performed on labels arranged on a label sheet on the basis of the stored data and the preset label information.

In execution of this printing processing, an apparatus 1 detects only a corner portion as the leading end of the left side of a label sheet and controls various printing operations with reference to this position.

Figure 37:
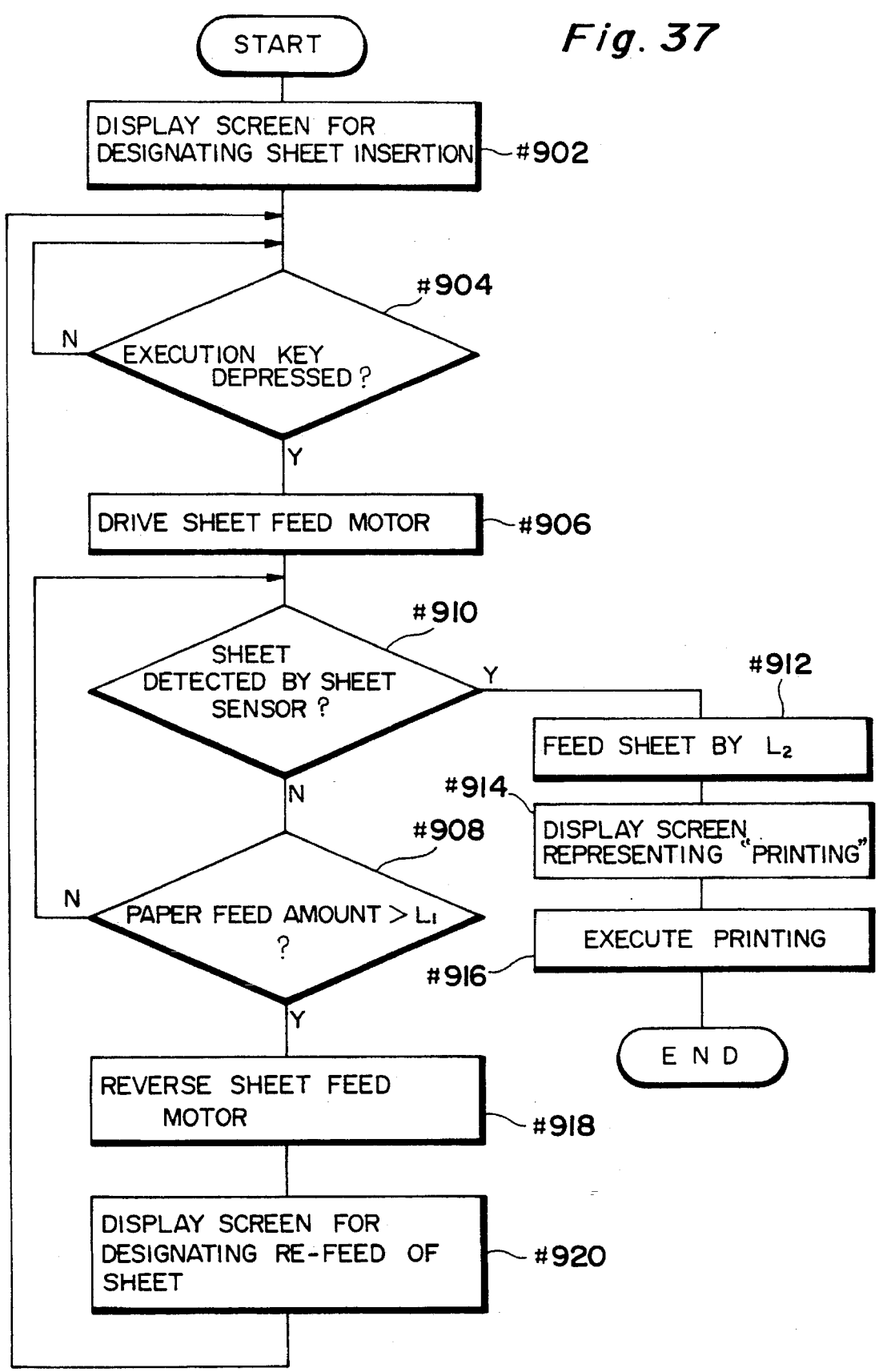
FIG. 37 is a flow chart showing label sheet feed control in printing processing.
Figure 38:
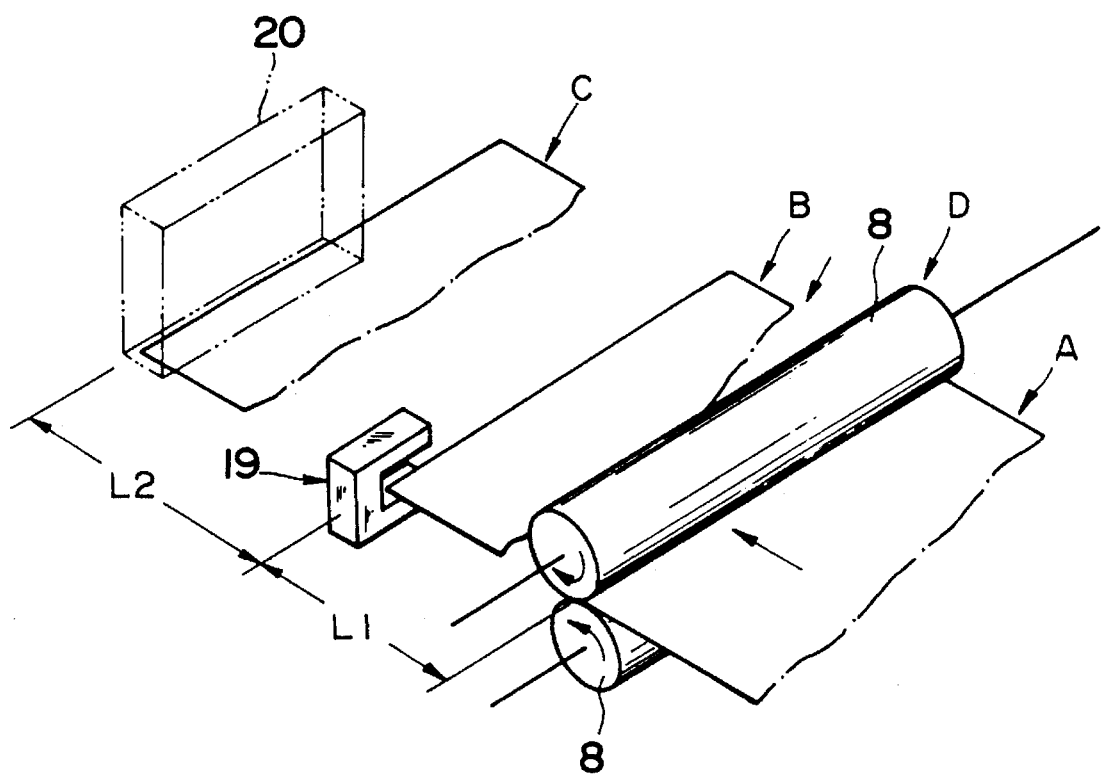
FIG. 38 is a schematic perspective view of a sheet sensor and a paper feed roller portion as the main part in feed control.

Label sheet feed control in the printing processing will be described with reference to FIGS. 37 and 38.

Assume that a character input operation is completed, that the registered character strings are loaded, that the "print" key is depressed, and that various setup operations are completed. A message such as "Please insert a sheet" to prompt insertion of a label sheet is displayed on a liquid crystal display unit 7 (#902). The user brings the left side of a label sheet 4 into contact with a side wall 18 and inserts the label sheet from an insertion port 5. The label sheet 4 is inserted until the leading end of a label sheet A (FIG. 38) is brought into contact with a pair of paper feed rollers 8. In this state, the label sheet A is completely set. When the user depresses the "execution" key ("YES" in #904), a sheet feed motor 16 is driven (#906), and the paper feed rollers 8 are rotated upon rotation of the sheet feed motor 16. Feeding of the set label sheet A is started toward a printing unit 20.

On the other hand, the CPU 30 monitors the presence/absence of a label sheet using a sheet sensor 19 upon feeding the label sheet. Assume that the distance between the paper feed rollers 8 and the sheet sensor 19 is defined as $L_1$. When the label sheet is detected by the sheet sensor 19 while being fed by the paper feed rollers 8 by a distance corresponding to $L_1$, the CPU 30 determines that the label sheet is correctly fed ("NO" in #908 and "YES" in #910). After the label sheet is detected by the sheet sensor 19 and is further fed by a distance $L_2$, the label sheet is set as a label sheet C at a predetermined position immediately below the printing unit 20. Thereafter, a message representing "printing" is displayed on the liquid crystal display unit 7 (#914), and predetermined printing processing is performed (#916).

On the other hand, when the label sheet is not detected by the sheet sensor 19 although the label sheet is fed by a distance exceeding the distance $L_1$ upon rotation of the paper feed rollers 8 ("NO" in #910 and "YES" in #908), the CPU 30 determines that the label sheet is not normally fed. In this case, the CPU 30 causes the sheet feed motor 16 to rotate in the reverse direction (#918) to discharge the label sheet from the insertion port 5. The CPU 30 causes the liquid crystal display unit 7 to display a message representing refeed of the label sheet. At the same time, the CPU 30 causes the liquid crystal display unit 7 to display a message for prompting a key-in operation for the start of printing processing. Processing from #904 is repeated.

In the apparatus 1, the label information which specifies the shape of the label and the layout positions of the labels is stored with reference to the corner position as the leading end of the left side of the label sheet. Since the printing processing is executed on the basis of this label information, it is very important to detect whether the corner position of the label sheet is accurately set at the prescribed position.

In this embodiment, determination for erroneous insertion of the label sheet is performed on the basis of the feed distance of the label sheet by the paper feed rollers and the presence/absence of the label sheet by the sheet sensor. However, this determination is not limited to this. Another method may be utilized to determine erroneous insertion of the label sheet as follows. When a label sheet is not detected by a sheet sensor within a predetermined period of time from the start of feeding by means of a timer or the like, erroneous insertion may be determined.

<Eighth Embodiment>

In printing processing, a so-called skip position may be designated such that printing is not performed on a specific label in consideration of some handwritten labels of all the labels arranged on a label sheet.

Printing processing utilizing this function will be described below.

Figure 39:
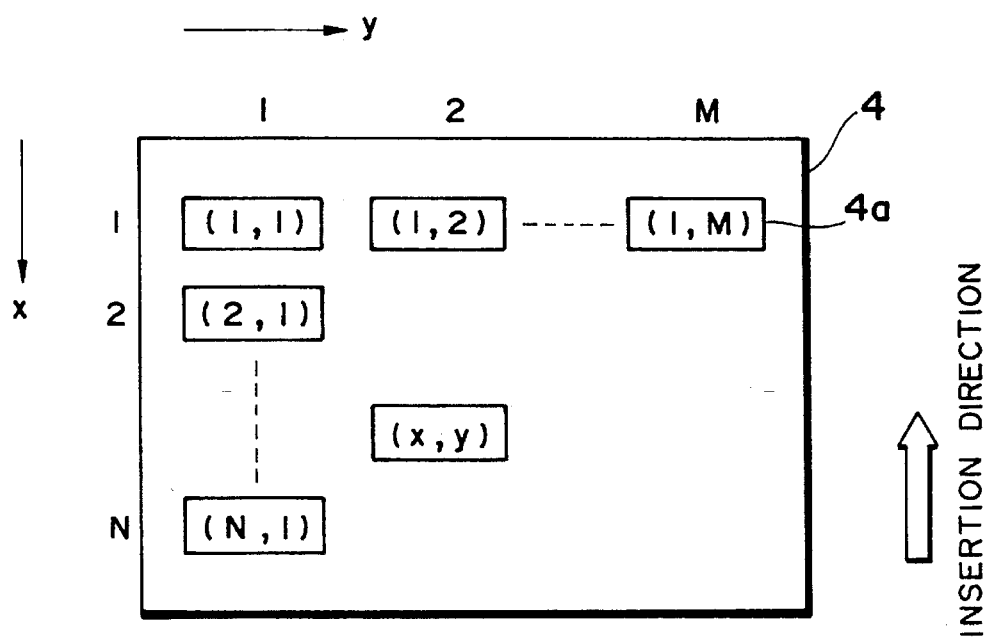
FIG. 39 is a plan view showing the positional relationship of labels with a label sheet.
Figure 40:
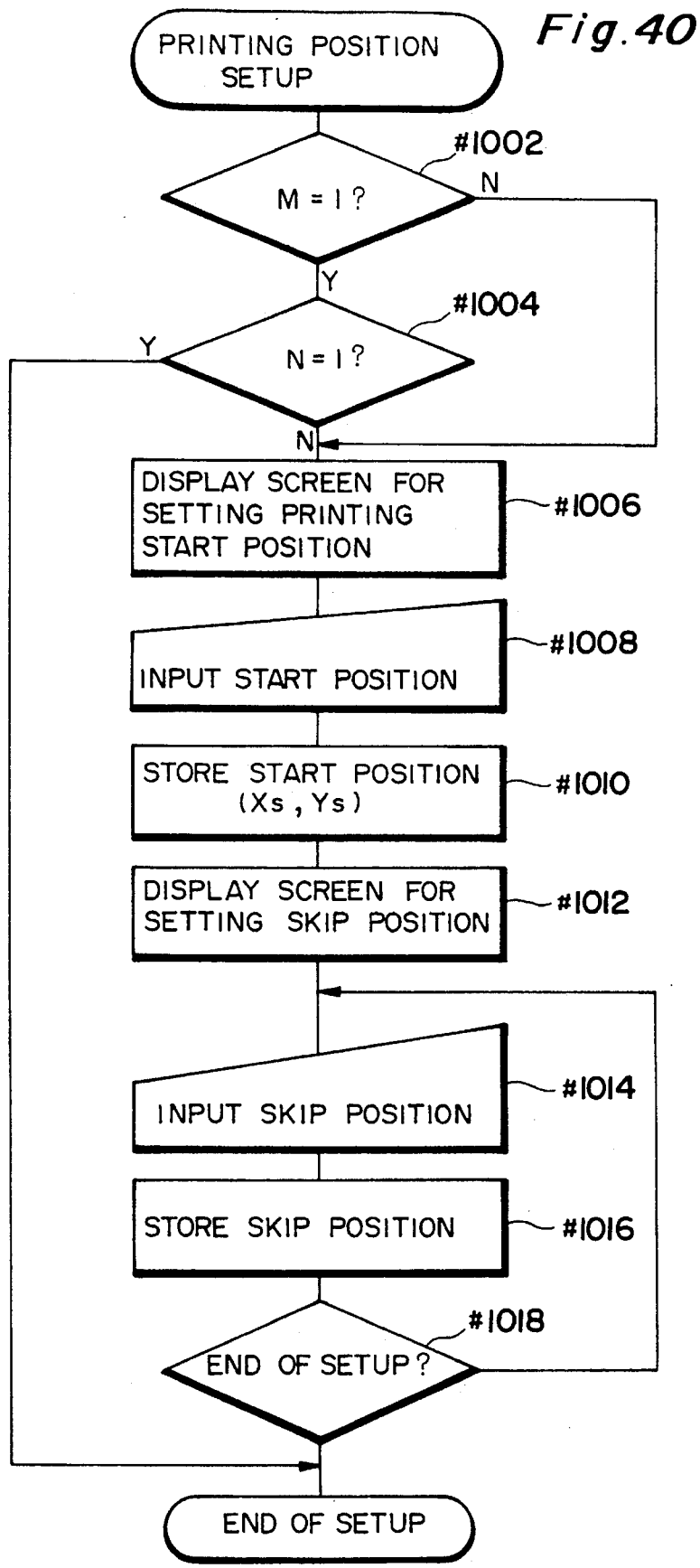
FIG. 40 is a flow chart showing printing start position setup.

FIG. 39 shows the relationship between a label sheet and labels. A large number of labels 4a having the same size are adhered on a label sheet to be spaced apart from each other at predetermined intervals in the x and y directions. Coordinates (x,y) as position codes are assigned to these labels 4a such that 1, 2, ..., N are assigned in the x direction and 1, 2, ..., M are assigned in y direction.

After the number of labels to be printed is designated, the first label subjected to printing is designated from the large number of labels arranged on the label sheet. Note that M represents the number of labels arranged in the y direction (horizontal direction) and N represents the number of labels arranged in the x direction (vertical direction) (FIG. 39).

Since the types of label sheets are specified by the previous setup operations, the number of labels arranged on a label sheet is determined on the basis of this label information. If the label sheet is determined as a label sheet having a plurality of labels ("NO" in #1002, or "YES" in #1002 and "NO" in #1004), a screen for setting the printing start position is displayed (#1006). A printing start position is input on this setup screen (#1008). This input operation is performed by inputting the coordinate position of the first label subjected to printing because the labels arranged on the label sheet are assigned with coordinates. As characters input by the users, letters A, B, C, ... are assigned in the x direction, and numbers 1, 2, 3, ... are assigned in the y direction (FIG. 7). For example, to start printing from the label at the coordinate position (1,2), "A-2" is input, and to start printing from the label at the coordinate position (2,1), "B-1" is input. When an unused label sheet is set, "A-1" is always set as the initial value representing the printing start position. This coordinate position is displayed on the setup screen. To start printing from this position, the user simply depresses the "execution" key, and this position is input as the printing start position. The input coordinate position is stored as a start position $(Xs,Ys)_1$ (#1010).

A screen for setting the position of a label, free from printing processing, i.e., the skip position, of all the labels arranged on the label sheet is displayed (#1012). The user inputs the skip position on this setup screen (#1014). This input operation is performed by inputting the coordinate position of the corresponding label as in the input operation of the printing start position. After the coordinate position of one skip position is input, this coordinate position is stored (#1016). If an additional skip position is present ("NO" in #1018), processing in #1014 to #1018 is repeated until all the skip positions are designated.

In #1012 and #1014, each label skip position is designated in each designation operation. However, when skip positions are continuous, a skip range may be set. In this case, a screen for inputting the start skip position and the end skip position of the continuous skip positions may be displayed in #1012, and the start and end coordinate positions may be input in #1014.

On the other hand, if the set label sheet has only one label ("YES" in #1002 and "YES" in #1004), the printing start position and the skip position need not be specified, and the setup operation is immediately ended.

Figure 41:
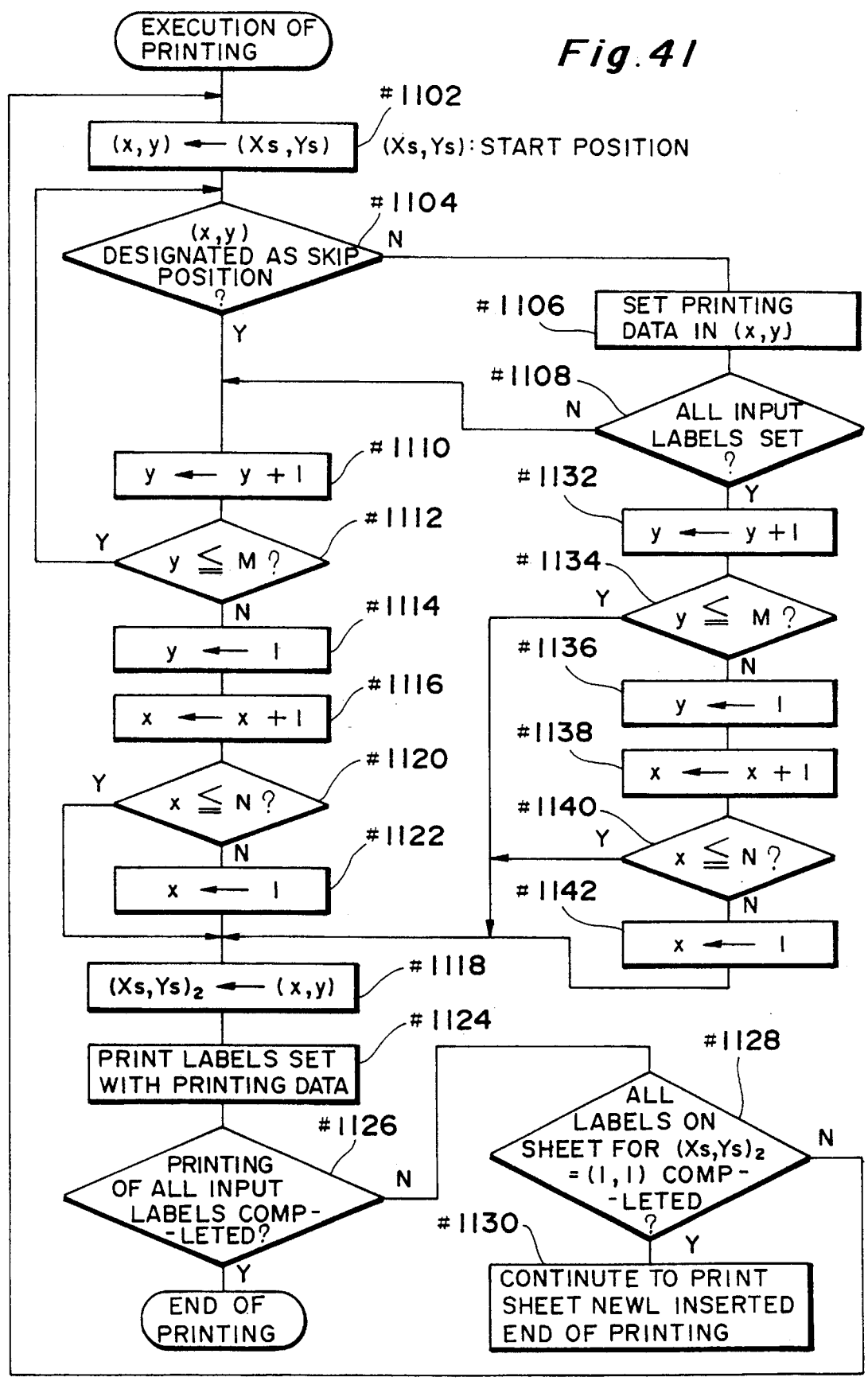
FIG. 41 is a flow chart showing printing execution processing.

After the printing start position and the skip positions are designated, printing processing in FIG. 41 is executed.

The coordinate position $(Xs,Ys)_1$ as the printing start position designated by the above setup operation is set to (x,y) (#1102) to determine whether the coordinate position (x,y) is designated as a skip position (#1004). If any skip position is not designated ("NO" in #1104), printing data representing a character string to be printed is set in a memory area corresponding to the position (x,y). If a plurality of labels to be printed are set ("NO" in #110.8), y of the coordinate position (x,y) is set to y+1 in #1110. Control is shifted to a label arranged to the right of the label at the start position, and processing in #1104 to #1112 is repeated. In this manner, printing data to be printed are sequentially set in memory areas corresponding to the respective coordinate positions.

When y is set to y+1 in #1110, and the actual horizontal label count exceeds a horizontal label count M ("NO" in #1112), a CPU 30 determines that the printing data are already set for a row of labels arranged on the label sheet. In this case, y is set to 1 (#1114) and the x is set to x+1 (#1116), so that control is shifted to the next row. At the same time, the position of the left end label of this line (row) is stored as a new printing start position $(Xs,Ys)_2$ (#1118). When the x is set to x+1 in #1116 and the actual vertical label count exceeds a vertical label count N ("NO" in #1120), the CPU 30 determines that printing setup of all the labels arranged on this label sheet is completed. In this case, since y is already set to 1, x is set to 1 in #1122, so that the printing start position $(Xs,Ys)_2$ is updated to a new label sheet position (1,1).

In this manner, after the next printing start coordinate position is stored, printing processing of a row of labels is performed on the basis of the currently set printing data (#1124). In the apparatus 1, the labels arranged on the label sheet are processed in units of rows, and printing processing is sequentially performed.

when printing processing of a row of labels is completed, and then printing of all the designated labels is completed ("YES" in #1126), the printing processing is completed. However, when the number of printed labels is not equal to the number of labels to be printed ("NO" in #1126), the CPU 30 determines in #1118 whether the printing start position $(Xs,Ys)_2$ is set to $(1,1)$, i.e., whether printing processing is performed on all the labels arranged on this label sheet. If a non-printed label is present on the label sheet ("NO" in #1128), processing from #1102 is repeated on the basis of the updated printing start position $(Xs,Ys)_2$. If the CPU 30 determines in #1128 that all the labels arranged on the label sheet are printed ("YES" in #1128), a message for prompting insertion of a new label sheet is displayed on a liquid crystal display unit 7. At the same time, printing processing for the new label sheet continues (#1130).

On the other hand, when the printing data is set for the position (x,y) in #1106, and the CPU 30 determines that the printing data are set for all the designated labels ("YES" in #1108), y of the coordinate position (x,y) is set to y+1 in #1132. Since the coordinate position of the label to the right of the label to which the printing data serves as the next printing start position, the coordinate position is updated to this coordinate position in #1118. The updated coordinate position is stored. Thereafter, printing processing of a row of labels to which the current printing data is set is performed (#1124). Printing is performed on all the designated labels ("YES" in #1126), and the printing processing is completed.

When y is set to y+1 in #1132, and the actual horizontal label count exceeds the horizontal label count M ("NO" in #1134), the CPU 30 determines that the printing data are already set for a row of labels arranged on this label sheet. The coordinate position of a label located at the left end of the next line is set as the next printing start position (#1136 and #1138). When x is set to x+1 in #1138, and the actual vertical label count exceeds the vertical label count N ("NO" in #1140), the CPU 30 determines that printing setup of all the labels arranged on this label sheet is completed. In this case, the printing start position $(Xs,Ys)_2$ is set to a new label sheet position $(1,1)$ (#1142 and #1118).

When the printing processing is finally completed, since the coordinate position serving as the next printing processing start position is stored in #1118, the coordinate position $(Xs,Ys)_2$ representing the next printing start position is stored in a storage unit 31 in correspondence with the sheet number of the label sheet, some labels of which are already used.

Figure 42:
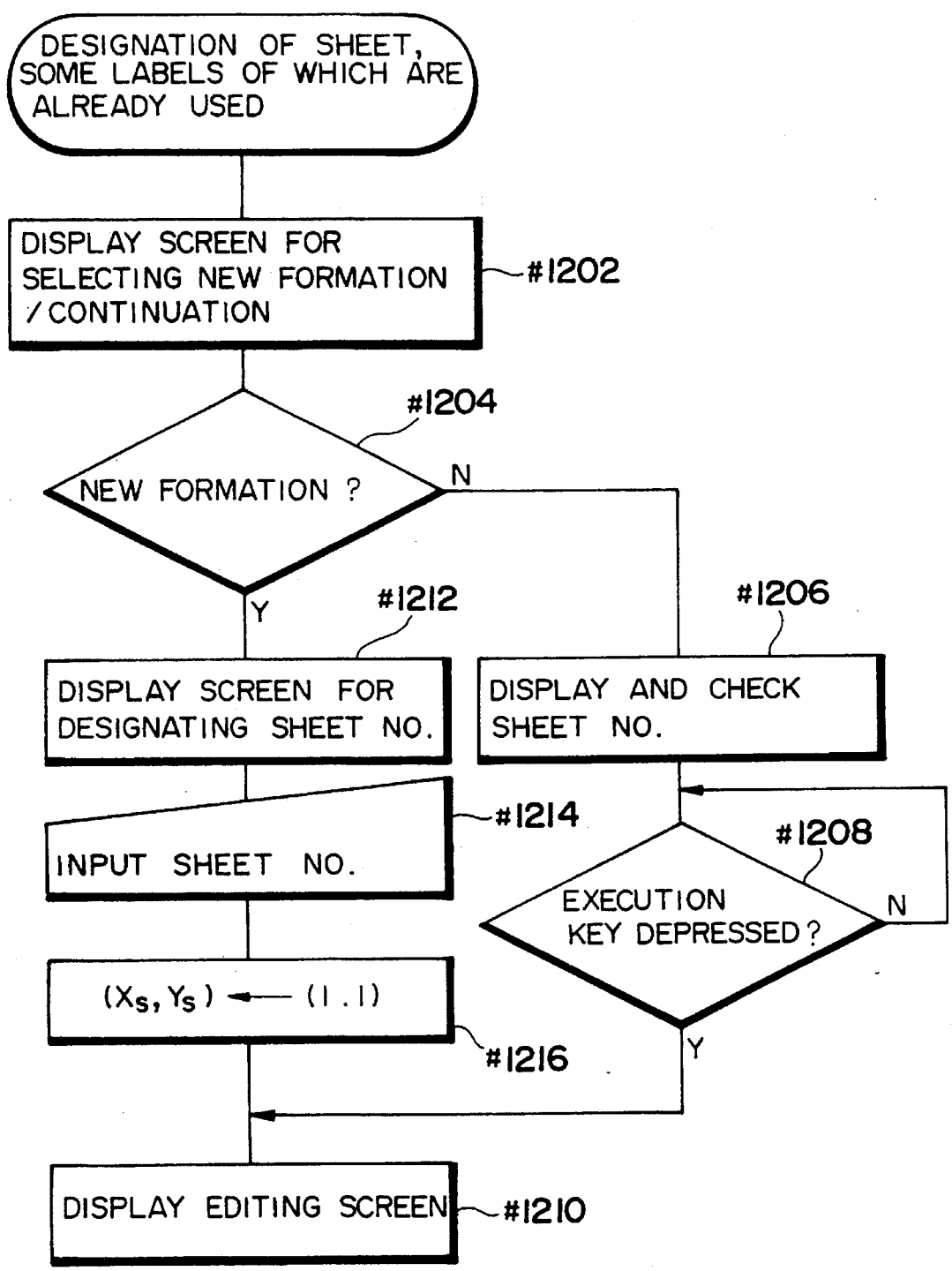
FIG. 42 is a flow chart showing initial setup when printing is continuously performed on the printed label sheet.

Initial setup processing for the next printing processing using the label sheet, some labels of which are already used, will be described with reference to a flow chart in FIG. 42.

When a power switch 6a is turned on, hardware initialization is performed. When the user selects "label formation", two selection menus of "new formation" and "continuation" are displayed on the screen (#1202).

At this time, when the user selects "continuation" ("NO" in #1204), the sheet number of a label sheet, some labels of which are already used, is displayed (#1206). When the user confirms the sheet number displayed on the screen and depresses the "execution" key ("YES" in #1208), an editing screen as a character input screen is displayed (#1210). At this time, the previously stored character string is displayed on the screen.

On the other hand, when "new formation" is selected in #1204 ("YES" in #1204), the screen is switched to a designation screen for designating the sheet number of a label sheet to be used (#1212). When the user inputs a sheet number (#1214), the designated label sheet is determined as an unused label sheet, and a coordinate position $(1,1)$ is set as a printing start position Since the flow chart of FIG. 42 partially overlaps the flow chart in FIG. 8, the description made with reference to FIG. 8 will also be referred to.

This embodiment exemplifies a case in which the printing start position and the like are set for a label sheet having plural arrays of labels arranged in the x and y directions. However, when setup data are to be set for a label sheet having one array of labels in only the x or y direction, a setup screen for designating only one of the coordinates such as "A−"or "−1" is displayed on the liquid crystal display unit 7.

Since the apparatus 1 has the above function, a position at which no label is present can be input and designated beforehand in printing of a label sheet having some handwritten labels, an expensive sensor or the like for detecting the presence/absence of a label need not be arranged, and unnecessary portions can be accurately specified. In addition, when printing is to be restarted on a label sheet, some labels of which are already used, the user need not designate the printing start position, thereby minimizing tile cumbersome operation performed by the user.

<Ninth Embodiment>

Figure 43:
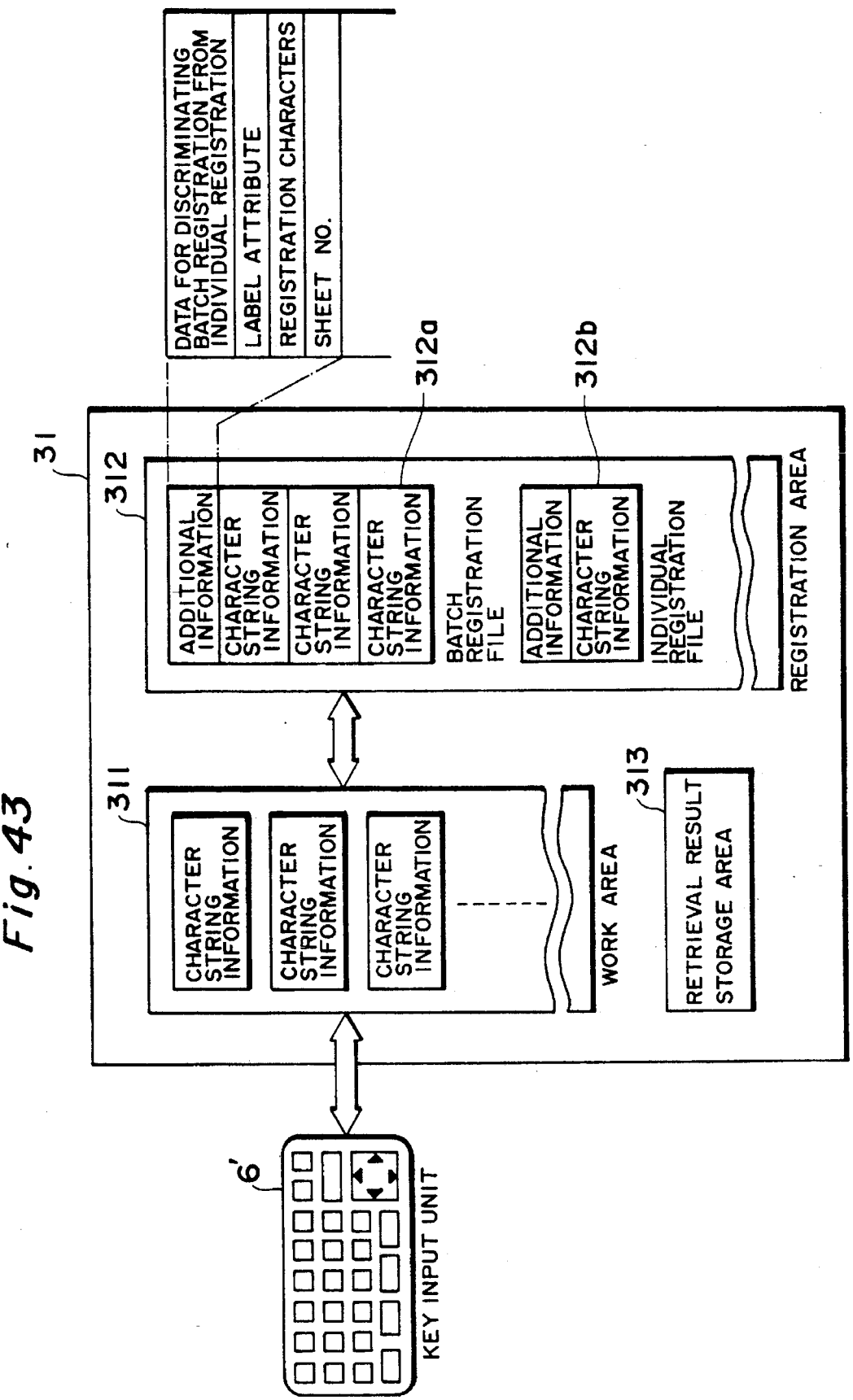
FIG. 43 is a view showing the general concept of character label registration processing and character label read processing.

Registration processing and readout processing of the formed character strings will be generally described with reference to FIG. 43. A storage unit 31 has a work area 311, a registration area 312, and a retrieval result storage area 313. When a character string is input from a key input unit 6', this data is stored in the work area 311. The input character string (character string information) is registered such that the character string information read out from the work area 311 and additional information corresponding to this character string information are written in the registration area 312 as a registration file (registration information). Registration files are generally classified into a batch registration file 312a and an individual registration file 312b. The batch registration file 312a stores a plurality of pieces of character string information in combination with one additional information. The individual registration file 312b stores one character string information in combination with one additional information. The character string information is loaded by writing the character string information read out from the registration area 312 in the work area. The retrieval result storage area 313 is a memory area used for retrieving the character string information in the registration area 312. The additional information written together with the character string information in the registration area includes data for discriminating batch registration from individual registration, a label attribute, registration characters, and a sheet number.

Figure 44:
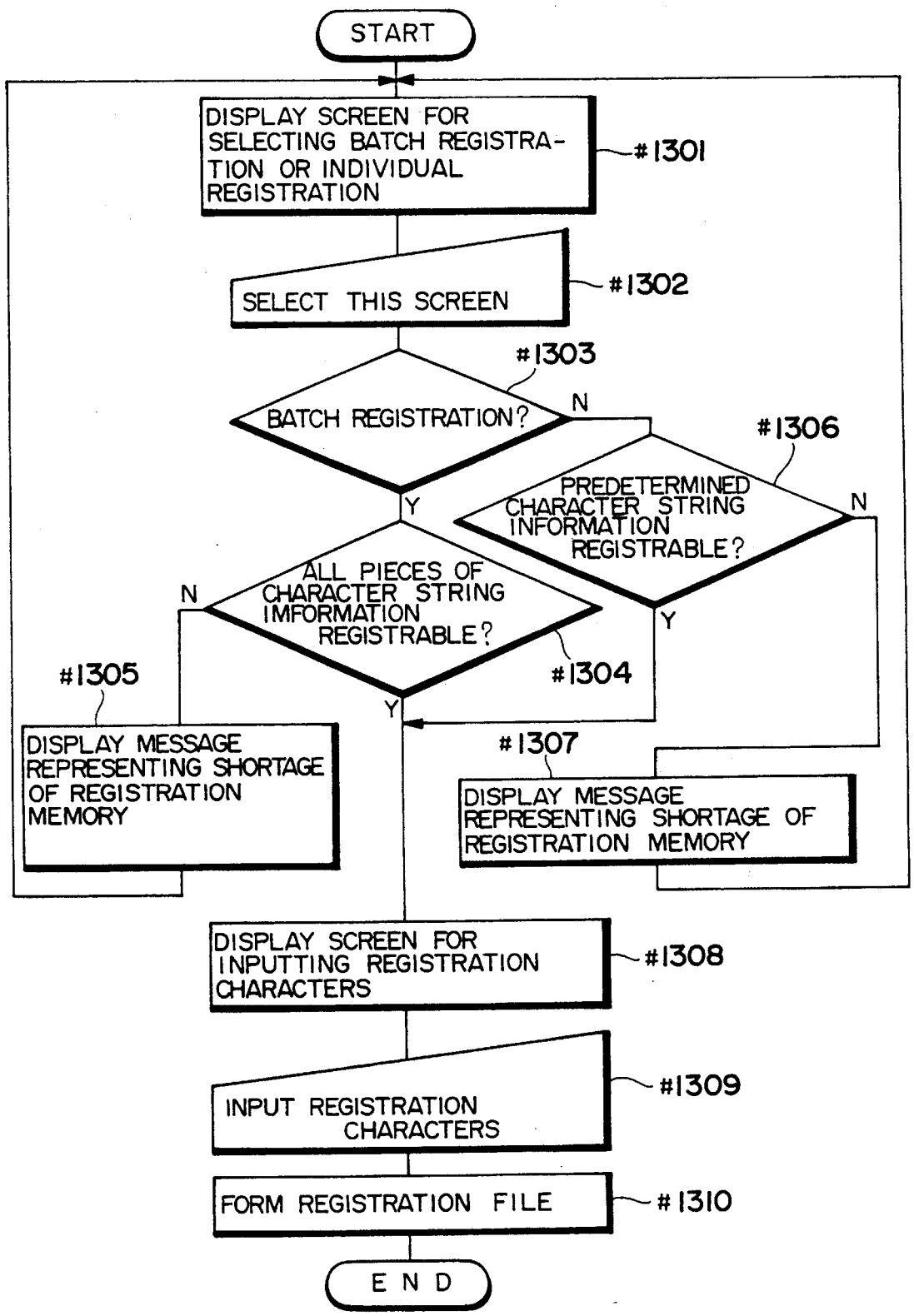
FIG. 44 is a flow chart showing character label registration processing.

Registration processing of a formed character string will be described with reference to a flow chart in FIG. 44. A selection screen for selecting batch registration or individual registration is displayed on a liquid crystal display unit 7 (#1301). When the user selects the batch registration on the selection screen (#1302 and #1303), a CPU 30 determines whether an area enough to register all the character string information held in the work area 311 is left in the registration area 312 (#1304). If the sufficient area is not left in the registration area 312, a message representing a memory shortage is displayed (#1305), and the flow returns to #1301. When the user selects the individual registration on the selection screen (#1302 and #1303), the CPU 30 determines whether an area enough to register predetermined character string information held in the work area 311 is left in the registration area 312 (#1306). If the sufficiently large area is not left in the registration area. 312, a message representing a memory shortage is displayed (#1307), and the flow returns to #1301.

When the sufficiently large area is left in the registration area 312, a registration character input screen is displayed on the liquid crystal display unit 7 (#1308). Registration characters are constituted by two characters for identifying each registration file in the registration area 317. When the user inputs registration characters in accordance with the prompt on the input screen, a registration file is formed (#1310).

Figure 45:
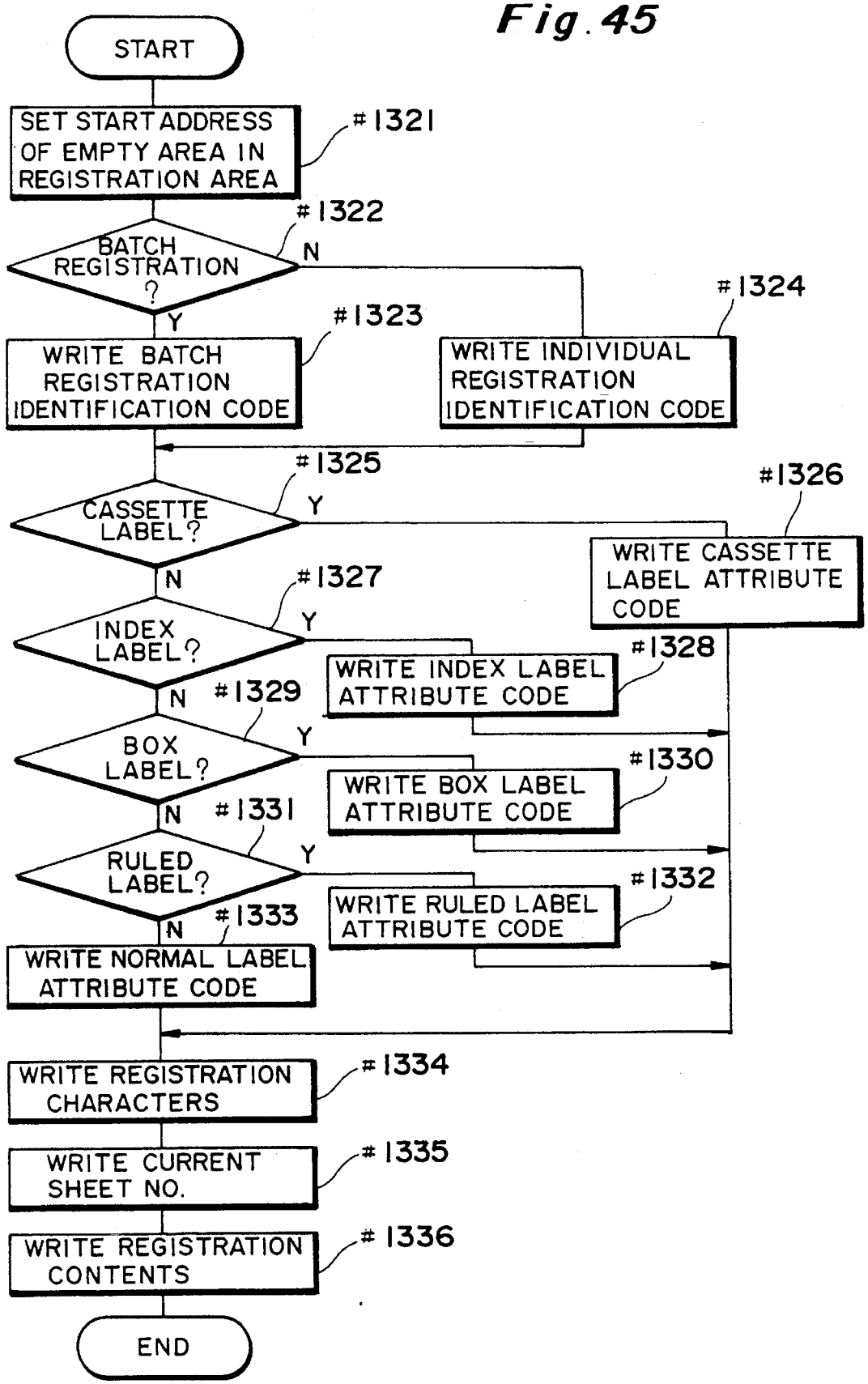
FIG. 45 is a flow chart showing registration file formation processing.

The detailed contents of registration file formation processing in #1310 are shown in a flow chart in FIG. 45. In this processing, the start address of an empty area in the registration area 312 is set (#1321). When the user selects the batch registration in #1302 ("YES" in #1322), a batch registration identification code is written in the area designated by the start address (#1323). However, when the user selects the individual registration in #1302 ("NO" in #1322), an individual registration identification code is written in the area designated by the start address (#1324). The type (attribute) of label corresponding to the character string information to be registered is checked whether to be a cassette label (#1325). If the type of label sheet is of a cassette label, an attribute code corresponding to the cassette label is written in the area in which the identification code is written (#1326). Similarly, the CPU 30 determines whether the type of label is of an index label (#1327). If YES in #1327, an attribute code corresponding to the index label is written in the next area (#1328). Similarly, the type of label is determined whether the type of label is of a box label or a ruled label (#1329 to #1332). If the type of label does not correspond to any one of the above labels, an attribute code corresponding to a normal label is written (#1333). The registration characters are written in an area next to the area of the attribute code (#1334). The current sheet number and the character string information are sequentially written in the area next to that of the registration characters (#1335). The registration file shown in FIG. 43 is formed by the above processing.

Since an apparatus 1 can perform batch registration for collectively registering a plurality of pieces of character string information in addition to individual registration for registering each character string information, the plurality of pieces of character string information can be collectively read out. In printing processing, a cumbersome operation for sequentially reading out all pieces of character string information to perform individual printing processing can be eliminated. Even a plurality of character strings can be processed in batch printing processing.

Figure 46:
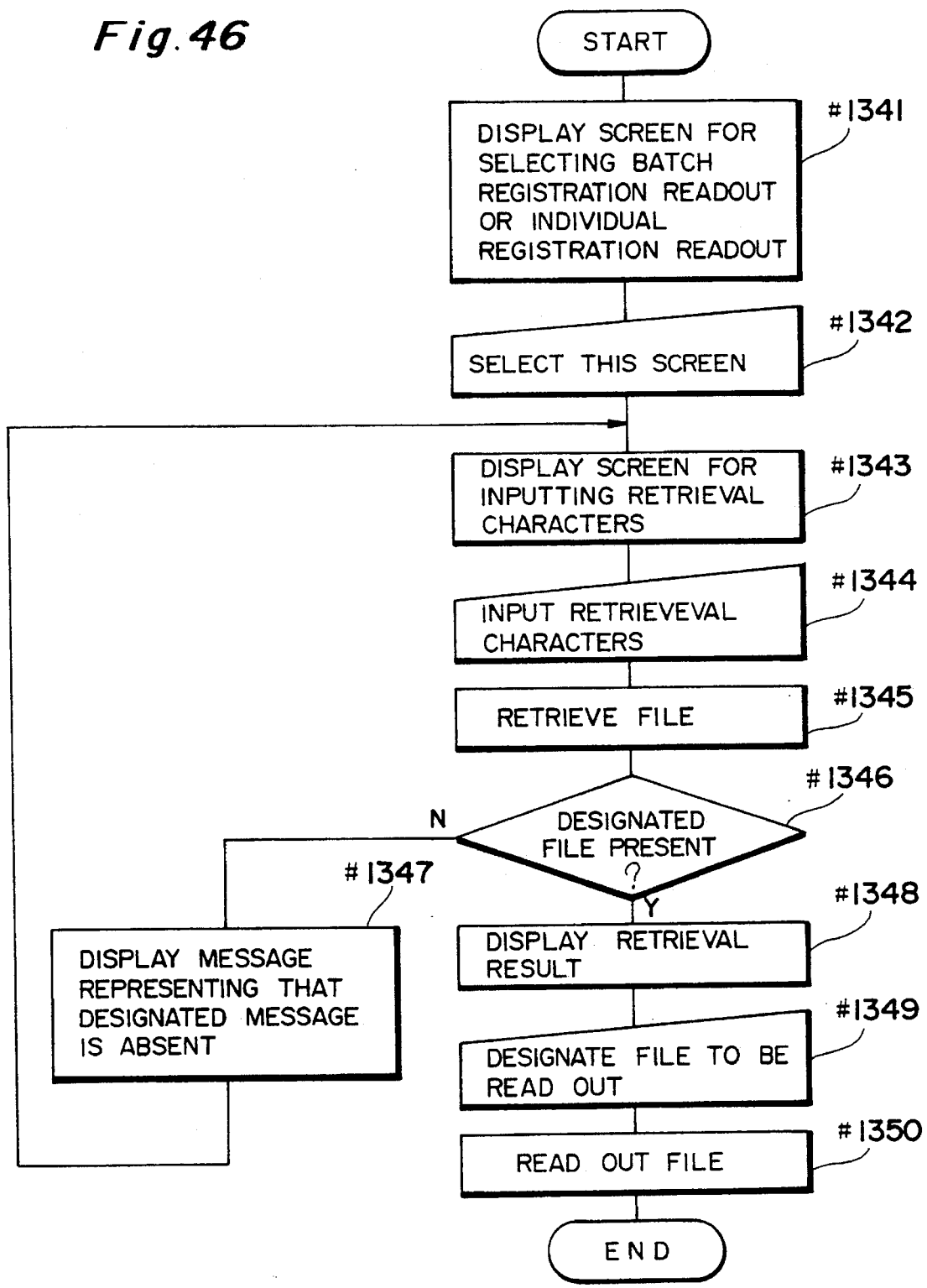
FIG. 46 is a flow chart showing character label read processing.

Readout processing of registered character string information will be described with reference to a flow chart in FIG. 46. A selection screen for selecting a batch registration scheme or an individual registration scheme of a registration file to be read out is displayed on the liquid crystal display unit 7 (#1341). The user selects one of the registration schemes on this selection screen (#1342). An input screen for prompting a key-in operation for retrieval characters is displayed on the liquid crystal display unit 7 (#1343). The retrieval characters are defined as the registration characters or characters obtained by substituting some or all of the registration characters with a space (blank) or spaces. This space indicates any character. For example, "A" ("A" and space) is given as the retrieval characters, all registration files each started with the first character as "A" are retrieved.

Registration file retrieval processing is executed (#1345) when the user enters the retrieval characters (#1344).

If a designated registration file is not found in the retrieval processing (#1346), a message representing the absence of the designated registration file is displayed on the liquid crystal display unit 7 (#1347), and the flow returns to #1343. However, if the designated registration file is found in the retrieval processing (#1346), the first seven characters of the character string information in the retrieved registration file are displayed on the liquid crystal display unit 7 (#1348). When the retrieval characters are designated by only alphanumeric characters without including any space, only one registration file is retrieved. Therefore, only one character string information of the registration file is displayed on the liquid crystal display unit 7. However, when the retrieval characters include a space, a plurality of registration files may be retrieved. In this case, a plurality of pieces of character string information of a plurality of registration files are sequentially displayed on the liquid crystal display unit 7.

When the user designates a registration file to be loaded (#1349), the designated registration file is read out from the registration area 312, and the character string information of the registration file is written in the work area 311 (#1350).

Figure 47:
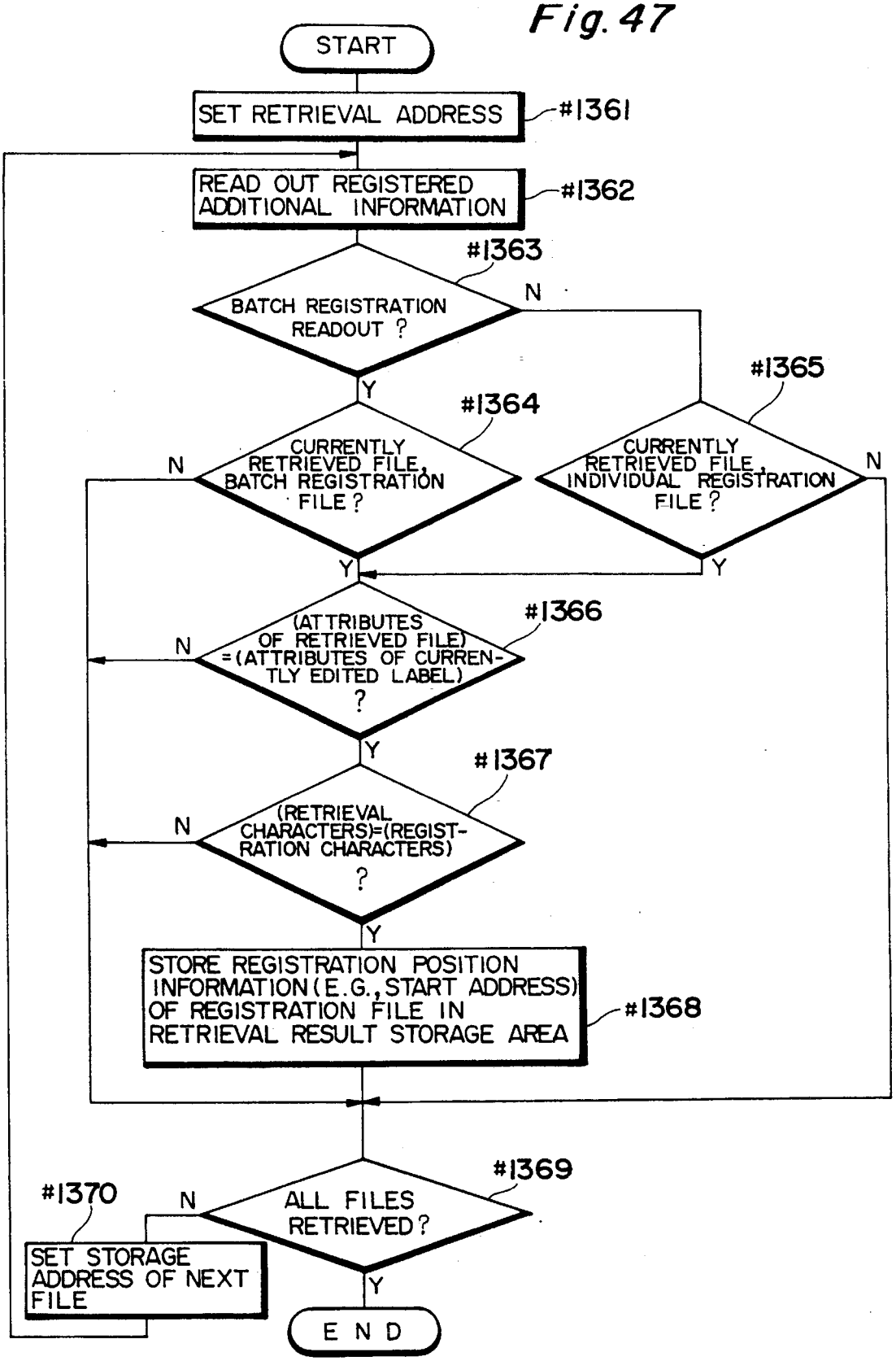
FIG. 47 is a flow chart showing registration file retrieval processing.

The detailed contents of the registration file retrieval processing in #1345 are shown in a flow chart in FIG. 47. In this processing, the storage address of the first registration file is set as a retrieval address (#1361). Additional information of the registration file designated by this retrieval address is loaded (#1362). When determination result (#1363) of selection (#1341) of the registration scheme does not coincide with the type of registration, i.e., batch or individual registration represented by the additional information, retrieval of this registration file is ended (#1364 and #1365). If the label attribute in the additional information does not coincide with the attribute of the current editing label, retrieval of this registration file is ended (#1366). In addition, when the retrieval characters input in #1344 do not coincide with the registration characters in the additional information, retrieval of this registration file is ended (#1367). When the retrieval characters coincide with the registration characters, the registration position information (e.g., a start address) of the retrieved registration file is stored in the retrieval result storage area 313 in the storage unit 31 (#1368). When the retrieval characters include a space, since the space indicates any character, the input retrieval characters may coincide with different pairs of registration characters. In this case, a plurality of pieces of registration position information are stored in the retrieval result storage area 313. For example, when "A" ("A" and space) is input as the retrieval characters, all pieces of registration position information of all the registration files starting with the first character as "A" are stored. When "" (two spaces) is input as the retrieval characters, all pieces of registration position information of all the registration files are stored. Processing in #1362 to #1368 is performed for all the registration files (#1369) while the retrieval address is being updated in an order of the storage address of the next registration files (#1370).

Figure 48:
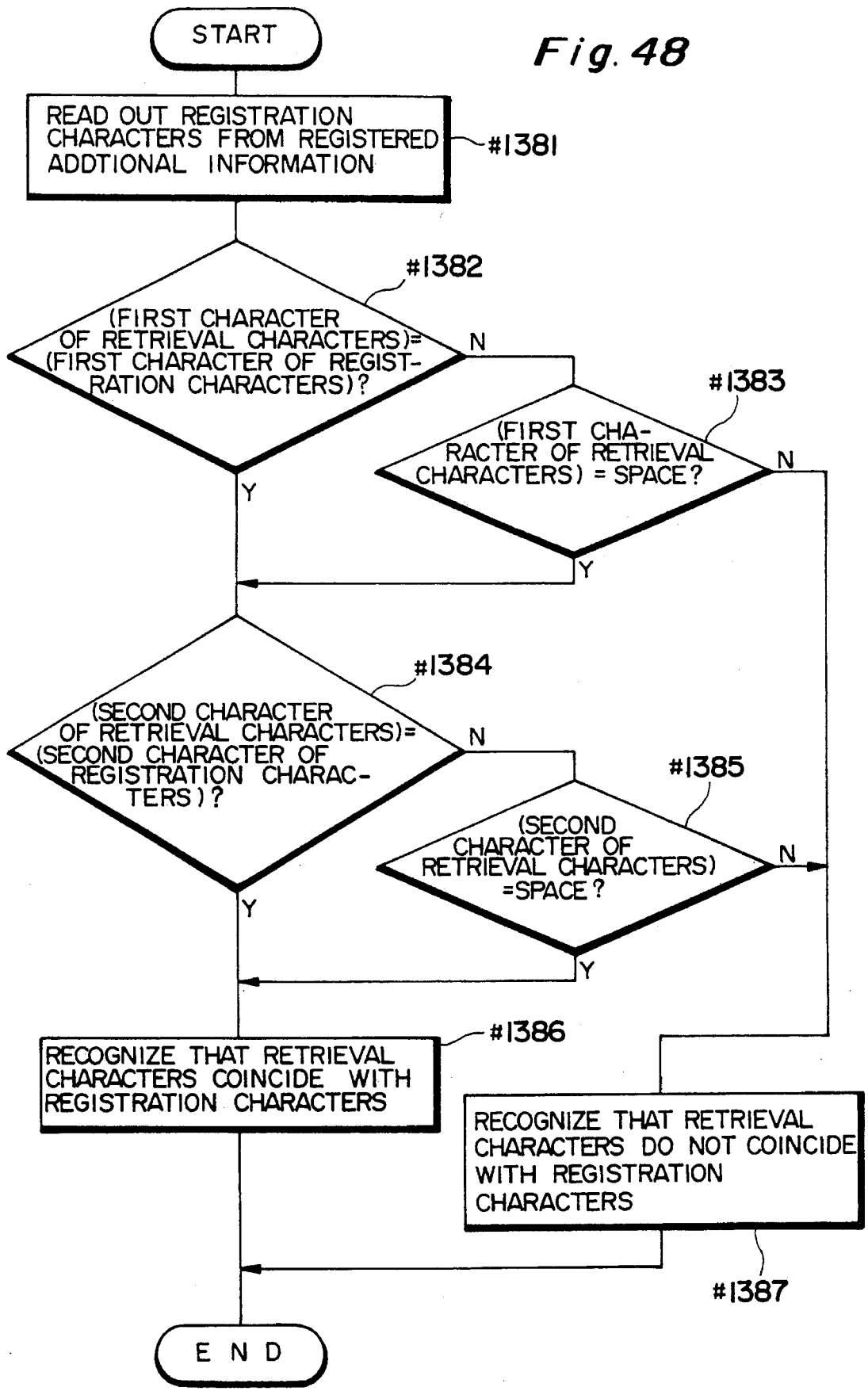
FIG. 48 is a flow chart showing processing for comparing retrieval characters with registration characters.

Comparison processing between the retrieval and registration characters in step #1367 will be described with reference to a flow chart in FIG. 48. Registration characters are read out from the additional information of the registration file (#1381). The first character of the retrieval characters is compared with the first character of the registration characters (#1382). If these first characters do not coincide with each other, it is checked if the first character of the retrieval characters is a space (#1383). If the first character of the retrieval characters coincide with that of the registration characters, or the first character of the retrieval characters is a space, the second character of the retrieval characters is compared with the second character of the registration characters (#1384). If the second character of the retrieval characters does not coincide with the second character of the registration characters, it is checked whether the second character of the retrieval characters is a space (#1385). If the second character of the retrieval characters coincides with that of the registration character or the second character of the retrieval characters is a space, the CPU 30 determines that the retrieval characters coincide with the registration characters (#1386), and the flow advances to #1386. If the first character of the retrieval characters is determined in #1383 not to be a space, or the second character of the retrieval characters is determined in #1385 not to be a space, the CPU 30 determines that the retrieval characters do not coincide with the registration characters, and the flow advances to step #1369.

The label attributes compared in #1366 represent classification into a cassette label, an index label, a box label, a ruled label, and a normal label. The label forms can be identified in accordance with sizes of predetermined portions of the respective labels and the sheet numbers assigned to the respective labels.

Figure 49A:
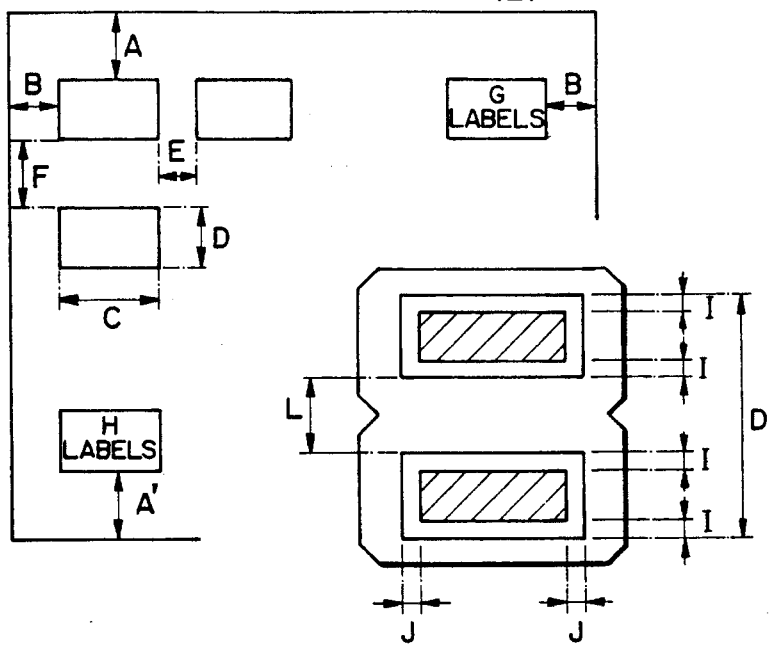
FIGS. 49A and 49B are views showing the outer appearances of label shapes.

FIGS. 49A to 51B show the shapes of the respective labels. FIG. 49A shows a tack index sheet, and the shape of each index label adhered on this sheet. "A" to "K" in FIG. 49A define the sizes and the number of labels. The label is discriminated in accordance with the presence/absence of "J" and "K". As shown in FIG. 49A, a distance "K" is set, but a length "J" is not set.

Figure 49B:
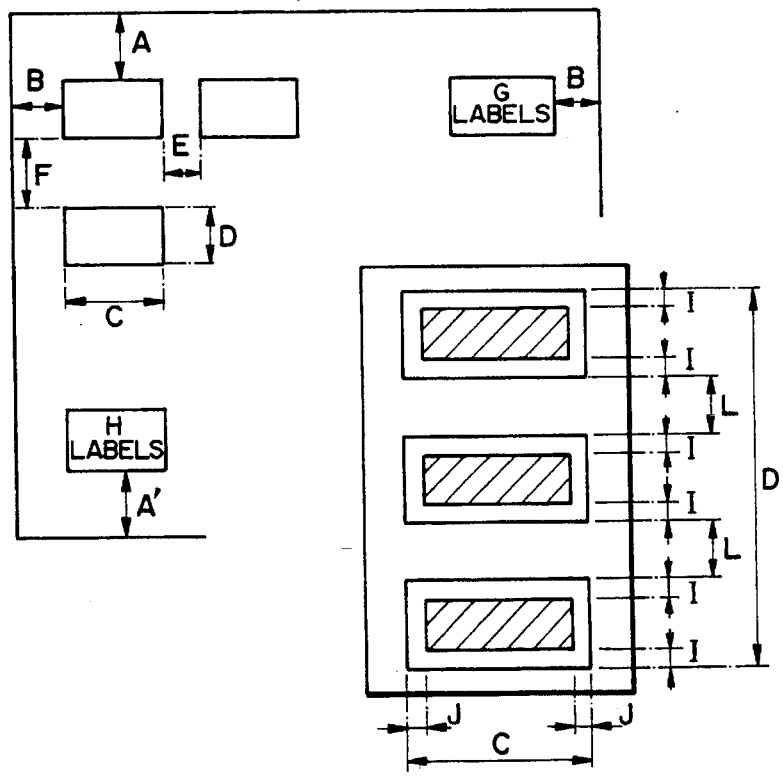

FIG. 49B shows a box filing label sheet and the Shape of each box label adhered on this sheet. A distance "K" is set in the box filing label, but a length "J" is not set therein. For this reason, since the tack index sheet cannot be discriminated from the box filing label sheet due to the presence/absence of "J" and "K", and the label attributes are discriminated in accordance with sheet names.

Figure 50A:
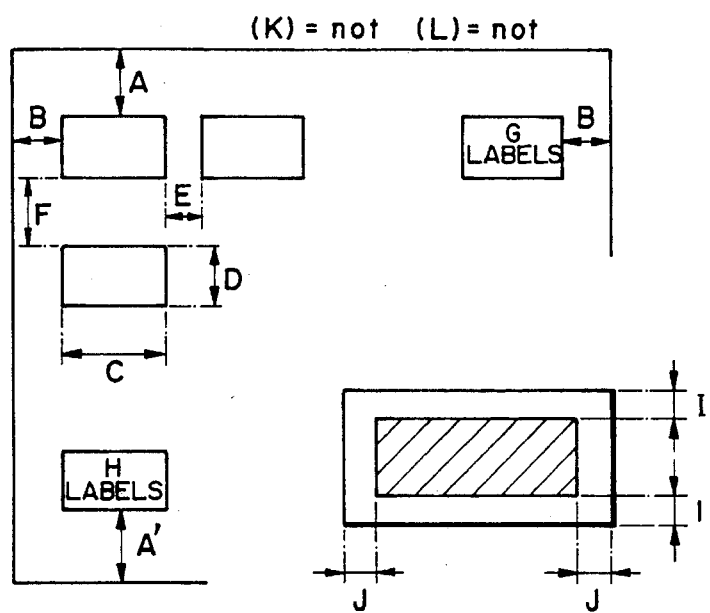
FIGS. 50A and 50B are views showing the outer appearances of label shapes.

FIG. 50A shows a tack title sheet and the shape of each normal label adhered on this sheet. Referring to FIG. 50A, "J" and "K" are set on the tack title sheet.

Figure 50B:
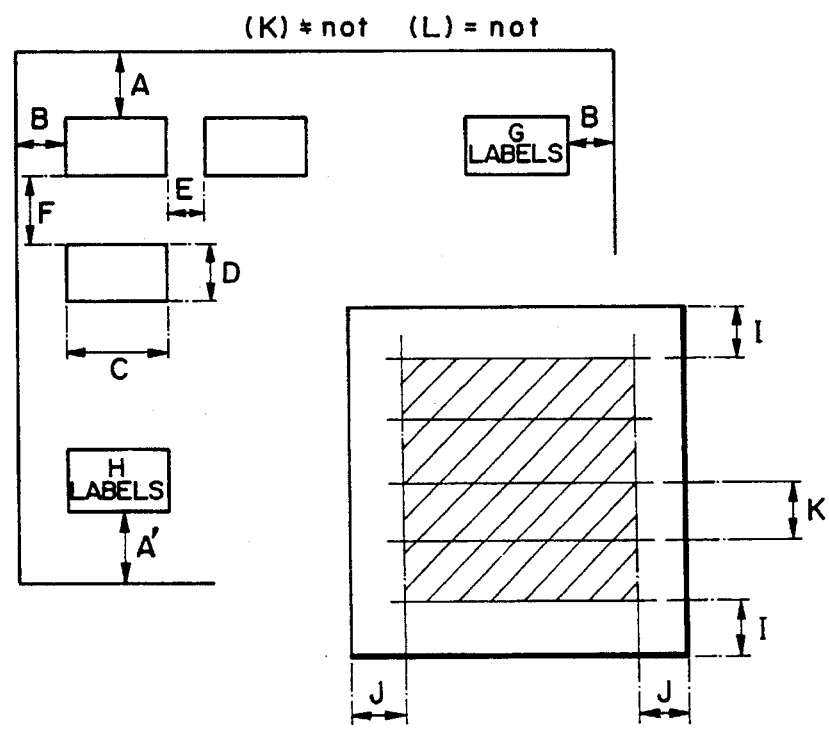

FIG. 50B shows a ruled tack title sheet and the shape of each ruled label adhered on this sheet. Referring to FIG. 50B, "J" is set on the ruled tack title sheet, but "K" is not set thereon.

Figure 51A:
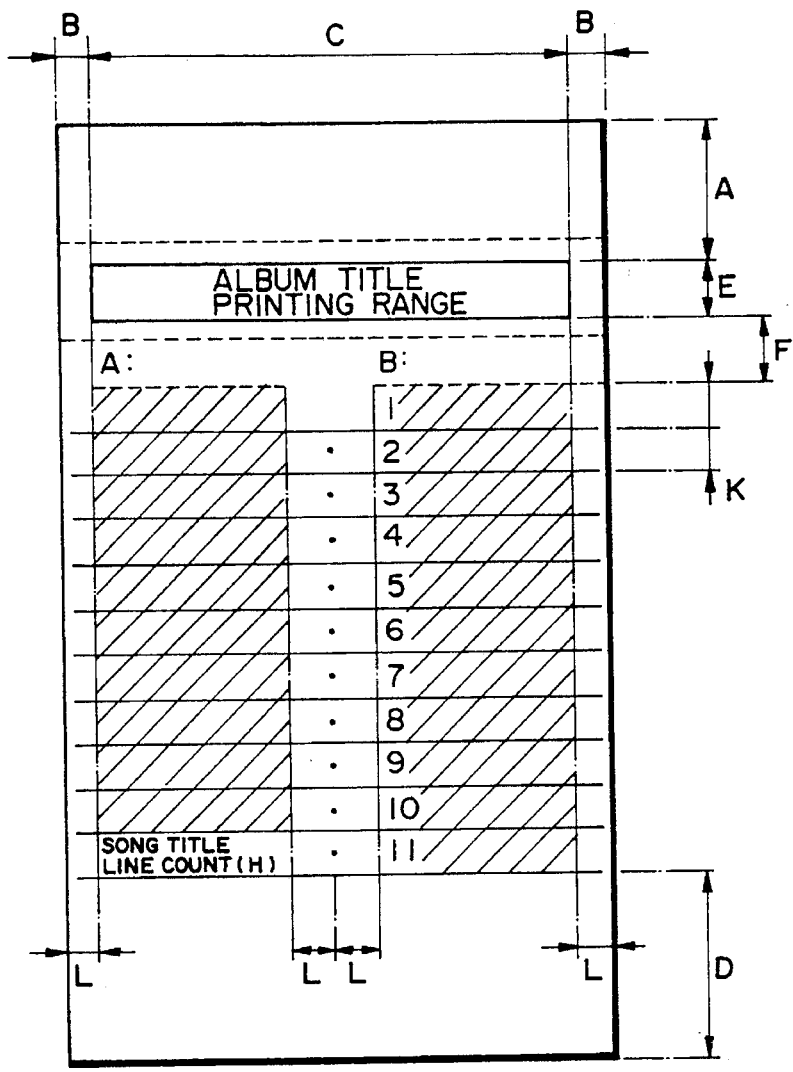
FIGS. 51A and 51B are views showing the outer appearances of label shapes.
Figure 51B:
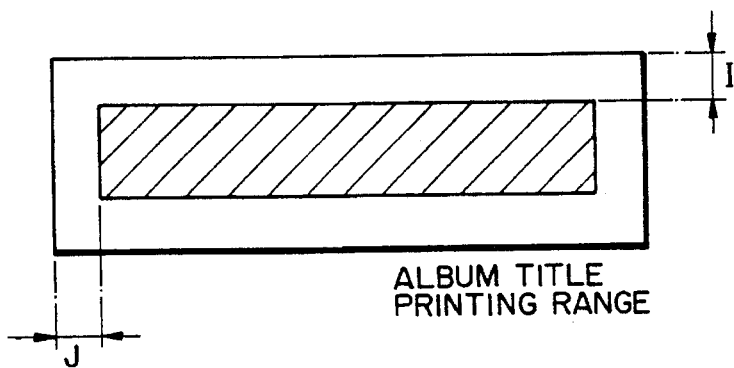

FIG. 51A shows the shape of a cassette label, and FIG. 51B shows the shape of the album title printing range of this cassette label. Referring to FIG. 51A, both "J" and "K" are set on the cassette label.

Since the tack title sheet, the ruled tack title sheet, and the cassette label can be discriminated from each other due to the presence/absence of "J" and "K", their label attributes can be discriminated in accordance with the presence/absence of "J" and "K". That is, the label attributes are discriminated from each other in accordance with the presence/absence of "J" and "K", and the label attributes of labels (i.e., the tack index sheet and the box filing label) which cannot be discriminated in accordance with the presence/absence of "J" and "K" are discriminated in accordance with the sheet numbers.

As described above, the scheme for discriminating the label attributes in accordance with the sizes of the predetermined portions ("J" and "K" in this embodiment) of the labels is employed. For this reason, when a non-standard label is to be registered in the storage unit 31 and is then used, labels whose label attributes can be discriminated in accordance with the sizes of the predetermined portions need not be assigned with the label information associated with the label attribute, thereby saving the memory capacity.

In this embodiment, if registration files have different label attributes in the comparison in #1366, these registration files are eliminated from the objects to be retrieved. For this reason, retrieval processing can be performed at high speed. In this manner, the registration files having different label attributes are eliminated from the objects to be retrieval because labels having different label attributes have different shapes, and printing on the labels cannot be performed even if the character string is loaded.

<Tenth Embodiment>

An apparatus 1 can perform printing on different types of label sheets if they have the same label attributes as those in registration upon readout of the registered character string.

The respective processing operations for executing this printing processing will be described below.

Figure 52:
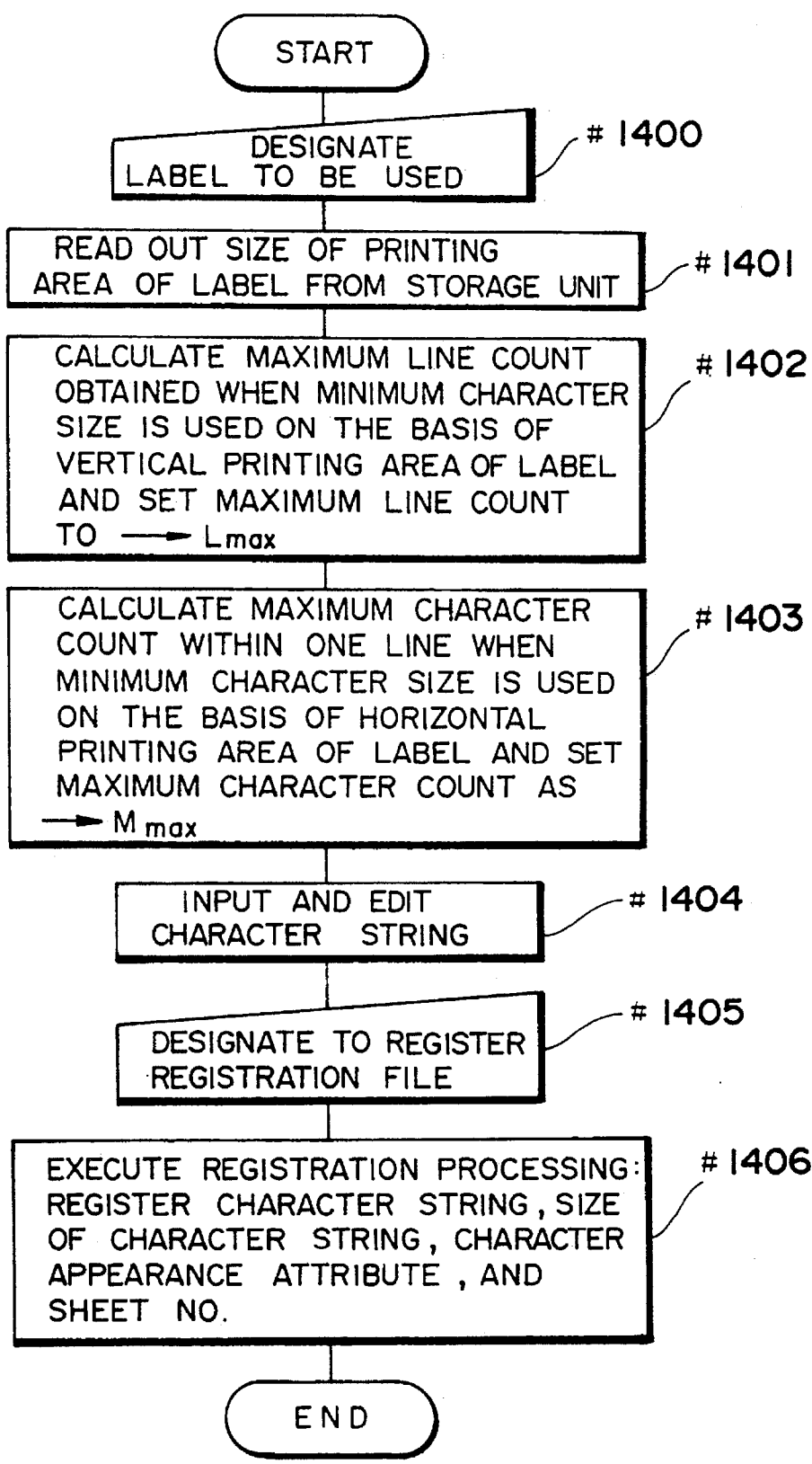
FIG. 52 is a flow chart showing processing for inputting a character string and registering it in a storage unit.

FIG. 52 is a flow chart showing processing for inputting a character string and registering it in a storage unit 31. If a sheet number (identification code) of a label sheet on which a character string is to be printed is input (#1400), the vertical and horizontal lengths of a printing range of a label corresponding to this sheet are read out from the storage unit 31 (#1401). A maximum line count ($L_{max}$) capable of printing characters each having a minimum character size is calculated in accordance with the vertical length of the printing range (#1402). A maximum character count ($M_{max}$) capable of printing characters each having a minimum character size is calculated in accordance with the horizontal length of the printing range (#1403). Thereafter, operations for inputting and editing a character string to be printed are performed (#1404). Upon completion of the input and editing operations, if the edited character string is designated to be registered (#1405), registration processing is performed (#1406). This registration processing is processing for registering the edited character string (character string information) and additional information of this character string as a registration file (registration information) in the storage unit 31. The additional information includes character size information of characters constituting the character string, the character appearance attribute of the character string, the sheet number of the label Sheet on which the character string is printed, and information for discriminating automatic character size from the character size designated by the user.

When printing processing for printing information on a label is designated upon completion of the processing in #14104, the character string edited by the input/editing operation is printed on a label corresponding to the :sheet number input in #1400.

Figure 53:
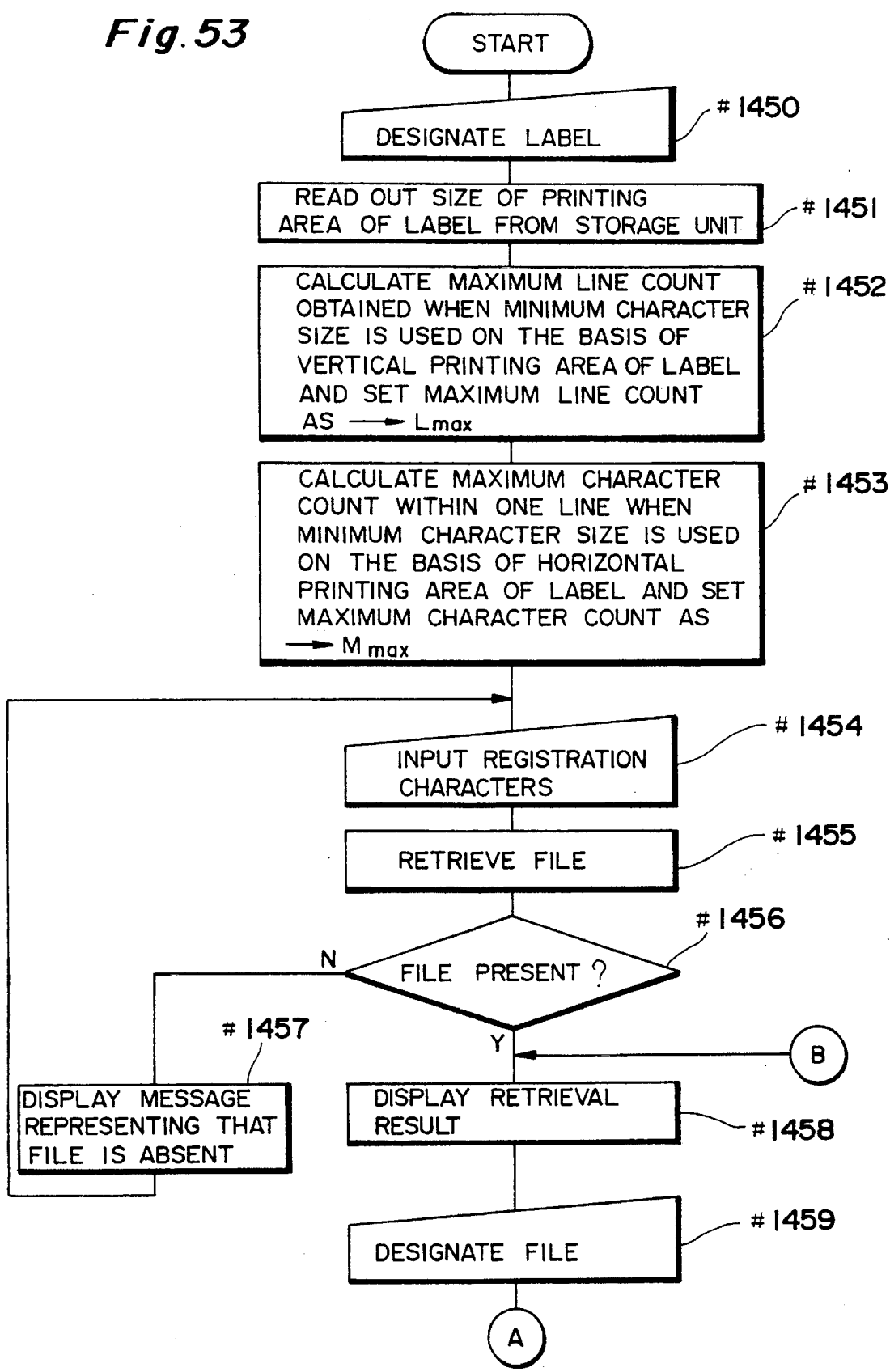
FIG. 53 is a flow chart showing processing for reading out the character string registered in the storage unit.
Figure 54:
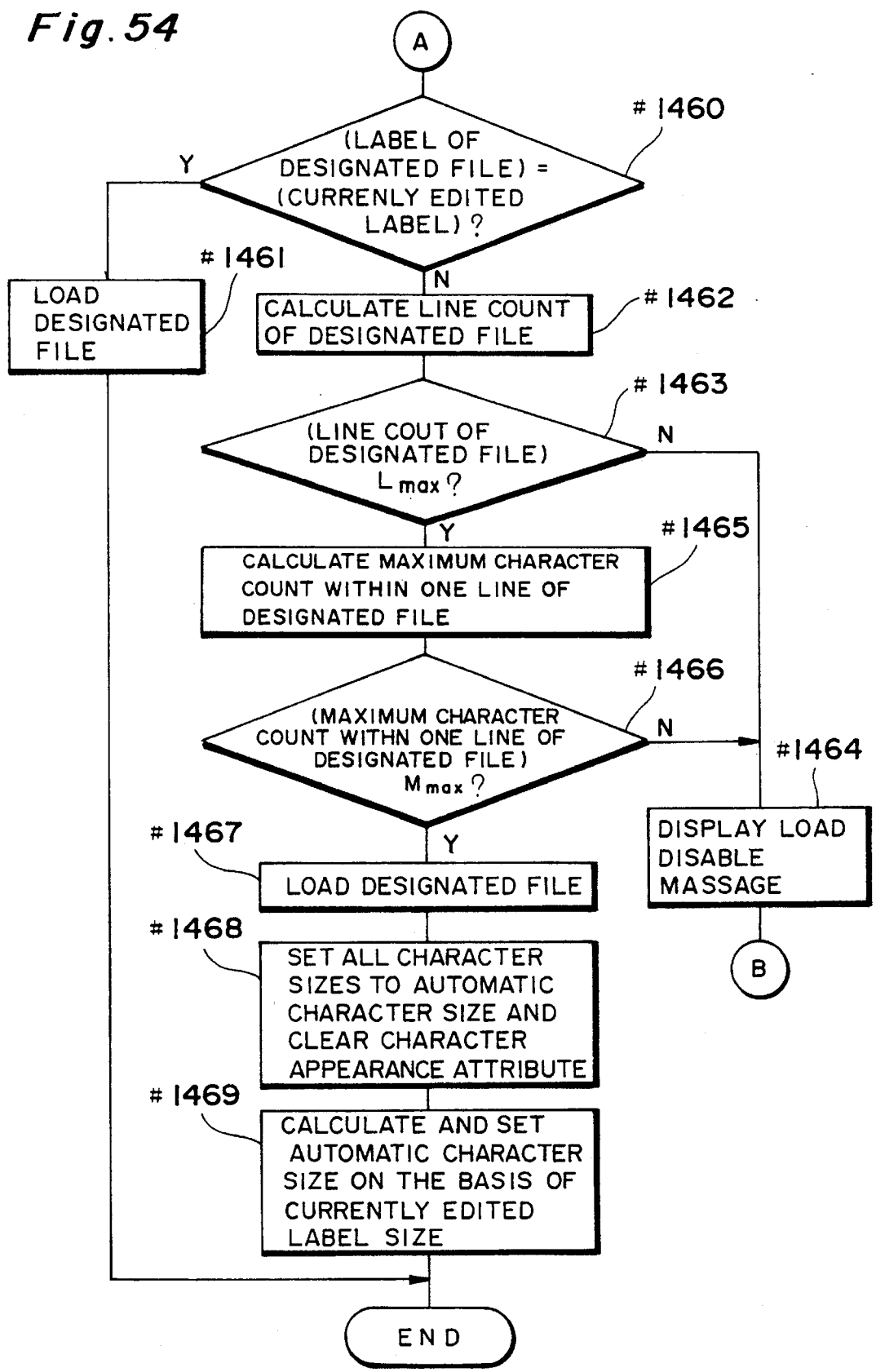
FIG. 54 is a flow chart showing processing for reading out the character string registered in the storage unit.

FIGS. 53 and 54 are flow charts for reading out a character string registered in the storage unit 31. When a sheet number of a desired label sheet on which a character string is to be printed is input (#1450), the vertical and horizontal lengths of a printing range of a label corresponding to the sheet number are read out from the storage unit 31 (#1451). A maximum line count ($L_{max}$) capable of printing characters each having a minimum character size is calculated in accordance with the vertical length of the printing range (#1452). A maximum character count ($M_{max}$) capable of printing characters each having a minimum character size is calculated in accordance with the horizontal length of the printing range (#1453). When registration characters for specifying a registration file are input (#1454), retrieval from a large number of pieces of registered additional information is started (#1455). The registration characters consist of two predetermined characters input in registration of character string information or the like. As a result of retrieval, if a registration file cannot be found (#1456), a message representing that the: designated registration file is not present is displayed, and processing is ended (#1457). On the other hand, as a result of retrieval, if the registration file is found (#1456), the first seven characters of the character string in the registration file are displayed on a liquid crystal display unit 7 (#1458). This retrieval can be performed by designating one of the two characters as registration characters, as described above. In this case, a plurality of registration files may be retrieved, and the first seven characters of the plurality of character strings are sequentially displayed on the liquid crystal display unit 7. The user vertically shifts the cursor to designate a predetermined registration file (#1459). It is checked whether the sheet number input in #1450 coincides with the sheet number in the retrieved additional information (#1460). If YES in #1460, the character string information corresponding to this additional information is loaded (#1461). If NO in #1460, the next processing is performed. The line count of the character string in the registration file designed in #1459 is calculated (#1462). If this line count is larger than the maximum line count ($L_{max}$) calculated in #1452 (#1463), a message saying that "This label cannot be loaded" is displayed on the liquid crystal display unit 7 (#1464), and the flow returns to #1458. When the maximum line count calculated in #1462 is equal to or smaller than the maximum line count ($L_{max}$) (#1463), the maximum character count within the line of the character string of the registration file designated in #1459 is calculated in #1465. If this maximum character count is larger than the maximum character count ($M_{max}$) calculated in #1453 (#1466), a message saying that "This label cannot be loaded" is displayed on the liquid crystal display unit 7 (#1464), and the flow returns to #1458. If the maximum character count calculated in #1465 is equal to or smaller than the maximum character count ($M_{max}$) calculated in #1453 (#1466), the registration file is loaded (#1467). The character size information and the character appearance attribute information in the registration file are cleared, and the character size of the character string in the registration file is set to the automatic character size (#1468). The character appearance attribute information is cleared because the character size may be substantially increased by the character appearance attribute. The character size of this character string is set to fall within the printing range of the label read out from the storage unit 31 in #1451 (#1469). The character string in the registration file is displayed on the liquid crystal display unit 7 in the character size set as described above.

Subsequently, editing processing of the character string displayed on the liquid crystal display unit 7, registration processing of the registration file in the storage unit 31, or printing processing is performed.

<Eleventh Embodiment>

Special numbers and symbols which cannot be converted into kanji characters are included in the characters input by the operator. All these symbols and numbers except for general ones must be input using codes or a retrieval function. For this reason, when these symbols frequently appear, the input operation is time-consuming, resulting in inconvenience.

An apparatus 1 has a wordprocessing function to be described below.

In this wordprocessing function, when the operator inputs a punctuation mark ",", a punctuation mark group consisting of ",₃∧" is displayed on the display. When a full stop "." is input, a full stop group consisting of "o.?!" is displayed on the display In addition, when a conjunction mark "~" is input, a conjunction mark group consisting of "—. . . · . . . " is displayed on the display. Similarly, when a parenthesis "(" is input, a parenthesis group consisting of "([. . . " is displayed on the display. When a number "2" is input, a number group consisting of "2 ②II . . . " is displayed on the display.

When the operator uses the cursor shift keys to move the cursor to the desired data in the selection data group displayed on the display. When the operator depresses "confirmation" key at this position, the desired data is confirmed. The desired data is updated as non-confirmed data which is then displayed on the display.

A wordprocessor having the above functions will be described in detail below.

Figure 55:
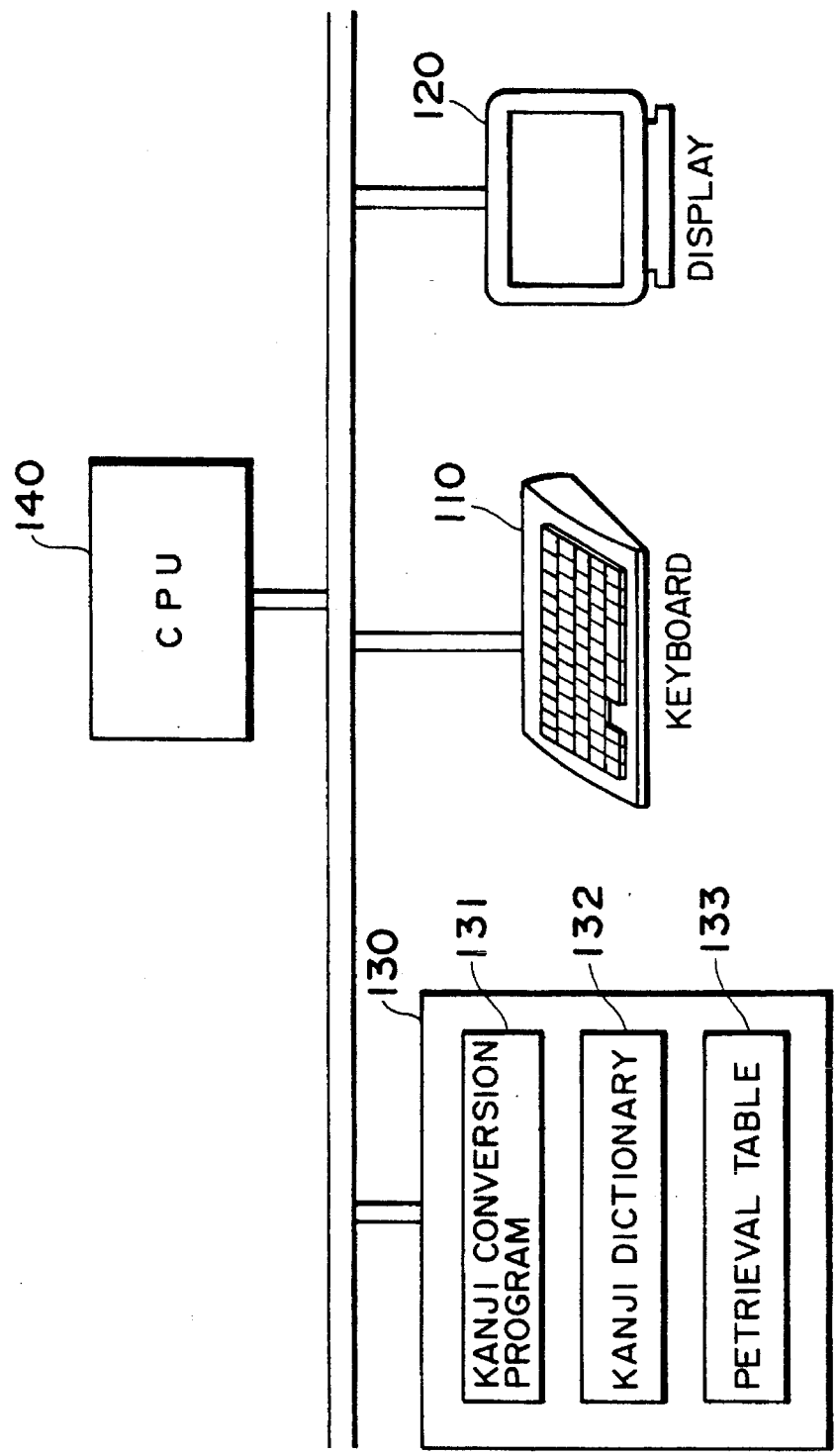
FIG. 55 is a block diagram showing an arrangement of a wordprocessor according to an embodiment of the present invention.

FIG. 55 is a block diagram showing the arrangement of the wordprocessor according to this embodiment. The wordprocessor comprises a keyboard 110 for inputting kana characters or letters, a display 120 for displaying input character data or converted data, a storage unit 130 for storing a conversion program 131, and a CPU 140 for controlling these components. The storage unit 130 stores a kanji dictionary 132 in which conversion kanji data are registered, and a retrieval table 133 in which a series of symbol groups and a series of number groups are registered, in addition to the conversion program 131.

The retrieval program 131 stored in the storage unit 130 performs general character retrieval processing and symbol retrieval process as the characteristic feature of this embodiment. The character retrieval processing is processing for converting character data input at the keyboard 110 into kanji data. On the other hand, the symbol retrieval processing is processing for converting specific symbol data or number data input from the keyboard 110 into another symbol data.

Figure 56:
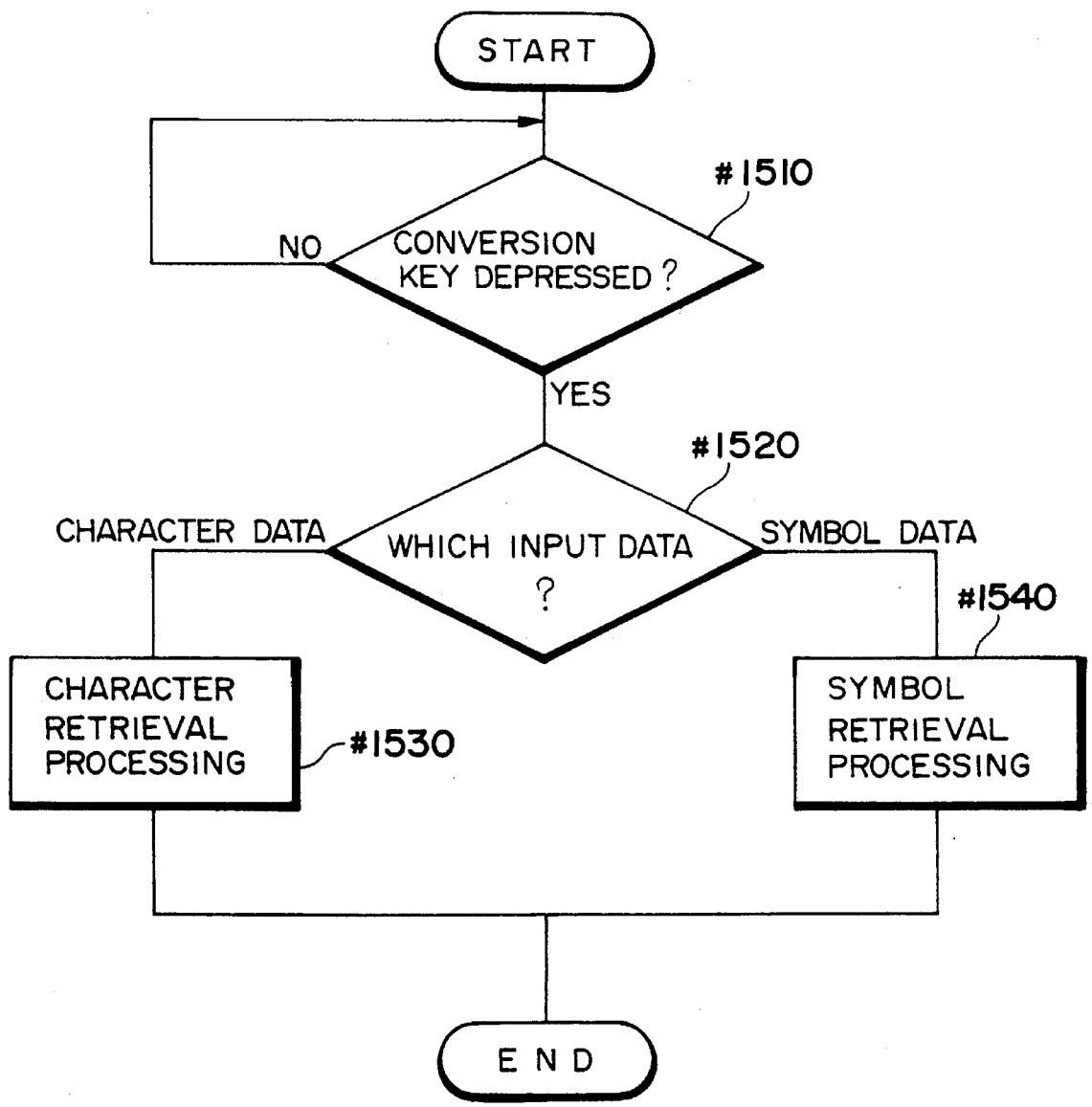
FIG. 56 is a flow chart showing the processing contents of a retrieval program.

The processing contents of the retrieval program 131 are shown in FIG. 56. The retrieval program 131 monitors a data input to the keyboard 110 by the operator and detects a key-in operation of a conversion key (#1510). When depression of the conversion key is detected, data input until the conversion key is depressed are checked (#1520). If the input data is character data, the character retrieval processing is performed (#1530). If the input data is symbol or number data, the symbol retrieval processing is performed (#1540).

Figure 57:
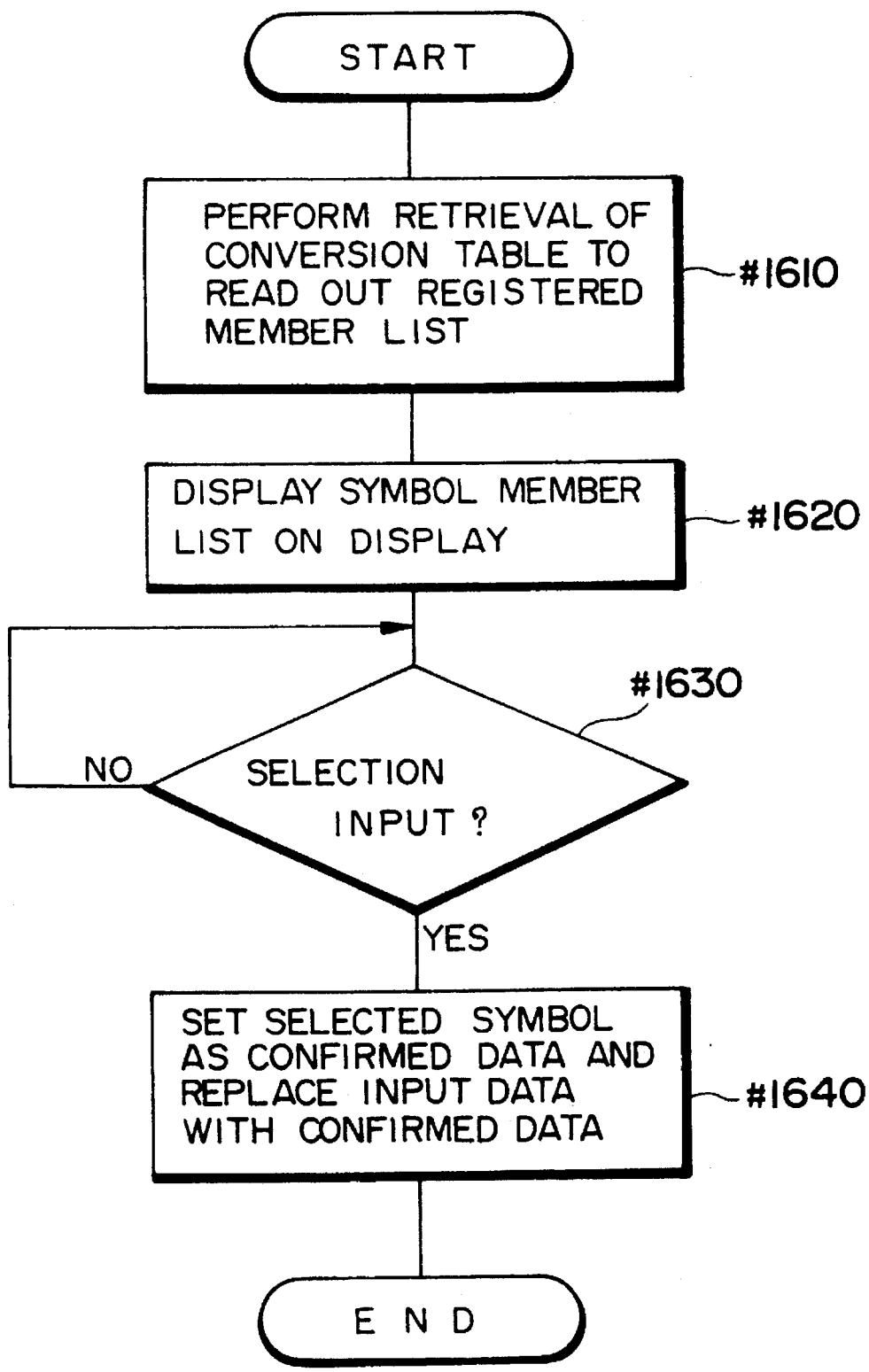
FIG. 57 is a flow chart showing the contents of symbol retrieval processing of this embodiment.
Figure 58A:
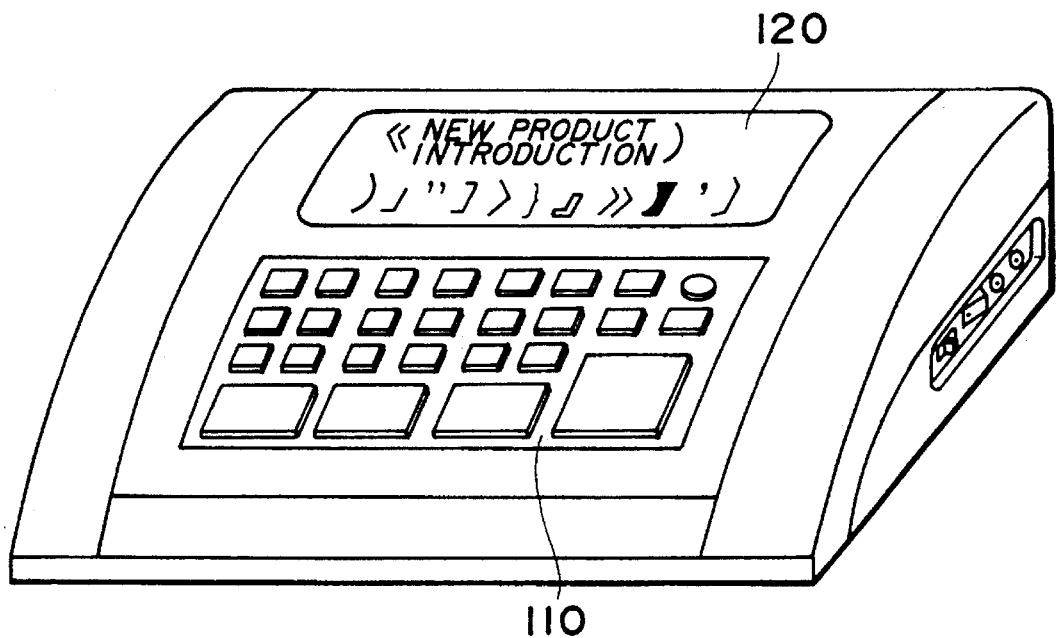
FIGS. 58A and 58B are a perspective view showing the outer appearance of the wordprocessor and a plan view of the display unit, respectively.
Figure 58B:
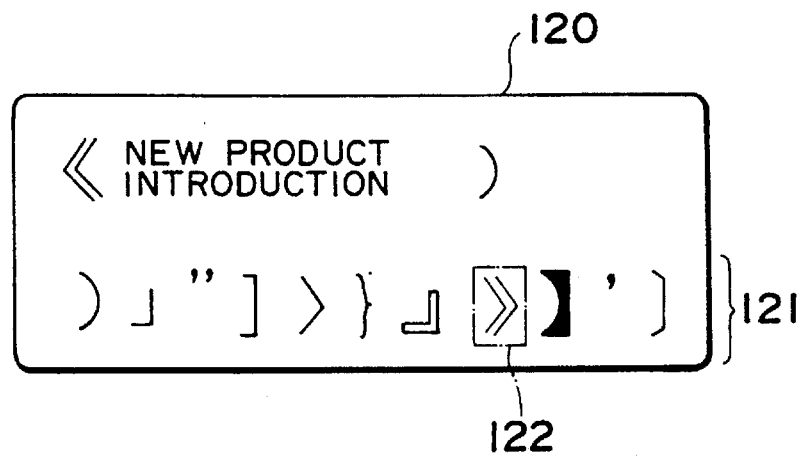

The symbol retrieval processing as the characteristic feature of this embodiment will be described with reference to FIGS. 57 to 58B. FIG. 57 is a flow chart showing the contents of the symbol retrieval processing. FIG. 58A is a view showing the outer appearance of the wordprocessor. FIG. 58B is a plan view showing the display contents of the display 120. In the symbol retrieval processing, a group list in which the input symbol or number data is registered is retrieved and read out from the; conversion table 133 (#1610). To input "¤" after the already input data "<<New Product Introduction", when ")" in the same group as the "¤" assigned to the keyboard 110 is input, the symbol group) J"]¤. . . " is read out from the conversion table 133. The readout list is displayed in a lower column 121 of the display 120 (#1620). When the operator shifts a cursor 122 to select a desired symbol from the symbol group (#1630), this symbol becomes confirmed data and is replaced with the input data (#1640).

The symbol retrieval processing is performed due to the following reason. A symbol input operation in the conventional wordprocessor is time-consuming because the number of keys of the keyboard 110 is limited, and the number of symbols directly assigned to the keys is small. For this reason, a large number of symbols assigned to the keys are input using codes or a retrieval function. However, according to this embodiment, since a plurality of symbols are divided into groups, even if a desired symbol is not assigned to a specific key, the desired symbol can be selected and input by entering another symbol belonging to the same group as that of the desired symbol. In the conventional wordprocessor, the symbols and numbers are not objects to be converted and are confirmed simultaneously with input operations. However, according to this embodiment, when a symbol or number is input and the conversion key is depressed, a group list is displayed, and the desired data is selected from this list, thereby converting the input data into the desired data.

Figure 59:
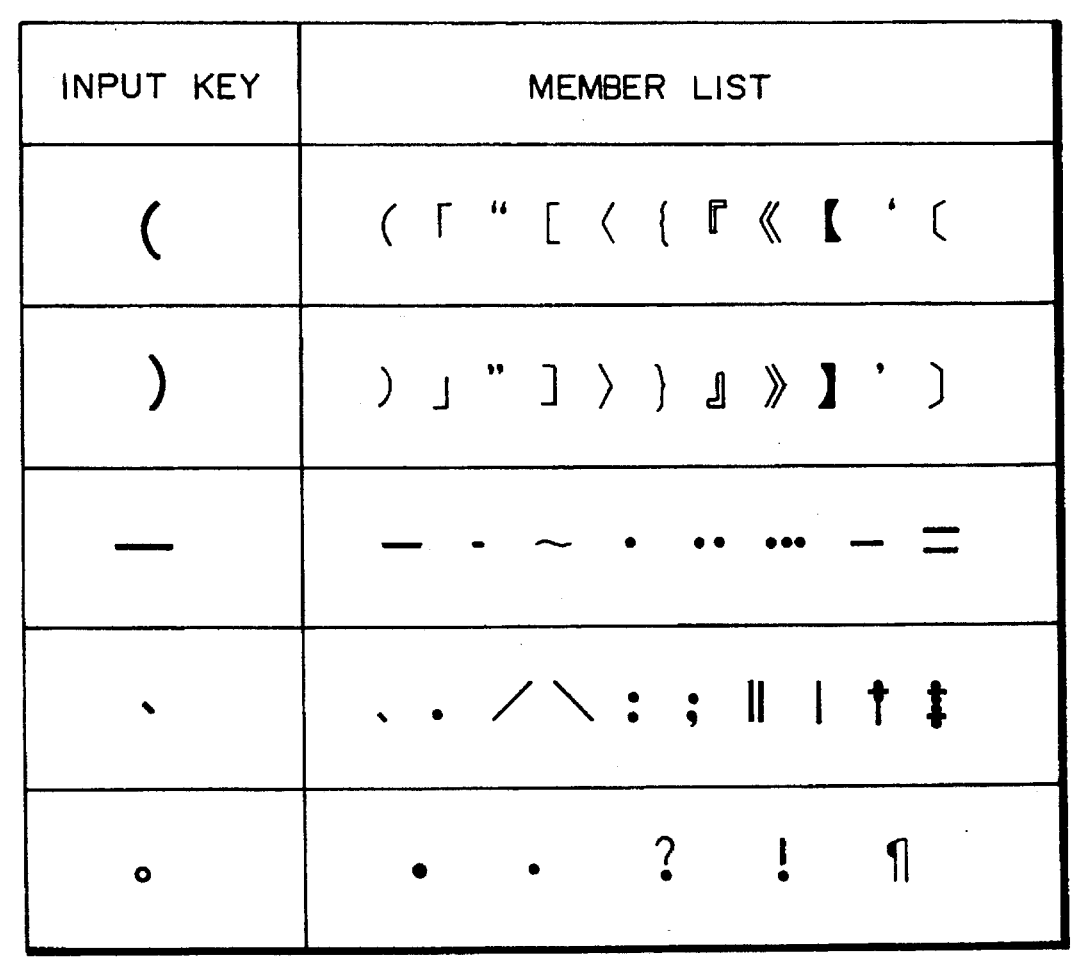

FIGS. 59 and 60 show a list of groups of the conversion table 133. In this list, symbols or numbers which can be directly entered with keys are listed in the left columns, and group members are listed in the right columns. Since symbols (numbers) which are not assigned to the keyboard are conventionally input by codes, a plurality of operations are required. However, according to this embodiment, any symbol (number) in the member list is input with a key, the list of the symbol (number) group is displayed on the display 120, and the user can select a desired symbol (number) from this member list. In addition, the punctuation group, the full stop group, the conjunction mark group, the left (right) parenthesis group are obtained such that symbols having high grammatical correlations are grouped. In addition, numbers representing the same values but having different notation methods are grouped. For example, numbers "1, ①, I,—, . . . " are grouped. For this reason, even if the group list is not stored, a desired symbol (number) can be almost accurately found out.

According to the wordprocessor of this embodiment, time-consuming retrieval of a desired symbol due to non-assignment of symbols to the keyboard can be solved, thus providing an excellent effect. That is, another symbol (i.e., a symbol assigned to the keyboard) belonging to the same group as that of the desired symbol is input to select the desired data from the displayed list. Therefore, the input data can be converted into the desired data. By executing this input processing, the retrieval time can be greatly reduced.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A word processor for forming a desired character string by key operations comprising:

a keyboard having input keys for inputting letters, symbols and numbers, a cursor shift key for moving a cursor and a confirmation key for confirming the selected letters, symbols and numbers;

display means for displaying the character string inputted by key operations of said keyboard;

storage means for registering a plurality of symbols and numbers which are divided in groups by specific concept; and control means, wherein said keyboard provides a symbol key and a number key which are typically assigned with a symbol or a number included in each group, and said control means includes, first control means for causing said display means to display a plurality of the symbols and numbers as non-confirmed data which are members of the groups corresponding to the depressed symbol or number keys, second control means for displaying the cursor on the symbol or number displayed on said display means, and for moving the cursor in turn on the symbol or number according to the key operations of the cursor shift key, third control means for confirming the symbol or number positioned at the cursor as the selected symbol or number when the confirmation key is depressed, and fourth control means for displaying the confirmed symbol or number on the rear of the character string displayed on said display means and for erasing the non-confirmed data from said display means.

2. A wordprocessor according to claim 1, wherein said wordprocessor functions as data input means for a personal computer.

3. A wordprocessor according to claim 1, wherein one group registered in said storage means consists of a symbol and number indicating the same ordinal number.

4. A wordprocessor according to claim 1, wherein one group registered in said storage means consists of a parenthesis mark positioned on the left side of each parenthesis marks, a plurality of which indicate a parenthesis.

5. A wordprocessor according to claim 1, wherein one group registered in said storage means consists of a parenthesis mark positioned on the right side of each parenthesis marks, a plurality of which indicate a parenthesis.

6. A wordprocessor according to claim 1, wherein one group registered in said storage means consists of symbols which are inserted between one character string or number string and the other character string or number string.

\* \* \* \* \*